United States Patent
Doppler et al.

(10) Patent No.: US 12,098,037 B2
(45) Date of Patent: Sep. 24, 2024

(54) PICKING STATION AND METHOD FOR AUTOMATIC PICKING OF GOODS

(71) Applicant: TGW Logistics Group GmbH, Marchtrenk (AT)

(72) Inventors: Christoph Doppler, Wolfsegg (AT); Stefan Holzner, Zaisering (DE); Sebastian Maximilian Feistl, Aschau i. Chiemgau (DE); Christian Prechtl, Voecklabruck (AT); Harald Schroepf, Wels (AT)

(73) Assignee: TGW Logistics Group Gmbh, Marchtrenk (AT)

( * ) Notice: Subject to any disclaimer, the term of this patent is extended or adjusted under 35 U.S.C. 154(b) by 1044 days.

(21) Appl. No.: 16/978,305

(22) PCT Filed: Mar. 7, 2019

(86) PCT No.: PCT/AT2019/060077
§ 371 (c)(1),
(2) Date: Sep. 9, 2020

(87) PCT Pub. No.: WO2019/169419
PCT Pub. Date: Sep. 12, 2019

(65) Prior Publication Data
US 2021/0024298 A1    Jan. 28, 2021

(30) Foreign Application Priority Data

Mar. 9, 2018  (AT) .............................. A 50207/2018
Mar. 13, 2018 (AT) .............................. A 50217/2018
Oct. 10, 2018 (AT) .............................. A 50886/2018

(51) Int. Cl.
*B65G 47/91* (2006.01)
*B65G 1/137* (2006.01)
*B65G 47/66* (2006.01)

(52) U.S. Cl.
CPC ......... *B65G 47/914* (2013.01); *B65G 1/1378* (2013.01); *B65G 47/66* (2013.01); *B65G 2203/041* (2013.01)

(58) Field of Classification Search
CPC .... B65G 47/914; B65G 1/1378; B65G 47/66; B65G 47/52; B65G 1/1376; B25J 9/1697;
(Continued)

(56) References Cited

U.S. PATENT DOCUMENTS

| 4,242,025 A | 12/1980 | Thibault |
| 5,564,893 A | 10/1996 | Tacchi et al. |

(Continued)

FOREIGN PATENT DOCUMENTS

| AT | 511 867 A1 | 3/2013 |
| CN | 201711969 U | 1/2011 |

(Continued)

OTHER PUBLICATIONS

Monkman, Gareth J. et al., "Robot Grippers" Weinheim: Wiley-VCH Verlag Gmbh & Co. KGaA, 2007.

(Continued)

*Primary Examiner* — Timothy R Waggoner
(74) *Attorney, Agent, or Firm* — Collard & Roe, P.C.

(57) ABSTRACT

A picking station for picking goods has a source container conveyor for automated transporting of source containers, a target container conveyor for automated transporting of target containers and a fully automated robot system. The source container conveyor includes a first removal area, where a first source container is provisioned, and a second removal area, where a second source container is provisioned. The target container conveyor includes a first loading area, where a first target container is provisioned, and a second loading area, where a second target container is provisioned. The robot system includes a robot having a (Continued)

gripping unit configured to remove goods according to different orders from the first source container and/or second source container and place them into the first target container and/or second target container, and a sensor system for capturing the goods in the first and second source containers. A method automatically picks goods.

26 Claims, 30 Drawing Sheets

(58) Field of Classification Search
CPC .............. B25J 15/0616; G06Q 10/08; G05B 2219/31078
See application file for complete search history.

(56) References Cited

U.S. PATENT DOCUMENTS

| | | | |
|---|---|---|---|
| 5,605,432 A | 2/1997 | Fink et al. | |
| 6,681,151 B1 | 1/2004 | Weinzimmer et al. | |
| 8,788,086 B2 | 7/2014 | Franz | |
| 9,026,243 B2 | 5/2015 | Radwallner et al. | |
| 9,205,558 B1 | 12/2015 | Zevenbergen et al. | |
| 9,381,645 B1 | 7/2016 | Yarlagadda et al. | |
| 9,452,894 B2 | 9/2016 | Puchwein et al. | |
| 9,457,477 B1 | 10/2016 | Rublee et al. | |
| 9,665,946 B2 | 5/2017 | Oda | |
| 9,751,693 B1 | 9/2017 | Battles et al. | |
| 9,827,677 B1 | 11/2017 | Gilbertson et al. | |
| 9,868,207 B2 | 1/2018 | Wellman | |
| 9,926,138 B1 | 3/2018 | Brazeau et al. | |
| 10,108,194 B1 | 10/2018 | Russell | |
| 10,549,928 B1 | 2/2020 | Chavez et al. | |
| 10,625,305 B2* | 4/2020 | Wagner | G05B 19/4189 |
| 10,773,839 B1 | 9/2020 | Talda et al. | |
| 10,926,408 B1 | 2/2021 | Vogelsong et al. | |
| 11,514,386 B1 | 11/2022 | Soles et al. | |
| 11,858,743 B2* | 1/2024 | Bauman | B65G 47/5186 |
| 2005/0226711 A1 | 10/2005 | Schnoor et al. | |
| 2006/0182545 A1 | 8/2006 | Ray et al. | |
| 2008/0181753 A1 | 7/2008 | Bastian et al. | |
| 2009/0279999 A1 | 11/2009 | Faulkner et al. | |
| 2010/0221094 A1 | 9/2010 | Kuehnemann et al. | |
| 2011/0170998 A1 | 7/2011 | Winkler | |
| 2011/0264259 A1 | 10/2011 | Boyer et al. | |
| 2013/0041495 A1 | 2/2013 | Moore et al. | |
| 2014/0023461 A1 | 1/2014 | Schaller et al. | |
| 2014/0205403 A1 | 7/2014 | Criswell | |
| 2014/0234066 A1 | 8/2014 | Mathi et al. | |
| 2014/0244026 A1* | 8/2014 | Neiser | B65G 1/1378 700/216 |
| 2015/0057793 A1 | 2/2015 | Kawano | |
| 2015/0314439 A1 | 11/2015 | Wang et al. | |
| 2015/0336741 A1 | 11/2015 | Ahammer et al. | |
| 2015/0370239 A1 | 12/2015 | Pronold | |
| 2016/0009493 A1 | 1/2016 | Stevens et al. | |
| 2016/0016311 A1 | 1/2016 | Konolige et al. | |
| 2016/0207195 A1 | 7/2016 | Eto et al. | |
| 2016/0236867 A1 | 8/2016 | Brazeau et al. | |
| 2016/0244262 A1* | 8/2016 | O'Brien | B25J 9/16 |
| 2016/0297611 A1 | 10/2016 | Williams et al. | |
| 2017/0050315 A1 | 2/2017 | Henry et al. | |
| 2017/0088360 A1 | 3/2017 | Brazeau et al. | |
| 2017/0151673 A1 | 6/2017 | Kobayashi et al. | |
| 2017/0322561 A1 | 11/2017 | Stiernagle | |
| 2018/0057263 A1 | 3/2018 | Beer | |
| 2018/0257225 A1 | 9/2018 | Satou | |
| 2019/0102965 A1 | 4/2019 | Greyshock et al. | |
| 2019/0185267 A1 | 6/2019 | Mattern et al. | |
| 2019/0270197 A1* | 9/2019 | Wagner | G06Q 10/08 |
| 2020/0078935 A1* | 3/2020 | Kimura | B25J 13/02 |
| 2020/0385209 A1 | 12/2020 | Garcia et al. | |

FOREIGN PATENT DOCUMENTS

| | | |
|---|---|---|
| CN | 202640363 U | 1/2013 |
| CN | 205552559 U | 9/2016 |
| CN | 206066477 U | 4/2017 |
| DE | 44 07 324 A1 | 9/1994 |
| DE | 10 2007 005 534 A1 | 8/2008 |
| DE | 10 2015 007 863 A1 | 12/2015 |
| DE | 10 2015 011 527 A1 | 3/2016 |
| DE | 10 2016 008 078 A1 | 1/2018 |
| EP | 0 616 874 A1 | 9/1994 |
| EP | 1 986 165 A1 | 10/2008 |
| EP | 2 315 714 B1 | 10/2012 |
| EP | 2 650 237 A1 | 10/2013 |
| EP | 2 783 799 A2 | 10/2014 |
| EP | 2 923 971 A1 | 9/2015 |
| EP | 3 112 295 A1 | 1/2017 |
| EP | 2 984 007 B1 | 3/2017 |
| EP | 3 248 915 A1 | 11/2017 |
| EP | 3 263 292 A1 | 1/2018 |
| JP | S52-59475 A | 5/1977 |
| JP | H06-39387 U | 5/1994 |
| JP | 2003-181786 A | 7/2003 |
| JP | 56-17512 B2 | 11/2014 |
| JP | 2018-015815 A | 2/2018 |
| WO | 2006/065147 A1 | 6/2006 |
| WO | 2009/094995 A1 | 8/2009 |
| WO | 2012/163666 A1 | 12/2012 |
| WO | 2013/090970 A2 | 6/2013 |
| WO | 2015/118171 A1 | 8/2015 |
| WO | 2016/010968 A1 | 1/2016 |
| WO | 2016/100235 A1 | 6/2016 |
| WO | 2016/138101 A1 | 9/2016 |
| WO | 2017/143367 A1 | 8/2017 |
| WO | 2017/198281 A1 | 11/2017 |
| WO | 2018/006112 A1 | 1/2018 |
| WO | 2018132855 A1 | 7/2018 |

OTHER PUBLICATIONS

International Search Report in PCT/AT2019/060075, mailed Jul. 17, 2019.
International Search Report in PCT/AT2019/060076, mailed Jul. 15, 2020.
International Search Report in PCT/AT2019/060077, mailed Sep. 11, 2019.
International Search Report in PCT/AT2019/060078, mailed Jul. 24, 2019.

* cited by examiner

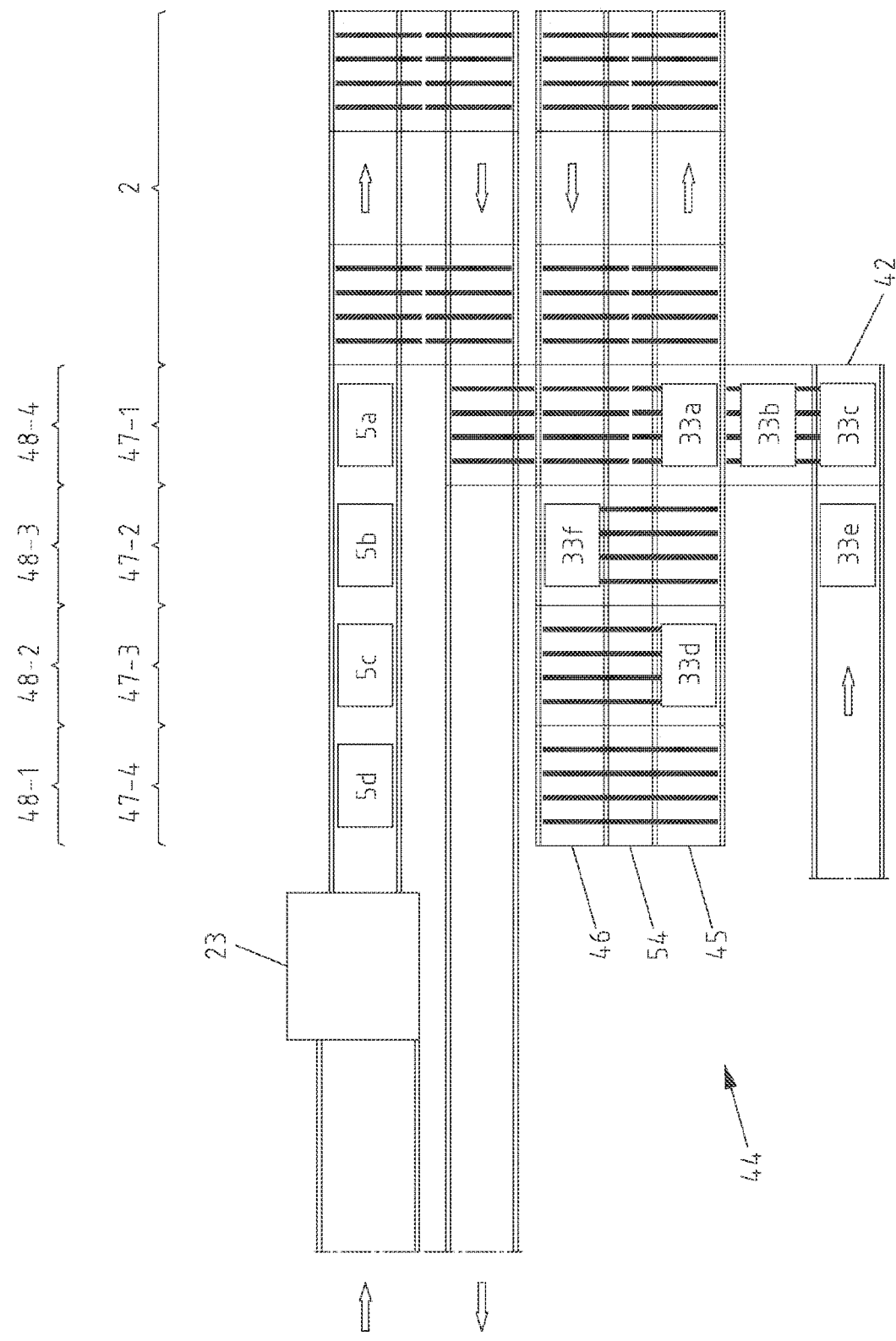

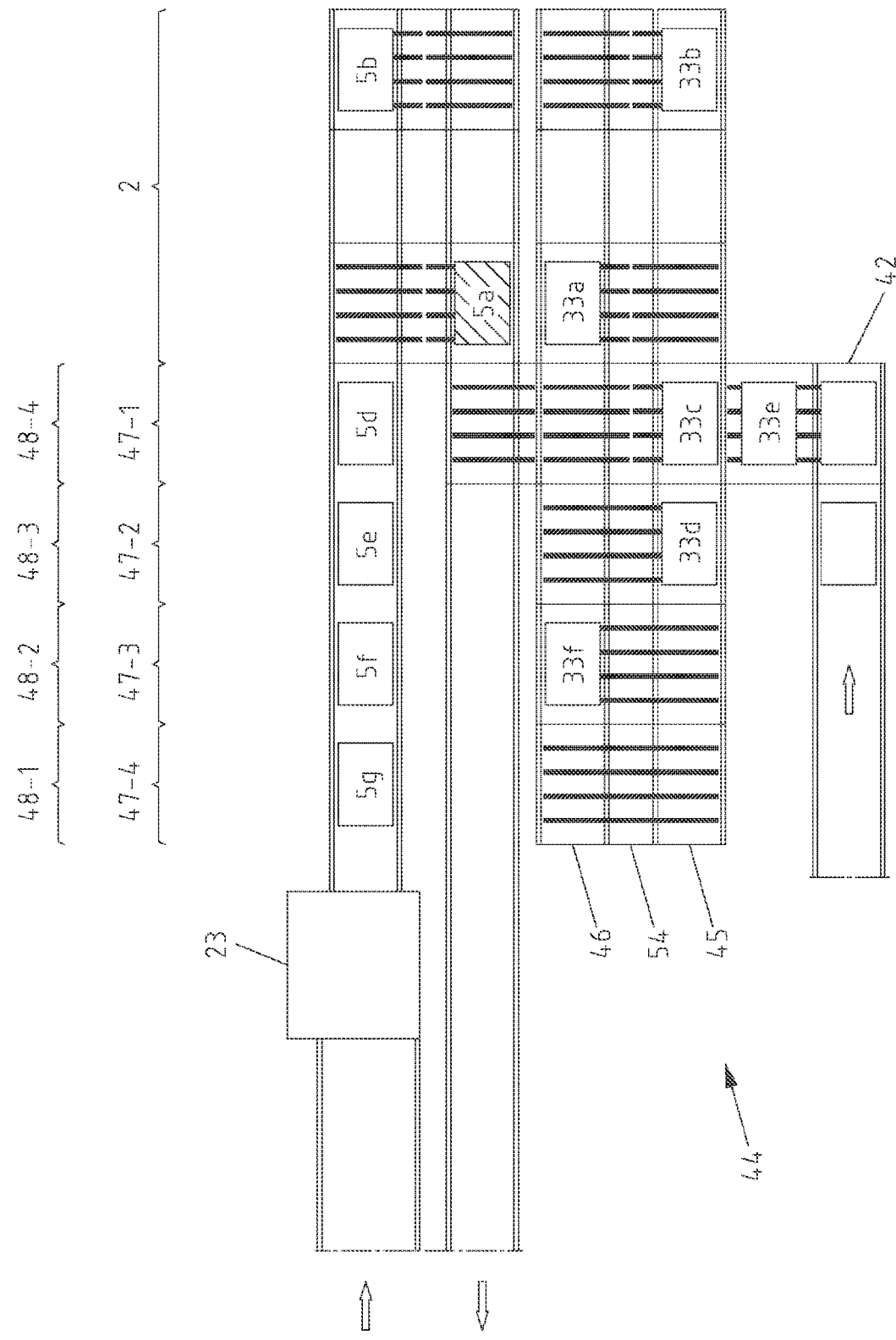

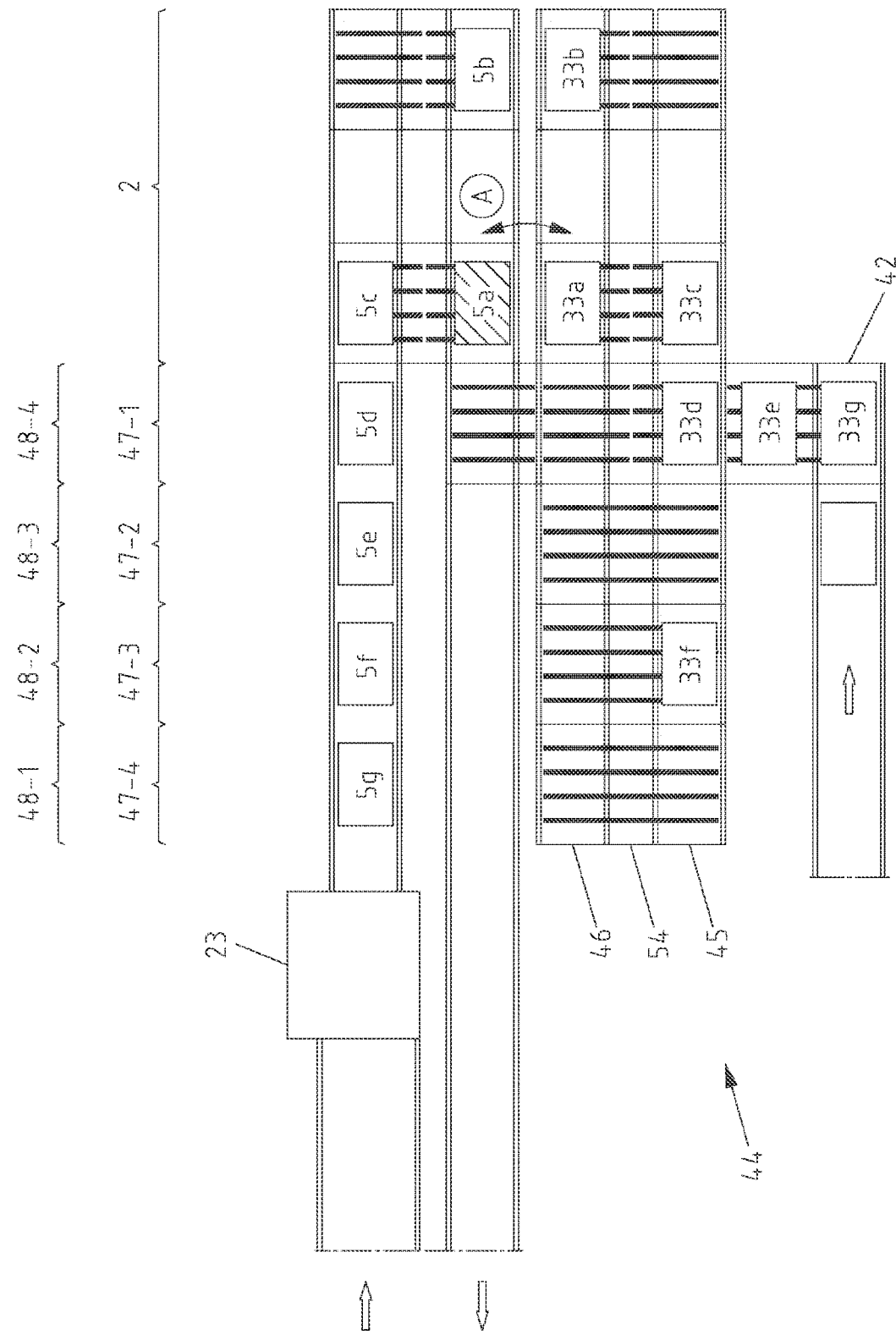

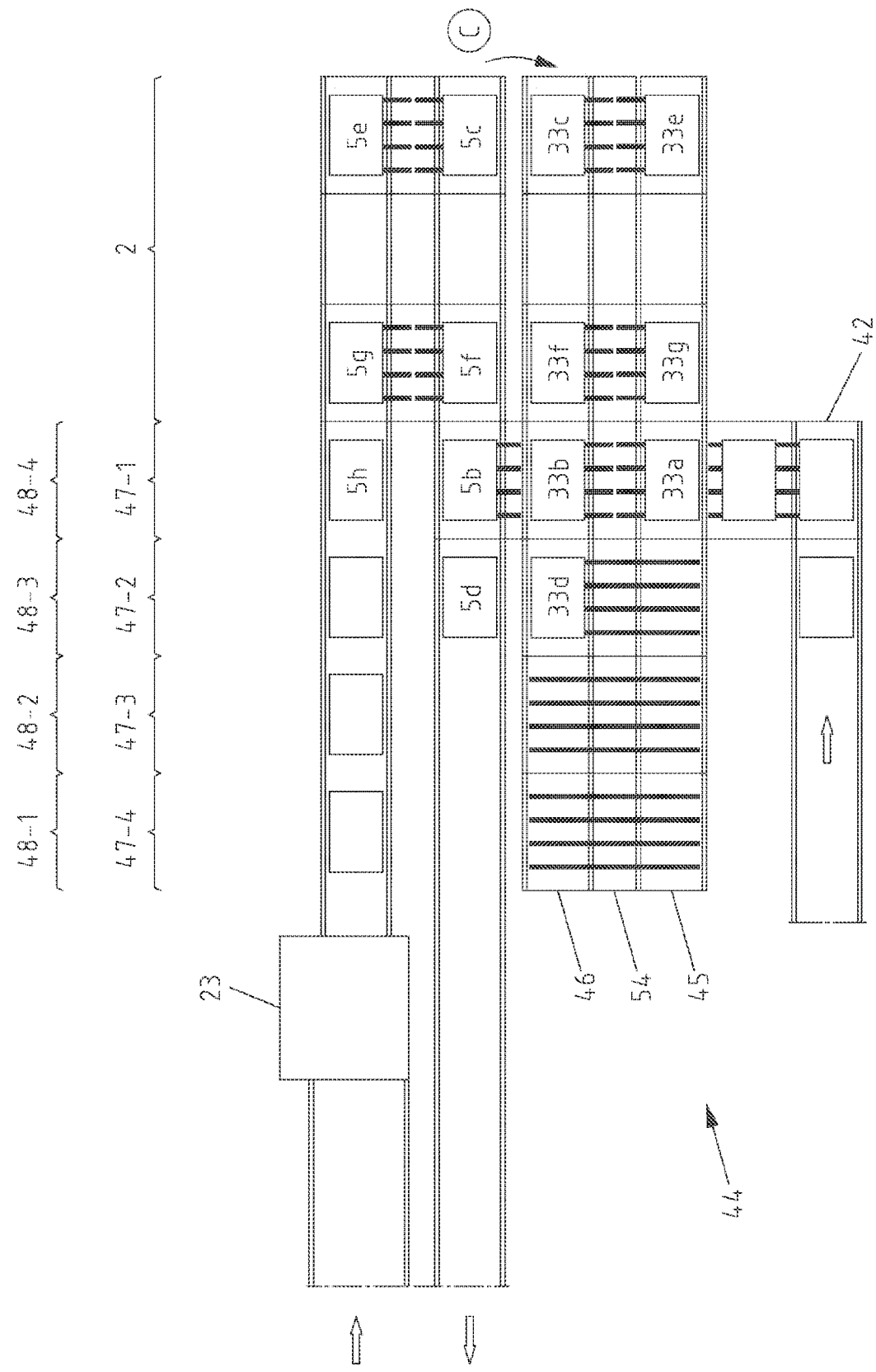

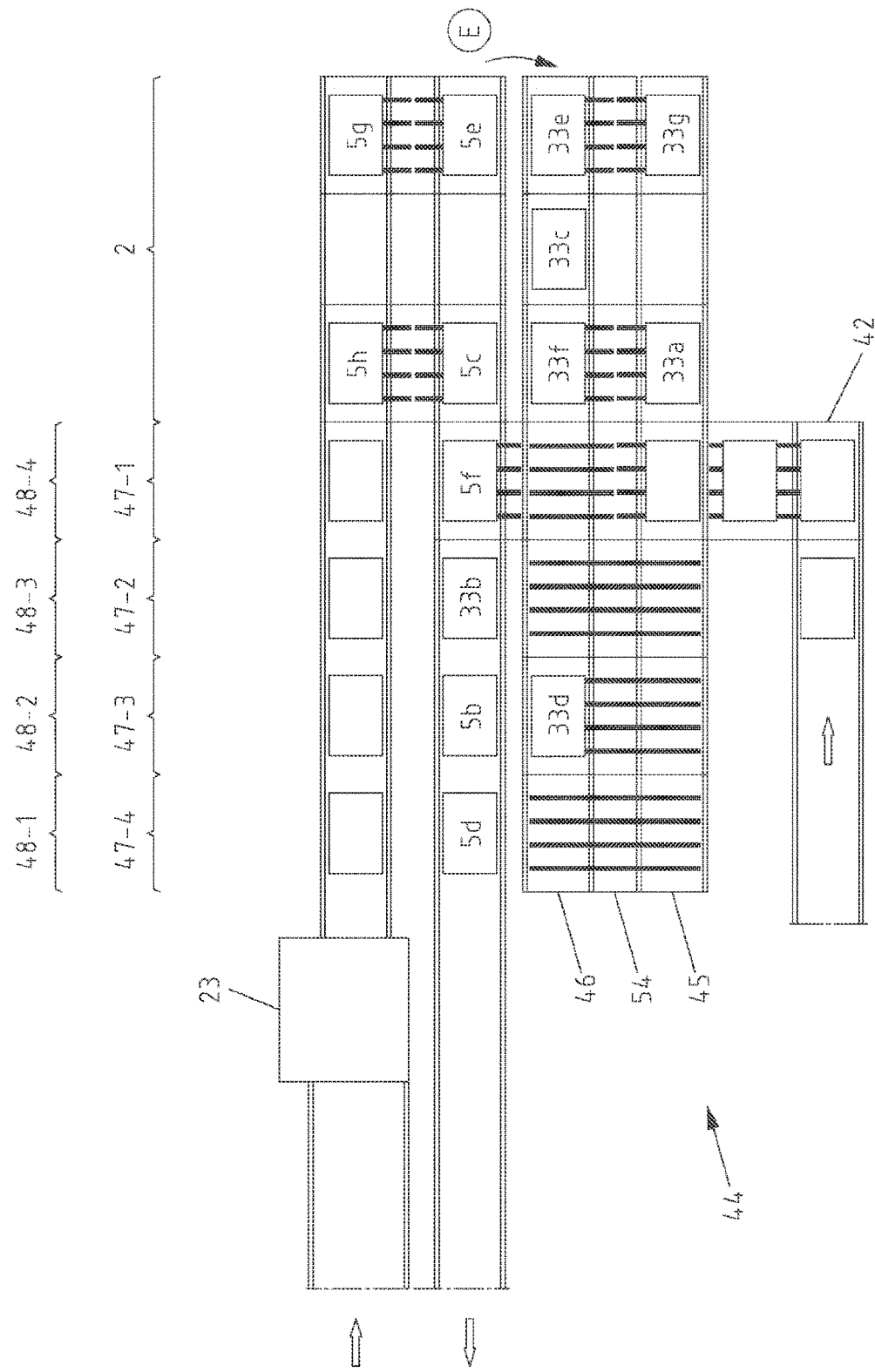

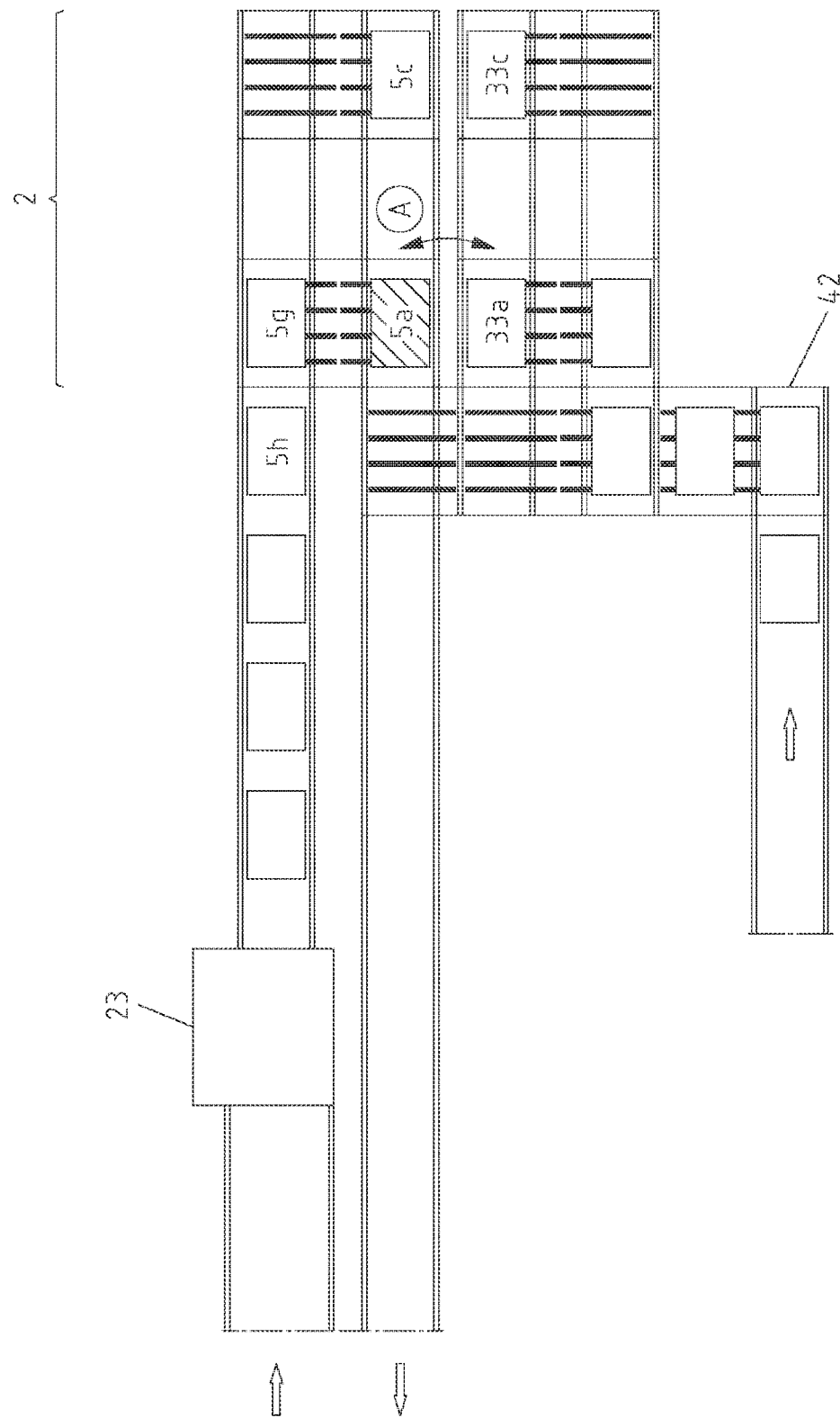

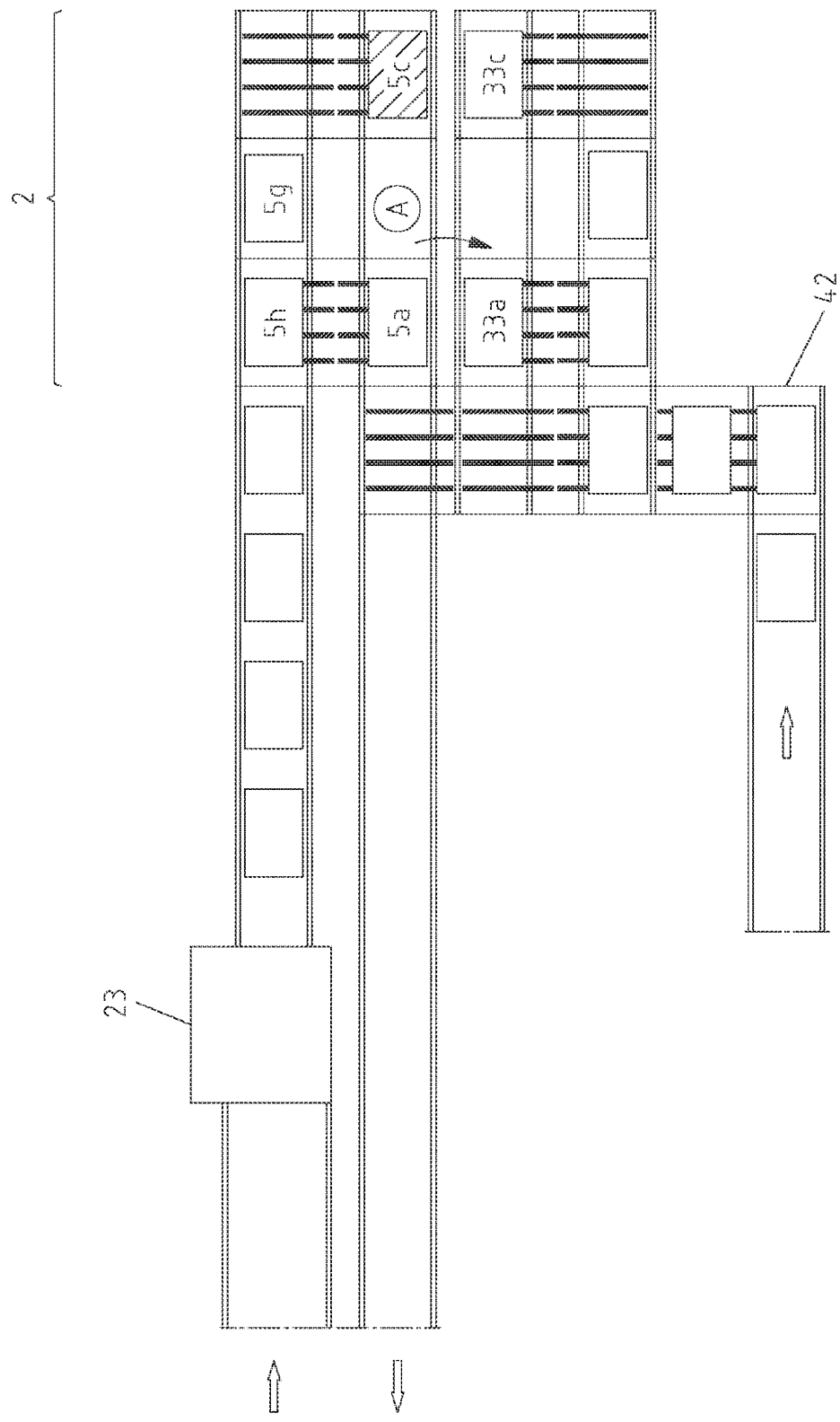

Fig. 7

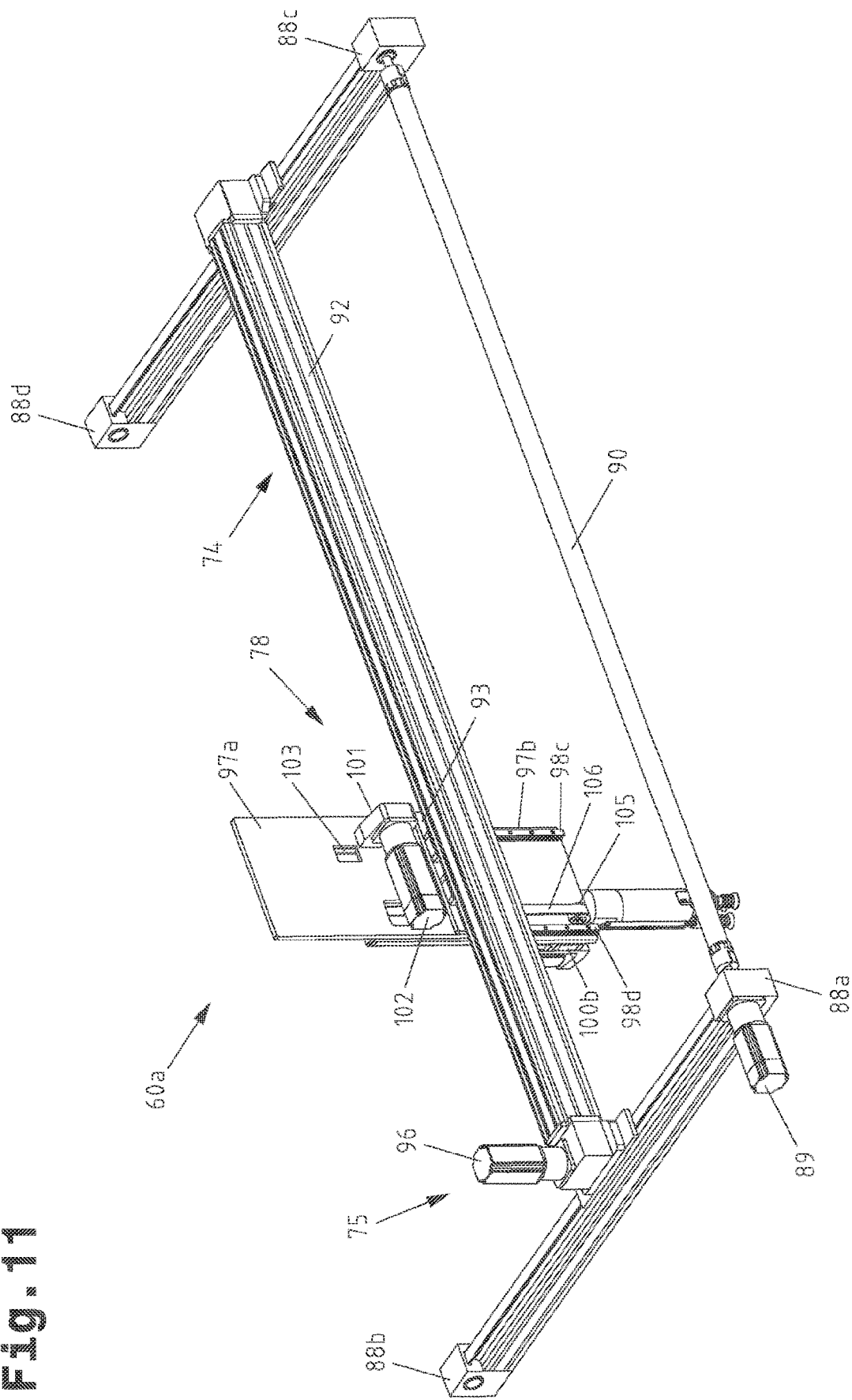

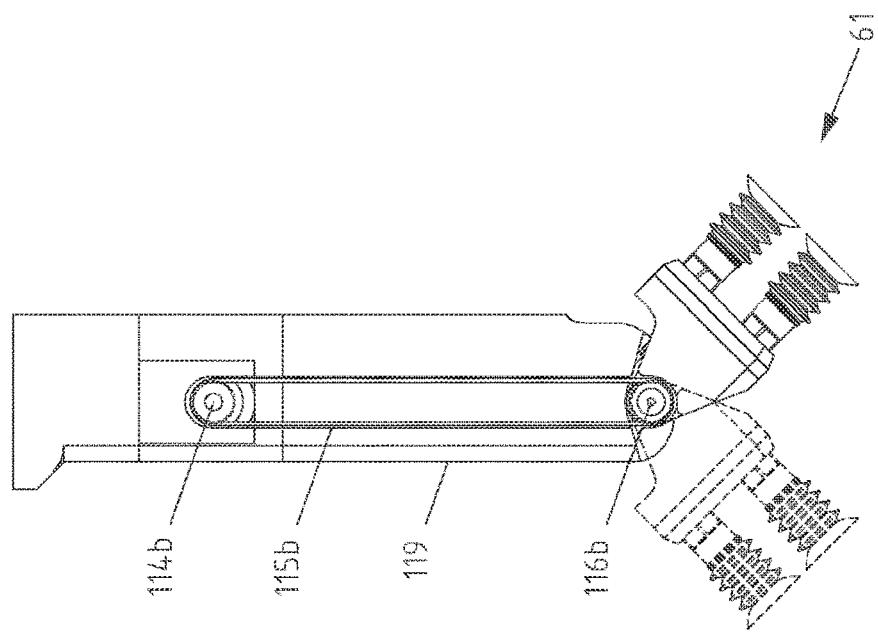
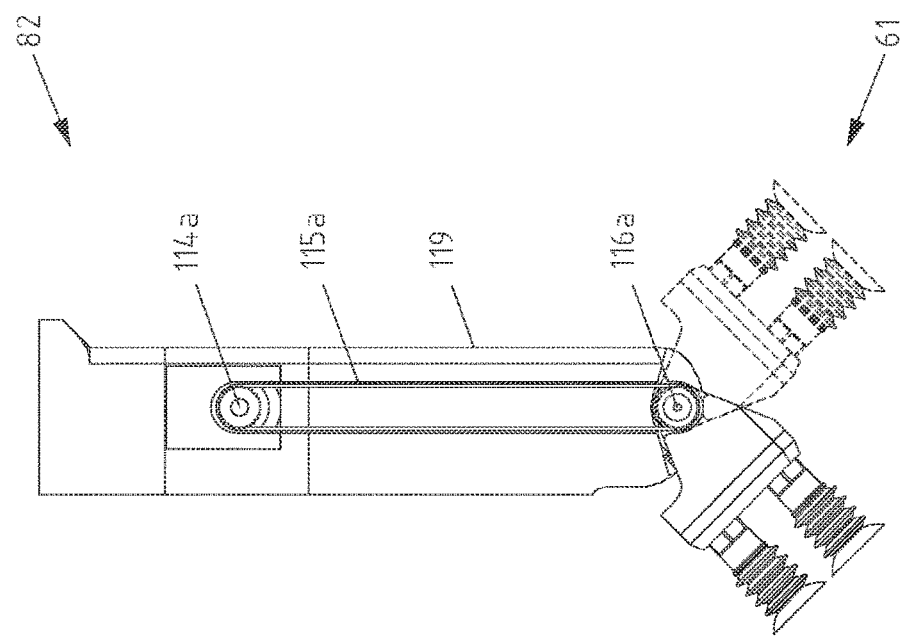
Fig. 13a
Fig. 13b

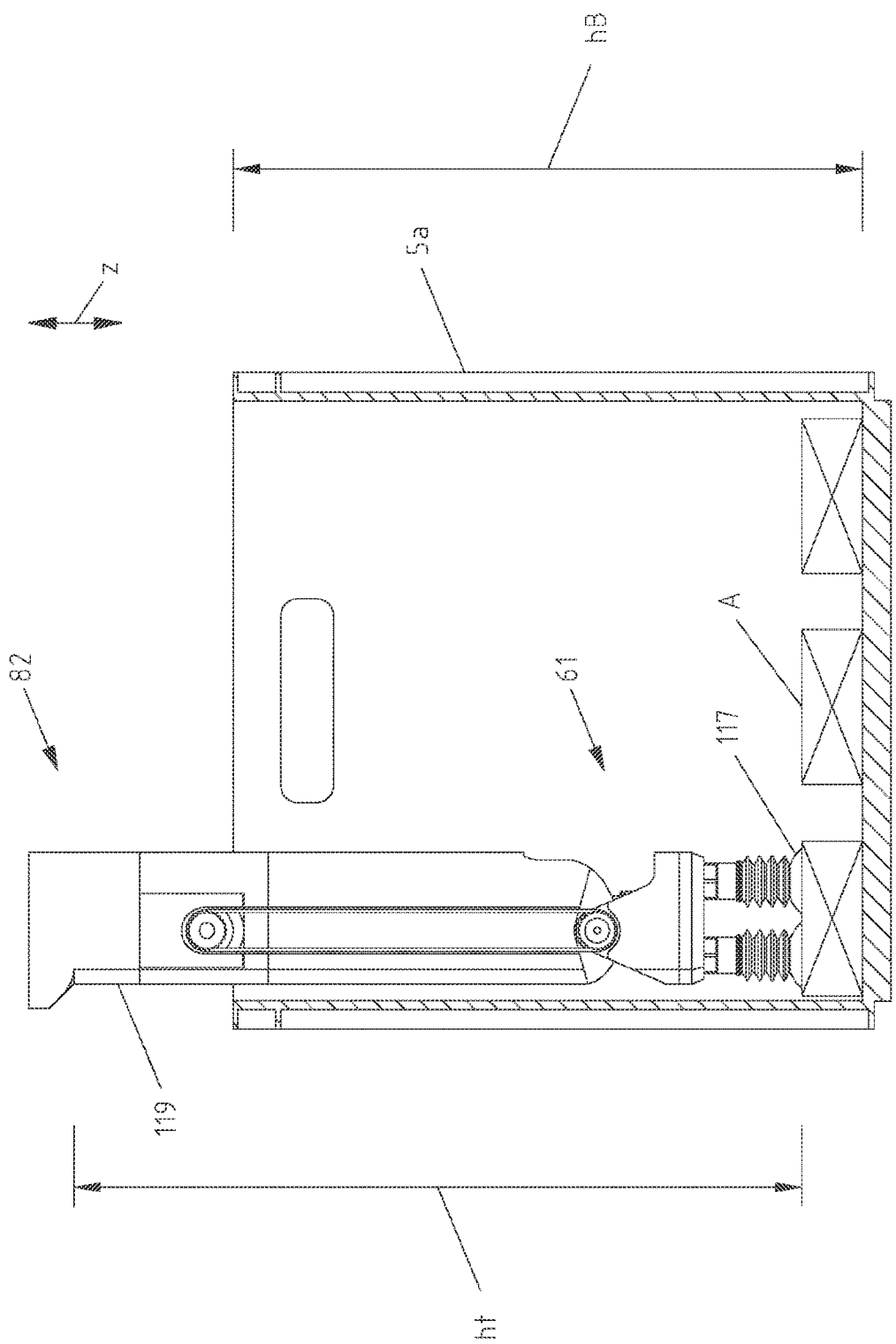

PICKING STATION AND METHOD FOR AUTOMATIC PICKING OF GOODS

CROSS REFERENCE TO RELATED APPLICATIONS

This application is the National Stage of PCT/AT2019/060077 filed on Mar. 7, 2019, which claims priority under 35 U.S.C. § 119 of Austrian Application No. A 50207/2018 filed on Mar. 9, 2018, Austrian Application No. A 50217/2018 filed on Mar. 13, 2018, and Austrian Application No. A 50886/2018 filed on Oct. 10, 2018, the disclosures of which are incorporated by reference. The international application under PCT article 21(2) was not published in English.

BACKGROUND OF THE INVENTION

1. Field of the Invention

The invention relates to a picking station for picking goods from source containers into target containers and a method for fully automated picking of different goods from source containers into target containers by a robot having a gripping unit.

The invention also relates to a gantry robot which comprises a base frame (which has in particular vertical posts, longitudinal beams and transverse beams connected to one another), a first gantry slide mounted so as to be displaceable relative to the base frame and horizontally movable via a first drive device along a first guide assembly in a first direction (x direction), a second gantry slide mounted at the first gantry slide so as to be displaceable and horizontally movable via a second drive device along a second guide assembly in a second direction (y direction) running transverse to the first direction, and a third gantry slide mounted at the second gantry slide so as to be displaceable and vertically movable via a third drive device along a third guide assembly in a third direction (z direction).

2. Description of the Related Art

WO 2016/138101 A1 draws up a list for position data of the goods ("pick list of location data of items") in the scanned source container. The goods removal is based on the position data of the goods in the source container. The goods from this "pick list" are removed successively until the source container is completely evacuated. Multiple goods removal operations can be done without new image capture. However, it remains disregarded in this case that goods may shift out of position between the individual goods removal operations and that it cannot be ensured in the next gripping process that the good(s) can be gripped correctly or altogether. Associated with this are numerous disruptions and a low picking performance.

A picking station for fully automated picking of different goods having a single robot is also known from EP 2 984 007 B1 and EP 2 315 714 B1. Orders can thus be processed exclusively sequentially, whereby the picking performance of the picking station is rather low.

A picking station in which multiple robots are moved relative to source containers provisioned consecutively on a conveying device is known from U.S. Pat. No. 9,751,693 B1. Each robot is equipped with a gripping unit. The goods are removed from the source containers and placed in a storage rack.

Also a gantry robot of the mentioned kind is known in principle. However, the known designs of gantry robots are not or only insufficiently suited for the picking of goods.

SUMMARY OF THE INVENTION

It is therefore an object of the invention to specify an improved picking station for picking goods from source containers into target containers and an improved method for fully automated picking of different goods from source containers into target containers. In particular, the disadvantages specified above are to be overcome and a high picking performance is to be achieved. In particular, the picking process is to be able to be carried out in a particularly reliable manner, therefore almost no disruptions are to occur.

It is also another object to specify an improved gantry robot. In particular, the latter is to be able to be used for the picking of goods.

The object of the invention is achieved by
- the first provisioning device having the first removal area and the second provisioning device having the second removal area being arranged along the second conveying device for removing the source containers,
- the first provisioning device having the first loading area and the second provisioning device having the second loading area being arranged along the second conveying device for removing the target containers,
- the first provisioning device having the first removal area and the first provisioning device having the first loading area facing one another,
- the second provisioning device having the second removal area and the second provisioning device having the second loading area facing one another, and
- the second conveying device for removing the source containers and the second conveying device for removing the target containers being arranged in parallel.

It is of advantage here that the source container and target container according to a first order and/or the source container and target container according to a second order can be provisioned, respectively, closely next to one another and the movements of the robot/the gripping unit can thereby be designed particularly short. The robot and the gripping unit can be moved along simple paths of motion.

In particular, the robot defines a working range within which the gripping unit is moved. The working range is a three-dimensional space. For this reason, it is also referred to as a workspace. The working range may form a rectangular base if the robot is designed, for example, as a gantry robot. Yet the working range may also form a circular or oval base, if the robot is designed, for example, as an articulated-arm robot (or also referred to as jointed-arm robot). The robot is installed preferably in a stationary manner.

The working range of the robot is designed so as to include the first provisioning device having the first removal area, second provisioning device having the second removal area, first provisioning device having the first loading area and second provisioning device having the second loading area. In this context, the term "include" is to be understood to mean that the working range abuts on a provisioning plane of the first/second provisioning device, or a provisioning plane of the first/second provisioning device intersects the working range.

When the first source container is at the first removal area, the second source container at the second removal area, the first target container at the first loading area and/or the second target container at the second loading area, the former are provisioned within the working range.

In other words, the robot system may comprise just a single robot, which can access more than one source container, in particular the first source container and the second source container, and more than one target container, in particular the first target container and the second target container.

Time-consuming pivoting movements of the robot and the gripping unit are almost never required. This ensures that not only the number of goods removal operations from a source container and goods dispensing operations into a target container is considerably increased, but also the number of goods dropping off the gripping unit can be maximally reduced. Overall, the picking performance can be increased compared to the picking stations known from the prior art. In addition, a highly compact structure of the picking station also becomes apparent. In particular, such an automatic picking station can be easily implemented in an existing storage and picking system having a manual picking station.

Such a manual picking station is described in WO 2018/006112 A1. As will be seen, the manual picking station is equally adjoined to a source container conveying system for supplying source containers to the picking station and for removing the source containers from the picking station and to a target container conveying system for supplying target containers to the picking station and for removing the target containers from the picking station. Merely the source container conveying system and the target container conveying system in the picking station are to be replaced and the robot system to be complemented.

The object of the invention is also achieved with a gantry robot of the kind mentioned in the beginning, which comprises a gripping unit coupled to the third gantry slide and mounted so as to be rotatable about a first axis of rotation and movable via a fourth drive device.

The object of the invention is also achieved by a picking station which has a fully automated robot system which comprises a gantry robot of the above-mentioned kind as well as at least one removal area, at which a source container is provisioned, and at least one loading area, at which a target container is provisioned.

In this way, in particular small goods which are kept in source containers for better storage and for better transport can be brought into the movement range of the gantry robot. Yet it would also be conceivable in principle that the goods to be picked are provisioned directly (i.e. without a source container and a target container) at the removal area and loading area.

In particular, the first axis of rotation may be aligned horizontally, whereby the gripping unit can easily be moved into an advantageous gripping pose for gripping goods, for example if the good to be gripped is formed by a box lying diagonally in a source container.

Yet it would also be conceivable that the first axis of rotation is aligned vertically, whereby the gripping unit likewise can easily be moved into an advantageous gripping pose for gripping goods. This is in particular of advantage whenever the gripping unit is not structured in a (rotationally) symmetrical manner viewed from the bottom.

It is a particular advantage of the gantry robot that, when the range of action (i.e. the area which the robot is able to reach with its gripping unit) is extended, the driving forces increase to a lesser extent than in an articulated-arm robot, provided that the speed of movement is identical. The reason is that, in the gantry robot, predominantly linear inertia is authoritative, whereas, in the articulated-arm robot, moments of inertia play a role and the driving forces increase more strongly than linearly when the range of action is extended. The inertia of the gantry slide of a gantry robot advantageously does not change at all whenever the first direction (x direction) is extended. The use of a gantry robot is therefore in particular of advantage whenever particularly large loading aids or a particularly large number of loading aids are to be accessed simultaneously by the gantry robot, such as it is frequently called for and/or necessary in the case of complex picking processes. For example, this is the case in the picking station presented further above having two removal areas for source containers and two loading areas for target containers.

In contrast to this, if the articulated-arm robot is not extended analogously to the increased range of action to avoid excessive increasing of the driving forces, it has to be expected under certain circumstances that "blind areas" occur, i.e. areas emerge which the articulated-arm robot is unable to reach. This problem occurs in particular when picking is done with the aid of (source) containers and/or (target) containers, as, due to the height of the containers, the outmost arm segment of the articulated-arm robot cannot be inserted perpendicularly into a container standing further away from the central axis of rotation of the articulated-arm robot. The obliquely-positioned arm segment then results in the blind areas mentioned. Goods stored in these areas in the (source) container can subsequently not be seized. Furthermore, the goods can also not be dispensed into a (target) container in these areas. The (target) container is then unfavorably filled unilaterally. The use of a gantry robot advantageously ensures that these problems are avoided.

Advantageously, gantry robots do not incur singularities, as it is the case with articulated-arm robots, i.e. points in space which can be reached by means of multiple (under certain circumstances an unlimited number of) axial positions. The continuous-path control for the gantry robot can hence have a simpler structure.

The gantry robot can particularly advantageously be used in a design of the picking station in accordance with one aspect of the invention. The linear movements of the gantry slides ensure that the first source container, second source container, first target container and second target container can be easily reached, even if they are provisioned in the corner points of an (imaginary) rectangle.

It should be noted at this point that the gantry robot presented and/or the robot system comprising the gantry robot may also be independent of a special design of a picking station and may thus form the basis for an independent invention.

A particularly simple design of the picking station becomes apparent when the first provisioning device having the first removal area and the second provisioning device having the second removal area are configured at the second conveying device for removing the source containers. Equally, the first provisioning device having the first loading area and the second provisioning device having the second loading area may be configured at the second conveying device for removing the target containers.

In accordance with a further development of the invention, the second conveying device for removing the source containers and the second conveying device for removing the target containers are arranged at a distance of a maximum of 400 mm. In practice, a distance of between 150 mm and 250 mm has proven particularly favorable. This ensures that a mutual obstruction of the source containers and target containers is just avoided, but the movements of the robot and the gripping unit for picking goods are reduced to a minimum. Thus, a maximal picking performance is achieved.

In an advantageous design of the invention, the first provisioning device having the first removal area and the first provisioning device having the first loading area each form a provisioning plane at the same height level. Equally, the second provisioning device having the second removal area and the second provisioning device having the second loading area may each form a provisioning plane at the same height level. This enables the first source container/first target container and second source container/second target container to be provisioned at the same height level, which facilitates the removal of the goods from the first/second source container and the dispensing of the goods into the first/second target container.

It is favorable if a buffer device having at least one buffer area is provided between the first provisioning device having the first removal area and the second provisioning device having the second removal area, wherein the buffer area is configured to buffer a second source container after the picking. Equally, a buffer device having at least one buffer area may be provided between the first provisioning device having the first loading area and the second provisioning device having the second loading area, wherein the buffer area is configured to buffer a second target container after the picking. This enables, on the one hand, the second source container to be removed immediately after the order line has been processed and no further good(s) from the second source container is/are needed according to this order, and, on the other hand, the second target container to be removed immediately after the order line has been processed and no further good(s) in the second target container is/are needed according to this order. This ensures that a high conveying performance is achieved at the source container conveying system and the target container conveying system.

It also proves particularly advantageous if
a holding plate is arranged above the second conveying device for removing the source containers and second conveying device for removing the target containers between the first provisioning device having the first removal area and the first provisioning device having the first loading area, wherein the holding plate has a first access opening above the first removal area and a second access opening above the first loading area, and
a holding plate is arranged above the second conveying device for removing the source containers and second conveying device for removing the target containers between the second provisioning device having the second removal area and the second provisioning device having the second loading area, wherein the holding plate has a first access opening above the first removal area and a second access opening above the first loading area.

The respective holding plate can form a horizontal or obliquely-aligned holding surface as well as be formed by a pivotable flap and can be arranged between the first source container/first target container and/or second source container/second target container or around the first source container/first target container and/or second source container/second target container. The flap can in particular be driven by a motor or actuated by the robot. With the help of a holding surface, which is configured in the form of an obliquely-aligned plane, (a) good(s) dropped off the gripping unit can be automatically forwarded into the first source container/first target container and/or second source container/second target container. With the help of a flap, (a) good(s) dropped off the gripping unit can be forwarded, optionally, into the first source container/first target container and/or second source container/second target container.

It also proves favorable if
a holding plate is arranged above the second conveying device for removing the source containers between the first provisioning device having the first removal area and the second provisioning device having the second removal area, and
a holding plate is arranged above the second conveying device for removing the target containers between the first provisioning device having the first loading area and the second provisioning device having the second loading area.

In accordance with the measure according to the method, it is provided that, after the removal of (a) good(s) by the gripping unit from either one of the first and second source containers in accordance with step g) or step j), the sensor system
checks whether (a) good(s) has/have dropped off the gripping unit and is located on a holding plate which is arranged above the second conveying devices between the first source container and first target container and between the second source container and second target container, and
the good(s) located on the holding plate is/are picked up by the gripping unit and placed in the
first source container, or
second source container, or
first target container, or
second target container.

In this way, it can be prevented that (a) good(s) which has/have inadvertently dropped off the gripping unit fall(s) onto the second conveying devices or first/second provisioning devices. Instead, the good(s) fall(s) onto the holding plate. From this holding plate, the good(s) can be picked up by the gripping unit and placed either into the first/second source container or into the first/second target container provided in accordance with its intended purpose.

According to this embodiment,
a first holding plate is provided above the second conveying devices between the first source container and first target container (in FIG. 2, 66a), and
a second holding plate is provided above the second conveying devices between the second source container and second target container (in FIG. 2, 66b).

It may also prove of advantage if, in addition,
a third holding plate is provided above the second conveying devices between the first source container and second source container (in FIG. 1, 66c),
a fourth holding plate is provided above the second conveying devices between the first target container and second target container (in FIG. 1, 66d).

In this case, it is particularly advantageous that the problem which occurred can be solved by the robot system itself, thereby rendering superfluous an intervention by an operator.

It is favorable if the picking station adjoins a sorting buffer, wherein the sorting buffer is controlled by a control unit and by using the control unit the target containers in the sorting buffer are sorted into a sequence determined depending on the sequence in which the source containers are provisioned, respectively, at the first removal area and the second removal area. The target containers are sorted into a sequence in and by the sorting buffer, which sequence is determined by the sequence of the source containers. It is of advantage that the requirement for the sequence in which the source containers are supplied to the first removal area and second removal area on the source container conveying system (see FIG. 1 conveying device 12) is low and thus a high retrieval performance is achieved in the storage area. The picking station can be supplied substantially uninterruptedly with source containers.

In an advantageous design of the invention, the sorting buffer comprises buffer positions arranged consecutively on a first conveying device in a dispensing direction and sorting positions arranged consecutively on a second conveying device in a return direction and third conveying devices connecting the sorting positions to the buffer positions in terms of conveyance,
- wherein the first conveying device of the sorting buffer adjoins the first conveying device for supplying the target containers and has at least one conveying means for transporting the target containers,
- wherein the second conveying device of the sorting buffer adjoins the second conveying device for removing the target containers and has at least one conveying means for transporting the target containers,
- wherein further conveying means for transporting the target containers are allocated to the buffer positions and the sorting positions, and
- wherein the control unit controls the at least one conveying means of the first conveying device, the at least one conveying means of the second conveying device, and the further conveying means such that the target containers in the sorting buffer are sorted into a sequence which is determined depending on the sequence in which the source containers are provisioned, respectively, at the first removal area and the second removal area, and such that a first/second source container and a first/second target container, respectively according to an order, arrive approximately simultaneously at the first/second removal area and first/second loading area.

Also of advantage is the measure according to the method in which
- the source containers are removed from a storage area according to the orders and provisioned at the first removal area and second removal area in a random sequence,
- wherein the sequence of the source containers in which the source containers are supplied to the first removal area and second removal area is captured, and
- wherein the target containers in the sorting buffer are sorted into a sequence which is determined depending on the sequence in which the source containers are provisioned at the first removal area and second removal area, and that a first/second source container and a first/second target container, respectively according to an order, arrive approximately simultaneously at the first/second removal area and first/second loading area.

While the source containers needed for the processing of the order lines are fed to the first removal area and second removal area in a disordered sequence, this sequence is captured at a sequence determination point. The sequence determination point is arranged preferably along the source container conveying system for supplying the source containers, which adjoins the first conveying device of the picking station. From the sequence determination point onward, the (chaotic) sequence remains unchanged. The target containers in the sorting buffer determine which source containers are to be removed. The target containers are sorted into a sequence in and by the sorting buffer, which sequence is determined by the (chaotic) sequence of the source containers.

Yet the object of the invention is also achieved by the storage and picking system in accordance with another aspect of the invention. The storage and picking system can be operated in a particularly economical manner. The picking station processes orders reliably and with a high picking performance.

Finally, the object of the invention is also achieved by a method for fully automated picking of different goods from source containers into target containers by a robot having a gripping unit, having the following steps:
- a) acquiring of orders, each having one or multiple order lines, wherein each order line specifies at least one good by a type of good and a quantity (number of pieces) ordered,
- b) supplying a first source container for a first picking order and supplying a second source container for a second picking order on a first conveying device of a source container conveying system and transporting the first source container from the first conveying device to a first provisioning device having a first removal area and transporting the second source container from the first conveying device to a second provisioning device having a second removal area,
- c) provisioning the first source container at the first removal area and provisioning the second source container at the second removal area,
- d) transporting a first target container to a first provisioning device having a first loading area and provisioning a first target container at the first loading area to process an order line according to a first order,
- e) transporting a second target container to a second provisioning device having a second loading area and provisioning a second target container at the second loading area to process an order line according to a second order,
- f) ascertaining a gripping surface pose of a gripping surface for at least one of the goods in the first source container with the help of a sensor system after the first source container has been provisioned at the first removal area,
- g) removing the good(s) from the first source container and placing the good(s) into the first target container by the gripping unit of the robot in accordance with the first order,
- h) repeating the step f), provided that the order line according to the first order contains (a) good(s) of this type of good, again removing the good(s) from the first source container and placing the good(s) into the first target container by the gripping unit of the robot,
- i) ascertaining a gripping surface pose of a gripping surface for at least one of the goods in the second source container using a sensor system after the second source container has been provisioned at the second removal area,
- j) removing the good(s) from the second source container and placing the good(s) into the second target container by the gripping unit of the robot in accordance with the second order,
- k) repeating the step i), provided that the order line according to the second order contains (a) good(s) of this type of good, again removing the good(s) from the second source container and placing the good(s) into the second target container by the gripping unit of the robot, l) removing the first source container from the first removal area after processing the order line according to the first order and removing the second source container from the second removal area after processing the order line according to the second order, independent of each other, by a second conveying device of the source container conveying system, m) removing the first target container from the first loading area after processing the order line according to the first order and removing the second target container from the second loading area after processing the order line according to the second order, independent of each other, by a target container conveying system.

It is of advantage that, before each (new) removal of (a) good(s) from the first source container/second source container with the help of a sensor system, a gripping surface pose of a gripping surface is ascertained for at least one of the goods in the source container. The ascertained gripping surface pose serves as a basis for computing a gripping pose for the movable gripping unit. The gripping unit is moved into the computed gripping pose and the gripping unit, for example at least one suction gripper, which is in or comes into contact with the gripping surface of the good(s), is activated to pick up the good(s). Thus, dislocation of goods in the first source container/second source container after a goods removal has been carried out is captured and an optimized gripping surface pose is ascertained at all times and the gripping unit is moved by means of an optimized gripping pose. This reduces "misactions" to a minimum and the good(s) is/are picked up and/or seized by the gripping unit in an optimal manner.

Furthermore, these measures according to the method may be of advantage in combination with the described automatic troubleshooting by the robot/gripping unit. This shall be described by means of the following example. If, after a goods removal, the gripping unit loses (a) good(s) it has picked up and the same drop(s) back into the source container and/or if (a) good(s) it has picked up is lost on the movement from the source container to the target container and "caught" at the holding plate and placed back into the source container, this will result in a changed gripping surface pose of a gripping surface for at least one other good in the source container. Accordingly, an updated gripping pose for the gripping unit is computed. This, too, is a measure which can reduce the "misactions" to a minimum.

It is an advantageous measure if the first order having the steps f) to h) and the second order having the steps i) to k) are processed sequentially by the robot.

In this case, the step i) can be carried out after the processing of the order line according to the first order and during the movement of the robot/the gripping unit from the first target container to the second source container. Equally, the step f) can be carried out after the processing of the order line according to the second order and during the movement of the robot/the gripping unit from the second target container to the first source container.

First, the order line according to a first order or second order is processed completely. "Completely" in this context means that any and all goods for fulfilling this order line must have been placed in the respective first target container/second target container.

For example, the order line according to a first order is processed completely. Only after that is the step i) carried out and a gripping surface pose of a gripping surface for at least one good in the second source container ascertained. Hence, the gripping surface pose is ascertained only closely before a planned goods removal from the second source container. Subsequently, the order line according to a second order is processed and processed completely. After that, the step f) is carried out and a gripping surface pose of a gripping surface for at least one good in the first source container ascertained. Hence, the gripping surface pose is ascertained only closely before a planned goods removal from the first source container.

This is particularly advantageous, as concussions may occur during the processing of the order line according to a first order by the robot/the gripping unit and the goods in the second source container may shift out of position. If the gripping surface pose of a gripping surface for at least one good in the second source container were done already during the removal of the goods from the first source container and placing of the goods into the target container, as in the prior art, an increasing number of "misactions" would have to be expected.

It also proves advantageous if the step f) is carried out during the processing of the order line according to the first order in accordance with the steps g) and h) and the step i) is carried out during the processing of the order line according to the second order in accordance with the steps j) and k).

It also proves favorable if the first order having the steps g) and h) and the second order having the steps j) and k) are processed sequentially by the robot.

It is also of advantage if the first source container and second source container are transported to storage after the picking of the goods in accordance with the steps g) and h) and steps j) and k), independent of each other, provided that goods remain in the first source container and second source container after the goods removal.

It is also favorable if the first target container and second target container are transported into a sorting buffer after the picking of the goods in accordance with the steps g) and h) and steps j) and k), independent of each other, provided that different order lines are to be processed according to the first order and different order lines are to be processed according to second order.

Yet the object of the invention is also achieved by the measures in a further aspect of the invention and by the following steps:

a) acquiring of orders, each having one or multiple order lines, wherein each order line specifies at least one good by a type of good and a quantity (number of pieces) ordered, b) supplying a first source container to a first provisioning device having a first removal area for processing an order line according to a first order and supplying a second source container to a second provisioning device having a second removal area for processing an order line according to a second order using a source container conveying system operated in an automated manner, wherein the source containers stock different goods, c) provisioning the first source container at the first removal area and provisioning the second source container at the second removal area, d) transporting a first target container to a first provisioning device having a first loading area using a target container conveying system operated in an automated manner and provisioning a first target container at the first loading area to process an order line according to the first order, e) transporting a second target container to a second provisioning device having a second loading area using a target container conveying system operated in an automated manner and provisioning a second target container at the second loading area to process an order line according to a second order, f) ascertaining a gripping surface pose of a gripping surface for at least one of the goods in the first source container using a sensor system after the first source container has been provisioned at the first removal area and computing a gripping pose for the gripping unit on the basis of the ascertained gripping surface pose by a robot control, g) removing the good(s) from the first source container and placing the good(s) into the first target container by the gripping unit of the robot according to an order line of the first order, h) repeating the step f), provided that the order line according to the first order contains (a) good(s) of this type of good, again removing the good(s) from the first source container and placing the good(s) into the first target container by the gripping unit of the robot, i) ascertaining a gripping surface pose of a gripping surface for at least one of the goods in the second source container using a sensor system after the second source container has been provisioned at the second removal area and computing a gripping pose for the gripping unit based on the ascertained gripping surface pose by a robot control, j) removing the good(s) from the second source container and placing the good(s) into the second target container by the gripping unit of the robot according to an order line of the second order, k) repeating the step i), provided that the order line according to the second order contains (a) good(s) of this type of good, again removing the good(s) from the second source container and placing the good(s) into the second target container by the gripping unit of the robot, l) removing the first source container from the first removal area after processing the order line according to the first order and removing the second source container from the second removal area after processing the order line according to the second order, independent of each other, by the source container conveying system.

The advantages resulting from these steps according to the method become apparent from what has been said above.

It proves favorable if the removing of the first target container from the first loading area after processing the order line according to the first order and removing of the second target container from the second loading area after processing the order line according to the second order, takes place independent of each other, by the target container conveying system. The first target container is removed from the first loading area after the (complete) processing of an order line, the second target container is equally removed from the second loading area after the (complete) processing of an order line. Thus, the target containers versus orders alternate in a highly dynamic manner, so that a large number of target containers are accessed in a very short period of time.

Yet also of advantage is a measure according to which, for further processing the first order having a next order line and/or second order having a next order line, the steps are further carried out:

m) supplying a third source container to the first provisioning device having the first removal area for processing the next order line according to the first order and/or supplying a fourth source container to the second provisioning device having the second removal area for processing the next order line according to the second order using the source container conveying system operated in an automated manner, wherein the source containers stock different goods, n) provisioning the first target container at the first loading area during the supply of the third source container to process the next order line according to the first order, and/or provisioning the second target container at the second loading area during the supply of the fourth source container to process the next order line according to the second order, O) ascertaining a gripping surface pose of a gripping surface for at least one of the goods in the third source container with the help of a sensor system after the third source container has been provisioned at the first removal area and computing a gripping pose for the gripping unit on the basis of the ascertained gripping surface pose by a robot control, p) removing the good(s) from the third source container and placing the good(s) into the first target container by the gripping unit of the robot according to the next order line of the first order, q) repeating the step o), provided that the next order line according to the first order contains (a) good(s) of this type of good, again removing the good(s) from the third source container and placing the good(s) into the first target container by the gripping unit of the robot, r) and/or ascertaining a gripping surface pose of a gripping surface for at least one of the goods in the fourth source container with the help of a sensor system after the fourth source container has been provisioned at the second removal area, and computing a gripping pose for the gripping unit on the basis of the ascertained gripping surface pose by a robot control, s) and/or removing the good(s) from the fourth source container and placing the good(s) into the second target container by the gripping unit of the robot according to the next order line of the first order, t) repeating the step r), provided that the next order line according to the second order contains (a) good(s) of this type of good, again removing the good(s) from the fourth source container and placing the good(s) into the second target container by the gripping unit of the robot, u) removing the first target container from the first loading area after processing the order lines according to the first order and/or removing the second target container from the second loading area after processing the order lines according to the second order, independent of each other, by the target container conveying system.

According to this embodiment, the first target container and/or second target container is not removed from the first loading area/second loading area after each (complete) processing of an order line according to an order comprising multiple order lines. It is possible that any and all order lines of an order are processed before the first target container and/or second target container is/are removed from the first loading area/second loading area. Even though this is not to be understood as being mandatory, in this embodiment, the sorting buffer described above is obsolete, as the source containers are provisioned in an appropriate sequence at the first removal area and second removal area depending on the first target container to be processed and/or second target container.

First, the order line according to a first order or second order is processed completely. "Completely" in this context means that any and all goods for fulfilling this order line must have been placed in the respective first target container/second target container.

For example, the order line according to a first order is processed completely. Only after that is the step r) carried out and a gripping surface pose of a gripping surface for at least one good in the fourth source container ascertained. Hence, the gripping surface pose is ascertained only closely before a planned goods removal from the fourth source container. Subsequently, the order line according to a second order is processed and processed completely. After that is the step o) carried out and a gripping surface pose of a gripping surface for at least one good in the third source container ascertained. Hence, the gripping surface pose is ascertained only closely before a planned goods removal from the third source container.

In a particularly advantageous variant embodiment, the gantry robot comprises a gantry arm mounted at the third gantry slide so as to be rotatable about a first, vertical axis of rotation and movable via the fourth drive device, wherein the gripping unit is mounted at the gantry arm so as to be rotatable about a second, horizontal axis of rotation and movable via a fifth drive device. In this way, the advantages of a vertical axis of rotation and of a horizontal axis of rotation are combined. Consequently, the gripping unit can be moved particularly easily into an advantageous gripping pose. It is particularly advantageous in this case if the gantry arm is rotatable preferably by 360° (and in particular endlessly) about a vertical axis and height-adjustable in a vertical direction. The gantry arm can be moved in a perpendicular direction onto a bottom of a (source) container or (target) container, and the gripping unit can, if applicable, be rotated into an angular position to remove (a) good(s) from a (source) container and/or place (a) good(s) in a (target) container. The optimal gripping pose can therefore be achieved by the gantry arm remaining in its vertical position while the gripping unit is pivoted relative to the gantry arm. In other words, and this is of particular advantage, the gantry arm is rotated exclusively about the vertical direction (preferably by 360°) relative to the third gantry slide but not inclined relative to the vertical axis. This enables the gantry arm and the gripping unit to "dip" into a (source) container and/or (target) container very closely next to a side wall. Thus, even goods in the marginal region can be removed from a (source) container, which goods are otherwise very difficult to grip. For example, also goods leaning against a container wall can be gripped, hence goods which are lying in the marginal region and have a gripping surface aligned in a manner inclined relative to a horizontal line. The same applies when goods are to be placed in the marginal region into a (target) container.

In another favorable variant embodiment of the gantry robot, the latter comprises a gripper receptacle mounted at the gantry arm so as to be rotatable about the second, horizontal axis of rotation, to which gripper receptacle the gripping unit is attached. The gripper receptacle enables gripping units of different kinds to be attached to the gantry robot, wherein the gripping units are adjusted, respectively, to different gripping tasks.

It is also particularly advantageous if the gantry arm has a side wall which is offset backward relative to a maximum cross-sectional contour and which extends from the bottom end in a direction toward the top end and forms a substantially planar boundary surface. The backward-set boundary surface of the gantry arm enables the latter to be dipped into a container particularly closely to a container wall.

Advantageously, the gripping unit comprises a vacuum-suction gripper which forms a gripping surface or multiple vacuum-suction grippers which form a gripping surface. In particular, the gripping unit can comprise three vacuum-suction grippers which form a gripping plane. Because of the redundancy of the gripping means (i.e. because of the redundancy of the vacuum-suction grippers), goods can be seized by the gripping unit at a particularly low error rate. This means that a number of failed manipulations of goods in relation to a total number of manipulations of these goods is low. The proposed measures enable a gripping surface to be easily matched with a border surface of the good(s) when (a) good(s) is/are gripped. This means that the gripping surface comes into contact with the good(s) to be seized.

It is particularly advantageous in this context if the gripping unit comprises three vacuum-suction grippers arranged in a triangle, and at least one of the sides of a triangle at whose corner points the centers of the vacuum-suction grippers are located is aligned substantially parallel to a planar, vertical boundary surface of the gantry arm. The vacuum-suction grippers arranged in a triangle enable in particular goods having a planar boundary surface or multiple such boundary surfaces, for example boxes, to be easily captured. The at least one vertical boundary surface of the gantry arm aligned toward one of the sides of the triangle enables the gantry arm again to be dipped into a container particularly closely to a container wall. In particular, the gantry arm can have a round (circular) cross section which is oblate in the area of the vertical boundary surface. Yet it would also be conceivable that the gantry arm has a polygon-shaped cross section (in particular a rectangle-shaped cross section or triangle-shaped cross section). The substantially vertical boundary surface is then formed by a side surface of a polygon-shaped prism.

It is also particularly advantageous in the above context for a picking station to have a source container arranged at the at least one removal area and/or a target container arranged at the at least one loading area, wherein a dipping height, which is measured from the top end of the planar, vertical boundary surface of the gantry arm to the bottom end of the gripping unit, is larger than the 1.1-fold container height of the source container and/or of the target container. In this way, the gripping unit can be dipped down to the bottom of the container also in the area of the container wall.

It is also particularly advantageous if the picking station comprises at least one container drive
 - for rotating the at least one removal area (including a source container provisioned at it) and the at least one loading area (including a target container provisioned at it) about a vertical axis of rotation relative to the base frame of the gantry robot, and/or
 - for tilting the at least one removal area (including a source container provisioned at it) and the at least one loading area (including a target container provisioned at it) about a horizontal axis of rotation relative to the base frame of the gantry robot.

This enables the gripping unit to be likewise easily moved into an advantageous gripping pose for gripping goods, albeit by rotating the source container and/or target container relative to the gantry robot. If the source container and the target container can be rotated about a vertical axis of rotation, the gripping unit as such need not be mounted so as to be rotatable about a vertical axis of rotation relative to the third gantry slide. Equally, the gripping unit need not be mounted so as to be rotatable about a horizontal axis of rotation relative to the third gantry slide if the source container and the target container can be tilted about a horizontal axis of rotation.

It is further favorable if a source container conveying system for automated transporting of source containers and a target container conveying system for automated transporting of target containers is provided for the picking station, wherein the source container conveying system has a first provisioning device, which comprises a first removal area, and in another special embodiment has a first provisioning device, which comprises a first removal area, and a second provisioning device, which comprises a second removal area, and the target container conveying system has a first provisioning device, which comprises a first loading area, and in another special embodiment has a first provisioning device, which comprises a first loading area, and a second provisioning device, which comprises a second loading area.

In this way, the source containers and target containers can be automatically brought within the range of action of the gantry robot. In particular, the source container conveying system and/or the target container conveying system is/are configured such as it is described further above.

In another advantageous variant embodiment, the fully automated robot system comprises a sensor system, in particular a camera system, at least for capturing the goods in the first source container and, if applicable, in the second source container, provided that a second provisioning device is provided and a robot control, which is connected with the sensor system and controls the robot having the gripping unit. In this way, the picking process can run in a fully automatic manner. In particular, the proposed measures also enable a correction of potentially-occurring errors during the picking.

BRIEF DESCRIPTION OF THE DRAWINGS

For the purpose of a better understanding of the invention, the latter will be elucidated in more detail by means of the figures below.

In a strongly simplified, schematic depiction, each figure shows as follows:

FIGS. 5a to 5m a plan view of a sequence order of steps according to the method for the processing of a number of orders and the provisioning of the source containers and of the target containers at the picking station in accordance with a first embodiment;

FIGS. 6a to 6e a plan view of a sequence order of steps according to the method for the processing of a number of orders and the provisioning of the source containers and of the target containers at the picking station in accordance with a second embodiment;

FIG. 7 a combination of a picking station having automatic picking and a picking station having manual picking;

FIG. 11 the gantry robot of FIG. 10 viewed diagonally from the rear;

FIG. 13a the gantry arm of FIG. 12a with a gripping unit moved into different pivoted positions (for example ±45°), viewed from the left;

FIG. 13b the gantry arm of FIG. 13a viewed from the right; and

FIG. 14 the oblate gantry arm, which is dipped into a container close to a container wall.

DETAILED DESCRIPTION OF THE PREFERRED EMBODIMENTS

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, and these specifications of location are to be analogously transferred to the new position.

Figure 1:
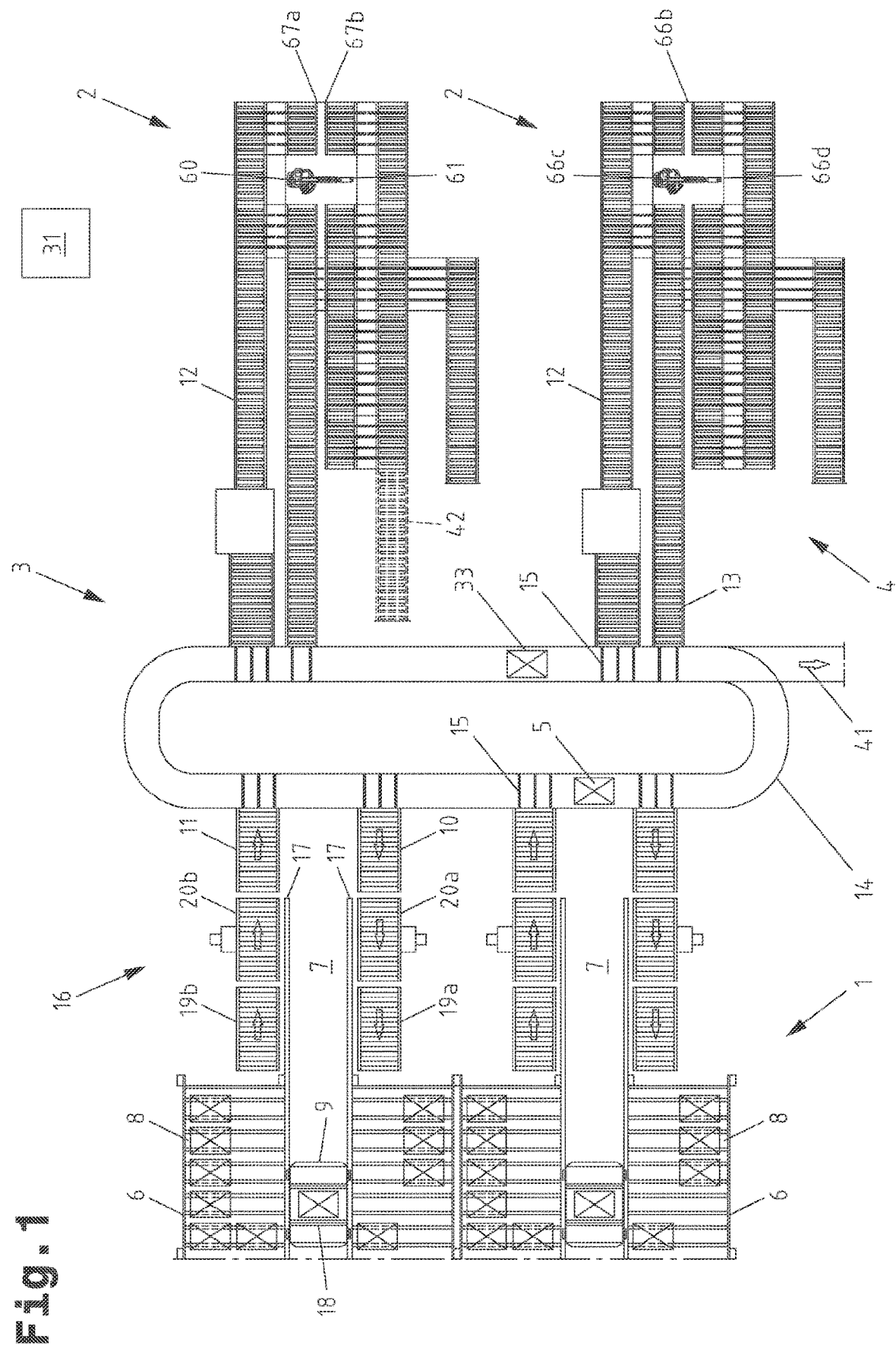
FIG. 1 a detail of a storage and picking system having a storage area and multiple picking stations.

FIG. 1 shows a storage and picking system for picking goods comprising a storage area 1 and one or multiple picking stations 2 for picking goods having a robot system, a source container distribution system 3 and a target container distribution system 4.

Within the scope of the invention, "(a) good(s)" is understood to mean in particular an individually-manipulatable object and/or an individually-manipulatable group of objects.

Figure 2:
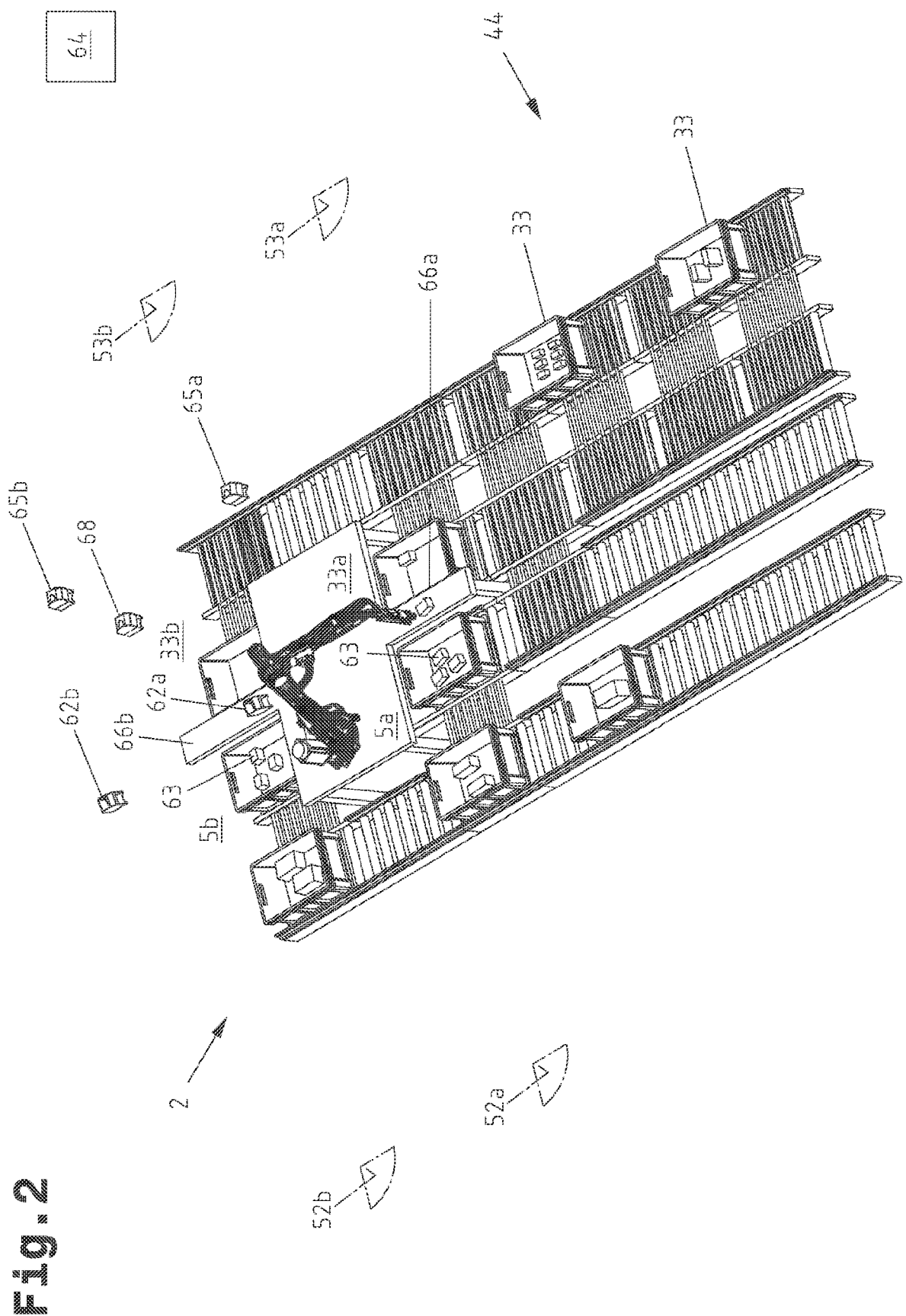
FIG. 2 a perspective view of a picking station for automated picking of goods and a detail of a source container distribution system and of a target container distribution system.

The storage area 1 shown by way of example serves especially the provisioning of a large number of source containers 5, in which goods A, B etc. depicted in FIG. 2, namely (storage) articles, are contained. The source containers 5 can contain, respectively, one single type of good. For example, a first source container 5a contains the good(s) A, a second source container 5b contains the good(s) B etc. On the other hand, the source containers 5 can be sub-divided into multiple accommodating compartments by separating walls and accommodate different types of good, wherein (a) good(s) A may be accommodated in the first accommodating compartment and (a) good(s) B may be accommodated in the second accommodating compartment. Segmented source containers 5 enable the range of goods in the storage area 1 to be increased.

It would also be conceivable in principle that the target containers are sub-divided into multiple accommodating compartments by separating walls and accommodate different orders, wherein a first order having one or multiple goods may be accommodated in the first accommodating compartment and a second order having one or multiple goods may be accommodated in the second accommodating compartment. Yet the target containers may also be designed without separating walls and accommodate different orders. Segmentation of the target containers enables the sorting buffer described below to be reduced in size, hence the number of sorting positions and buffer positions to be reduced.

The invention is not to be understood to be limited to containers. Rather, also other loading aids such as trays, cardboard boxes and suchlike may be used. The source container corresponds to a source loading aid and the target container corresponds to a target loading aid.

The storage area 1 comprises preferably a store operated in an automated manner. According to the exemplary embodiment shown, the storage area 1 comprises storage racks 6 arranged in parallel and a rack aisle 7 provided between the storage racks 6. Each storage rack 6 forms a plurality of storage locations 8 located next to one another in rack levels located on top of one another, at which storage locations 8 the source containers 5 are stored. Two storage racks 6 are depicted in the example shown. Yet, within the scope of the invention, also more than two storage racks 6 may be provided, wherein a rack aisle 7 is configured, respectively, between adjacent storage racks 6.

The source container distribution system 3 serves the transporting of source containers 5 between the storage area 1 and the picking station(s) 2. The source container distribution system 3 is preferably a source container distribution system operated in an automated manner. The retrieving of source containers 5 from the storage area 1 can be done in an automated manner and the transport of the source containers 5 from the storage area 1 to the picking station 2 can be done in an automated manner.

The source container distribution system 3 comprises, for example, one or multiple storage and retrieval units 9 and a source container conveying system between the storage area 1 and the picking stations 2 to transport source containers 5 from the storage area 1 to the respective picking stations 2 and to transport source containers 5 from the picking stations 2 to the storage area 1.

The source container conveying system between the storage area 1 and the picking stations 2 may, for example, comprise a first conveying device 10 for supplying source containers 5 to the storage area 1 and a second conveying device 11 for removing the source containers 5 from the storage area 1 and a third conveying device 12 for supplying source containers 5 to the picking station 2 and a fourth conveying device 13 for removing the source containers 5 from the picking station 2 and finally a fifth conveying device 14 for transporting source containers 5 between the conveying devices 10, 11, 12, 13. The fifth conveying device 14 comprises inward and/or outward transfer devices 15 to transport the source containers 5 between the conveying devices 10 to 14. The fifth conveying device 14 is, for example, a closed conveying loop. The inward and/or outward transfer device 15 is formed, for example, by a belt offset.

The source container distribution system 3 may additionally comprise a handover device 16 for transporting source containers 5 between the storage and retrieval unit 9 and the source container conveying system.

If single-level storage and retrieval units are used as the storage and retrieval unit 9 in the storage area 1, guide lanes 17 are arranged in pairs in (horizontal) travel planes located on top of one another. The guide lanes 17 are preferably attached to the adjacent storage racks 6. The single-level storage and retrieval units (shuttles) independently controllable by a control unit are movable along the rack aisle 7 and can be moved in front of the storage locations 8 in the travel planes located on top of one another.

The storage and retrieval unit 9 comprises a loading platform and a transport device 18 (load suspension device). The transport device 18 can manipulate the source containers 5 between the loading platform and the storage location 8, namely store source containers 5 into the storage racks 6 arranged at both sides of the storage and retrieval unit 9 and/or retrieve source containers 5 from the storage racks 6 arranged at both sides of the storage and retrieval unit 9. It may be provided that each rack level is allocated at least one storage and retrieval unit 9. Thus, one storage and retrieval unit 9 services one rack level via the transport device 18.

The storing and retrieving of source containers 5 by means of the storage and retrieval units 9, the handover device 16 and the conveying devices 10, 11 is described in detail in WO 2013/090970 A2.

The handover device 16 comprises a first buffering device 19a, a first lifting device 20a, a second buffering device 19b and a second lifting device 20b.

The buffering device 19a comprises provisioning devices per travel plane for interim-buffering one or multiple source containers 5 to be stored and the buffering device 19b comprises provisioning devices per travel plane for interim-buffering one or multiple source containers 5 to be removed. Also other variant embodiments are possible, as described in WO 2013/090970 A2.

The lifting devices 20a, 20b are installed fixed in place and comprise, respectively, a transfer device liftable and lowerable via a lifting drive. Preferably, the transfer devices are mounted, respectively, on a vertical mast and comprise, respectively, a drivable conveying device.

The source container distribution system 3 may comprise an optional rotary station 23, using which the source containers 5 transferred outward from the fifth conveying device 14 are rotated from a transverse alignment to a longitudinal alignment.

Figure 3:
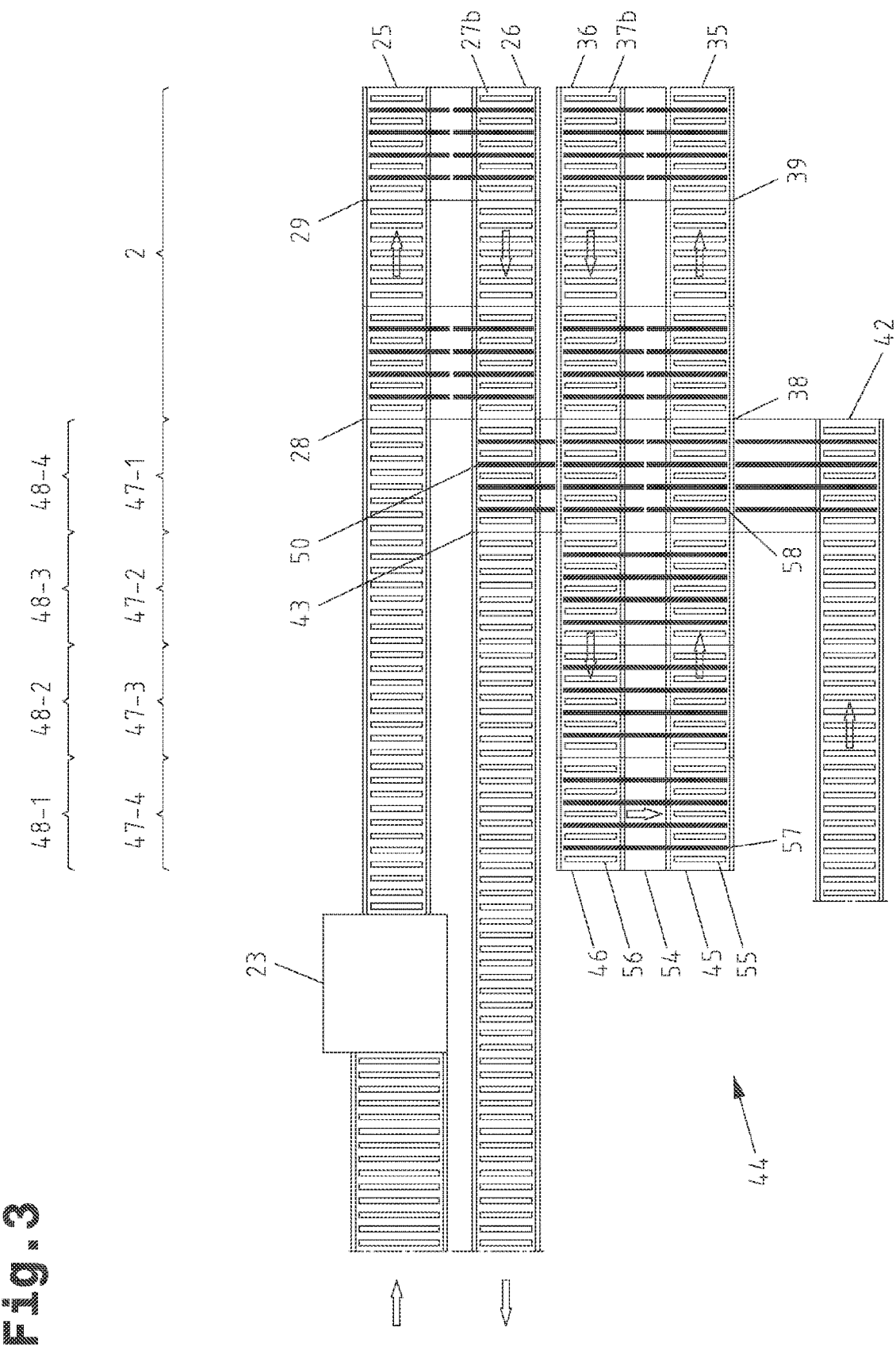
FIG. 3 a plan view of a source container conveying system and of a target container conveying system of the picking station and a detail of a source container distribution system and of a target container distribution system.

As shown in detail in FIG. 3, the picking station 2 comprises a source container conveying system for automated transporting of the source containers 5, in particular for supplying source containers 5 to a first provisioning device 24a and a second provisioning device 24b and for removing the source containers from the first provisioning device 24a and the second provisioning device 24b.

Figure 4:
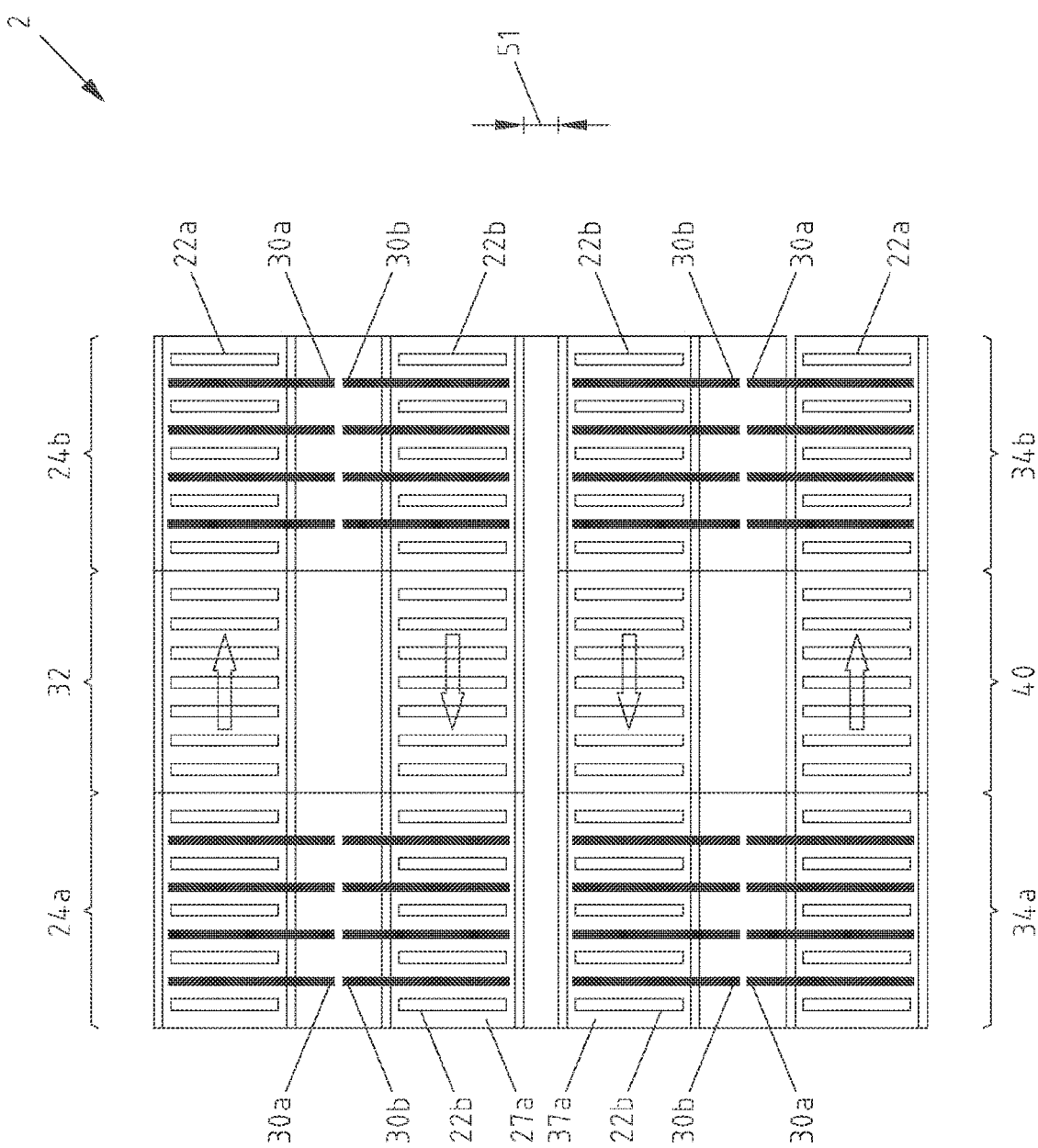
FIG. 4 a plan view of a source container conveying system and of a target container conveying system of the picking station.

The source container conveying system of the picking station 2 such as it is/they are depicted in FIGS. 3 and 4 comprise(s) a first conveying device 25 for supplying source containers 5a, 5b, the first provisioning device 24a for provisioning a first source container 5a, a second provisioning device 24b for provisioning a second source container 5b and a second conveying device 26 for removing the source containers 5a, 5b from the first provisioning device 24a and second provisioning device 24b. The first conveying device 25 and second conveying device 26 comprise, respectively, at least one conveying means 22a, 22b. The conveying means 22a is driven and coupled with a drive motor. The conveying means 22a has, for example, conveyor rollers mounted at a frame so as to be rotatable. The conveying means 22b is driven and coupled with a drive motor. The conveying means 22b has, for example, conveyor rollers mounted at a frame so as to be rotatable. According to the embodiment shown, the first conveying device 25 and second conveying device 26 are preferably formed by a roller conveyor and comprise a plurality of conveyor rollers, at least some of which are driven by a drive motor.

The first provisioning device 24a having the first removal area 27a and the second provisioning device 24b having the second removal area 27b are arranged along the second conveying device 26 and consecutively in the conveying direction (arrow).

The first provisioning device 24a is connected to the first conveying device 25 and comprises a first removal area 27a. Preferably, the first provisioning device 24a is connected to the first conveying device 25 via a first transfer device 28. A first source container 5a is supplied by the first conveying device 25 and subsequently transported to the first provisioning device 24a at the first removal area 27a by the first transfer device 28. Subsequently, the first source container 5a will be provisioned (standing) at the first removal area 27a.

The second provisioning device 24b is connected to the first conveying device 25 and comprises a second removal area 27b. Preferably, the second provisioning device 24b is connected to the first conveying device 25 via a second transfer device 29. A second source container 5b is supplied by the first conveying device 25 and subsequently transported to the second provisioning device 24b at the second removal area 27b by the second transfer device 29. Subsequently, the second source container 5b will be provisioned (standing) at the second removal area 27b.

According to the embodiment shown, the first transfer device 28 and second transfer device 29 comprise, respectively, a first conveying means 30a and a second conveying means 30b, which are formed, for example, by a first belt offset and second belt offset. Such belt offsets (and this also applies to the belt offsets mentioned elsewhere) have conveyor belts coupled with a drive motor, which are mounted at a lifting unit and form the conveying plane.

The conveyor belts of the first belt offset can be readjusted via the lifting unit between a lowered initial position, in which the conveyor belts are lowered below the conveying plane of the first conveying device 25 and a source container 5b is transported to the second transfer device 29 by the first conveying device 25, and a lifted conveying position, in which a source container 5a, 5b is lifted off the first conveying device 25 and conveyed via the conveyor belts in a manner transverse to the first conveying device 25.

The conveyor belts of the second belt offset can be readjusted via the lifting unit between a lifted conveying position, in which a source container 5a, 5b is taken over by the first belt offset and conveyed via the conveyor belts in a manner transverse to the second conveying device 26, and a lowered initial position, in which the conveyor belts are lowered below the conveying plane of the second conveying device 26 and a source container 5a, 5b is put down on the second conveying device 26.

The embodiments described of the first transfer device 28 and second transfer device 29 are by no means to be understood to be limiting. The first transfer device 28 and second transfer device 9 enable a transverse offset of a first source container 5a supplied on the first conveying device 25 and a transverse offset of a second source container 5b supplied on the first conveying device 25 to transport the first source container 5a to the first provisioning device 24a and the second source container 5a to the second provisioning device 24b.

In a preferred embodiment, the first provisioning device 24a having the first removal area 27a and the second provisioning device 24b having the second removal area 27b are configured at the second conveying device 26 for removing the source containers 5a, 5b. Specifically, the first provisioning device 24a having the first removal area 27a and the second provisioning device 24b having the second removal area 27b are formed by conveying sections at the second conveying device 26 for removing the source containers 5a, 5b. These conveying sections comprise, respectively, a conveying means 22b controllable and drivable by the control unit 31 (FIG. 1). The conveying means 22b comprises a plurality of conveyor rollers, at least some of which are driven by a drive motor.

The conveying means 22b of a first conveying section is controlled and driven by the control unit 31 to remove a first source container 5a from the first provisioning device 24a by the second conveying device 26 after the processing of an order line according to a first order. Equally, the conveying means 22b of a second conveying section is controlled and driven by the control unit 31 to remove a second source container 5b from the second provisioning device 24b by the second conveying device 26 after the processing of an order line according to a second order.

As marked in FIG. 4, a buffering device 32 having at least one buffer area is provided between the first provisioning device 24a having the first removal area 27a and the second provisioning device 24b having the second removal area 27b, at which buffering device 32 a second source container 5b can be buffered after the picking (after the processing of an order line according to a second order). The buffering device 32 is configured preferably at the second conveying device 26 for removing the source containers 5a, 5b.

Specifically, the buffering device 32 having the at least one buffer area is formed by a conveying section at the second conveying device 26 for removing the source containers 5a, 5b. This conveying section comprises a conveying means 22b (not marked) controllable and drivable by the control unit 31. The conveying means 22b comprises a plurality of conveyor rollers, of which at least some are driven by a drive motor. The conveying means 22b of said conveying section is controlled and driven by the control unit 31 to supply a second source container 5b from the second provisioning device 24b to the buffer area and remove a second source container 5b from the buffer area. The second source container 5b passes the first provisioning device 24a and is removed by the second conveying device 26.

The first conveying device 25 and the second conveying device 26 have opposing conveying directions, as indicated by the arrows in FIGS. 3 and 4. Preferably, the conveying means 22a of the first conveying device 25 are driven unidirectionally and the conveying means 22b of the second conveying device 26 are driven unidirectionally.

The picking station 2 is connected to the source container conveying system of the source container distribution system. Specifically, the first conveying device 25 of the picking station 2 adjoins the third conveying device 12 and the second conveying device 26 of the picking station 2 adjoins the fourth conveying device 13.

As shown in detail in FIGS. 3 and 4, the picking station 2 comprises a target container conveying system for automated transporting of the target containers 33, in particular for supplying target containers 33 to a first provisioning device 34a and a second provisioning device 34b and for removing the target containers 33 from the first provisioning device 34a and the second provisioning device 34b.

The target container conveying system of the picking station 2 comprise(s) a first conveying device 35 for supplying target containers 33, the first provisioning device 34a for provisioning a first target container 33a, a second provisioning device 34b for provisioning a second target container 33b and a second conveying device 36 for removing the target containers 33 from the first provisioning device 34a and second provisioning device 34b.

The first conveying device 35 and second conveying device 36 comprise, respectively, at least one conveying means 22a, 22b. The conveying means 22a is driven and coupled with a drive motor. The conveying means 22a has, for example, conveyor rollers mounted at a frame so as to be rotatable. The conveying means 22b is driven and coupled with a drive motor. The conveying means 22b has, for example, conveyor rollers mounted at a frame so as to be rotatable. According to the embodiment shown, the first conveying device 35 and second conveying device 36 are preferably formed by a roller conveyor and comprise a plurality of conveyor rollers, at least some of which are driven by a drive motor.

The first provisioning device 34a having the first loading area 37a and the second provisioning device 34b having the second loading area 37b are arranged along the second conveying device 36 and consecutively in the conveying direction (arrow).

The first provisioning device 34a is connected to the first conveying device 35 and comprises a first loading area 37a. Preferably, the first provisioning device 34a is connected to the first conveying device 35 via a first transfer device 38. A first target container 33a is supplied by the first conveying device 35 and subsequently transported to the first provisioning device 34a and to the first loading area 37a by the first transfer device 38. Subsequently, the first target container 33a will be provisioned (standing) at the first loading area 37a.

The second provisioning device 34b is connected to the first conveying device 35 and comprises a second loading area 37b. Preferably, the second provisioning device 34b is connected to the first conveying device 35 via a second transfer device 39. A second target container 33b is supplied by the first conveying device 35 and subsequently transported to the second provisioning device 34b and to the second loading area 37b by the second transfer device 39. Subsequently, the second target containers 33b will be provisioned (standing) at the second loading area 37b.

According to the embodiment shown, the first transfer device 38 and second transfer device 39 comprise, respectively, a first conveying means 30a and a second conveying means 30b, which are formed, for example, by a first belt offset and second belt offset. Such belt offsets (and this also applies to the belt offsets mentioned elsewhere) have conveyor belts coupled with a drive motor, which are mounted at a lifting unit and form the conveying plane.

The conveyor belts of the first belt offset can be readjusted via the lifting unit between a lowered initial position, in which the conveyor belts are lowered below the conveying plane of the first conveying device 35 and a target container 33b is transported from the first conveying device 35 to the second transfer device 39, and a lifted conveying position, in which a target container 33a, 33b is lifted off the first conveying device 35 and conveyed via the conveyor belts in a manner transverse to the first conveying device 35.

The conveyor belts of the second belt offset can be readjusted via the lifting unit between a lifted conveying position, in which a target container 33a, 33b is taken over by the first belt offset and conveyed in a manner transverse to the second conveying device 36 via the conveyor belts, and a lowered initial position, in which the conveyor belts are lowered below the conveying plane of the second conveying device 36 and a target container 33a, 33b is put down on the second conveying device 36.

The embodiments described of the first transfer device 38 and second transfer device 39 are by no means to be understood to be limiting. The first transfer device 38 and second transfer device 39 enable a transverse offset of a first target container 33a supplied on the first conveying device 35 and a transverse offset of a second target container 33b supplied on the first conveying device 35 to transport the first target container 33a to the first provisioning device 34a and the second target container 33a to the second provisioning device 34b.

In a preferred embodiment, the first provisioning device 34a having the first loading area 37a and the second provisioning device 34b having the second loading area 37b are configured at the second conveying device 36 for removing the target containers 33a, 33b. Specifically, the first provisioning device 34a having the first removal area 37a and the second provisioning device 34b having the second loading area 37b are formed by conveying sections at the second conveying device 36 for removing the target containers 33a, 33b.

These conveying sections comprise, respectively, a conveying means 22b controllable and drivable by the control unit 31 (FIG. 1). The conveying means 22b comprises a plurality of conveyor rollers, at least some of which are driven by a drive motor.

The conveying means 22b of a first conveying section is controlled and driven by the control unit 31 to remove a first target container 33a from the first provisioning device 34a by the second conveying device 36 after processing an order line according to a first order. Equally, the conveying means 22b of a second conveying section is controlled and driven by the control unit 31 to remove a second target container 33b from the second provisioning device 34b by the second conveying device 36 after processing an order line according to a second order.

As apparent in FIG. 4, a buffering device 40 having at least one buffer area is provided between the first provisioning device 34a having the first loading area 37a and the second provisioning device 34b having the second loading area 37b, at which buffering device 32 a second target container 33b can be buffered after the picking (after processing an order line according to a second picking order). The buffering device 40 is configured preferably at the second conveying device 36 for removing the target containers 33a, 33b.

Specifically, the buffering device 40 having the at least one buffer area is formed by a conveying section at the second conveying device 36 for removing the source containers 33a, 33b. This conveying section comprises a conveying means 22b controllable and drivable by the control unit 31.

The conveying means 22b comprises a plurality of conveyor rollers, at least some of which are driven by a drive motor. The conveying means 22b of said conveying section is controlled and driven by the control unit 31 to supply a second target container 33b from the second provisioning device 34b to the buffer area and remove a second target container 33b from the buffer area. The second target container 33b passes the first provisioning device 34a and is removed by the second conveying device 36.

The first conveying device 35 and the second conveying device 36 have opposing conveying directions, as indicated by the arrows in FIGS. 3 and 4. Preferably, the conveying means 22a of the first conveying device 35 are driven unidirectionally and the conveying means 22b of the second conveying device 36 are driven unidirectionally.

The picking station 2 is connected to a target container conveying system of the target container distribution system 4.

The target container distribution system 4 serves the transporting of completed target containers 33 between the picking station(s) 2 and a goods-out area, as indicated by the arrow 41 in FIG. 1, or the transport of partially-picked target containers 33 between a first picking station 2 and a second picking station 2. The target container distribution system 4 further serves the supplying of empty target containers 33 or partially-picked target containers 33 to the picking station(s) 2. The target container distribution system 4 is preferably a target container distribution system operated in an automated manner. The transport of said target containers 33 can be done in an automated manner.

The target container distribution system 4 comprises a target container conveying system. The target container conveying system may, for example, comprise a first conveying device 42 for supplying empty target containers 33 and/or partially-picked target containers 33 to the respective picking station(s) 2 and a second conveying device 43 for removing the partially-picked target containers 33 and/or completed target containers 33 from the respective picking station(s) 2. According to the embodiment shown, the first conveying device 42 and second conveying device 43 comprise, respectively, a transfer device.

As apparent in FIG. 3, the first conveying device 35 of the picking station 2 and the first conveying device 42 of the target container conveying system are connected in terms of conveyance. In addition, the second conveying device 36 of the picking station 2 and the second conveying device 43 of the target container conveying system are connected in terms of conveyance.

Optionally, the target container conveying system having their first conveying device 42 for supplying empty target containers 33 and/or partially-picked target containers 33 to the respective picking station(s) 2 may adjoin a sorting buffer 44 yet to be described in more detail (as marked by way of example in dashed lines in FIG. 1), so that empty target containers 33 and/or partially-picked target containers 33 are transported first into the sorting buffer 44 and subsequently, if applicable in a sorted state, to the respective picking station(s) 2. The first conveying device 42 may either adjoin the first conveying device 45 of the sorting buffer yet to be described in more detail or the second conveying device 46 of the sorting buffer yet to be described in more detail. In contrast to the depiction in FIG. 1, the first conveying device 42 may also adjoin the fifth conveying device 14 to supply empty target containers 33 and/or partially-picked target containers 33. The empty target containers 33 and/or partially-picked target containers 33 are handed over to a buffer position 47-4 and afterwards transported to the first loading area 37a or second loading area 37b or to a sorting position 48-1.

The conveying device 13 for removing the source containers 5 from the picking station 2 and the second conveying device 36 for removing the loaded target containers 33 from the picking station 2 are connected to a conveying means 50 via a third conveying device. The conveying means 50 is formed, for example, by a belt offset described above. The conveying means 50 is controlled by the control unit 31 to transfer the loaded target containers 33 outward from the target container conveying system onto the source container conveying system. According to the embodiment shown, for space-saving reasons, one single conveying device 13 is used for removing the loaded target containers 33 from the picking station 2 and for removing the source containers 5 from the picking station 2. Yet it would also be conceivable to use two separate conveying devices.

In this case, the picking station(s) 2 is/are connected to the source container conveying system to transport source containers 5 to the picking station(s) 2 on a conveying device 12 and remove source containers 5 from the picking station(s) 2 on a conveying device 13, and the picking station(s) 2 is/are connected to the target container conveying system to transport empty/partially-picked target containers 33 to the picking station(s) 2 on a conveying device 42 and remove partially-picked/completely-picked target containers 33 from the picking station(s) 2 on a conveying device 13, 30.

A particularly advantageous embodiment becomes apparent if the second conveying device 26 for removing the source containers 5a, 5b and the second conveying device 36 for removing the target containers 33a, 33b are arranged in parallel. The first provisioning device 24a having the first removal area 27a and the first provisioning device 34a having the first loading area 37a are arranged facing each other. In particular, the first provisioning device 34a having the first loading area 37a is arranged substantially mirroring, relative to an axis of symmetry, the first provisioning device 24a having the first removal area 27a. The axis of symmetry runs parallel to the conveying direction of the second conveying devices 26, 36.

The first provisioning device 24b having the second removal area 27b and the second provisioning device 34b having the second loading area 27b are arranged facing each other. In particular, the second provisioning device 34b having the second loading area 37b is arranged substantially mirroring, relative to an axis of symmetry, the first provisioning device 24b having the first removal area 27b. The axis of symmetry runs parallel to the conveying direction of the second conveying devices 26, 36.

It is also particularly advantageous that the second conveying device 26 for removing the source containers 5a, 5b and the second conveying device 36 for removing the target containers 33a, 33b are arranged at a distance 51 of a maximum of 400 mm.

As apparent in FIG. 2, the first provisioning device 24a having the first removal area 27a and the first provisioning device 34a having the first loading area 37a form, respectively, a (horizontal) provisioning plane 52a, 53a at the same height level. Equally, the second provisioning device 24b having the second removal area 27b and the second provisioning device 34b having the second loading area 37b form, respectively, a (horizontal) provisioning plane 52b, 53b at the same height level. The provisioning planes 52a, 53a and provisioning planes 52b, 53b are preferably located at the same height level.

As apparent in FIGS. 1 and 3, the picking station 2 adjoins the sorting buffer 44, which is configured to provision the target containers 33 to the first loading area 37a and second loading area 37b sorted in a sequence. The sequence of the target containers 33 is determined depending on the sequence in which the source containers 5 are provisioned at the first removal area 27a and second removal area 27b. The capturing of the sequence of the source containers 5 is done by the control unit 31, wherein route tracking systems (tracking system) which are known in principle are deployed, which can determine the location of each source container 5 along the transport path, or by (a) suitable sensor device(s) along the transport path.

The sorting buffer 44 is a sorting buffer operated in an automated manner. The transport of the target containers 33 in the sorting buffer 44 (in particular between the buffering and sorting positions 47, 48) and the sorting of the target containers 33 by the sorting buffer 44 is done in an automated manner.

The sorting buffer 44 comprises buffer positions 47 arranged consecutively in a dispensing direction (arrow from left to right) on a first conveying device 45 and sorting positions 48 arranged consecutively in a return direction (arrow from right to left) on a second conveying device 46 and third conveying devices 54 connecting the buffer positions 47 to the sorting positions 48. According to a preferred embodiment, the first conveying device 45 and second conveying device 46 are arranged in parallel, whereas the third conveying devices 54 are arranged perpendicular to the first conveying device 45/second conveying device 46. The dispensing direction of the requested target containers 33 on the first conveying device 45 and the return direction of the returned target containers 33 on the second conveying device 46 run in opposite directions.

The first conveying device 45 and the second conveying device 46 are connected to the first conveying device 35 and second conveying device 36 to convey the target containers 33 for processing different order lines according to at least one order inward from the sorting buffer 44 to the first loading area 34a or second loading area 34b and convey them outward from the first loading area 34a or second loading area 34b 35 to the sorting buffer 44.

The first conveying device 45 and second conveying device 46 comprise, respectively, conveying means 55, 56. For processing orders, the target containers 33 are transported to the first loading area 34a or second loading area 34b on the first conveying device 45 in the dispensing direction and in a sorted state by means of the conveying means 55. The conveying means 55 form a horizontal conveying plane. On the other hand, after a processing of orders, target containers 33 which still need goods according to orders can be transported to the sorting positions 48 on the second conveying device 46 in the return direction by means of the conveying means 56. The conveying means 56 form a horizontal conveying plane.

The conveying means 55, 56 comprise, respectively, conveyor rollers, for example, mounted at a frame so as to be rotatable and form, respectively, a gravity roller conveyor. At least one conveying means 55 for transporting the target containers 33 in the dispensing direction is allocated to the buffer positions 47 and at least one conveying means 56 for transporting the target containers 33 in the return direction is allocated to the sorting positions 48. The conveying means 55 is driven and coupled with a first drive motor. The conveying means 56 is driven and coupled with a second drive motor. According to the exemplary embodiment shown, each buffer position 47 comprises a conveying means 55 having multiple conveyor rollers, at least one conveyor roller of which is driven and coupled with a drive motor. In addition, each sorting position 48 comprises a conveying means 56 having multiple conveyor rollers, at least one conveyor roller of which is driven and coupled with a drive motor.

The drive motors are connected with the control unit 31, and the conveying means 55, 56 can be controlled separately by the control unit 31.

The third conveying devices 54 connect the buffer positions 47 and sorting positions 48 facing one another to dispense the target containers 33 from the sorting positions 48 to the buffer positions 47 in a manner time-controlled by the control unit 31 such that the target containers 33b leave the sorting buffer 44 already in a sorted sequence and are fed successively to the first loading area 34a and second loading area 34b in this sorted sequence. The third conveying devices 54 comprise, respectively, conveying means 57, 58. For processing orders, the target containers 33 are transported from the sorting positions 48 to the buffer positions 47 on the third conveying device 54 by means of the conveying means 57, 58. The conveying means 57, 58 form a horizontal conveying plane. The conveying means 57, 58 per third conveying device 54 is driven and coupled with a third drive motor.

As apparent from FIGS. 1 and 3, some of the buffer positions 47 and sorting positions 48 may be allocated, respectively, a joint conveying means 57. Otherwise, some of the buffer positions 47 and sorting positions 48 may be allocated a conveying means 58 per buffer position 47 and a conveying means 58 per sorting position 48.

The conveying means 57, 58 are formed, respectively, by a belt offset, for example, as described above. The conveyor belts can be readjusted via the lifting unit between a lifted conveying position, in which a target container 33 is lifted off a sorting position 48 and conveyed to a buffer position 47 via the conveyor belts, and a lowered initial position, in which the conveyor belts are lowered below the conveying plane of the conveying means 55, 56 and a target container 33 is transported from a first sorting position to a second sorting position by the conveying means 56 or a target container 33 is transported from a first buffer position to a second buffer position by the conveying means 55.

The conveying means 58 at the sorting position 48-4 and the conveying means 58 at the buffer position 47-1 may be operated bidirectionally.

The conveying means 55, 56, 57, 58 are controlled by the control unit 31 such that the target containers 33 in the sorting buffer 44 are sorted into a sequence which is determined depending on the sequence in which the source containers 5 are provisioned at the first removal area 27a and second removal area 27b, and that a source container 5a, 5b and a target container 33a, 33b according to an order arrive approximately simultaneously at the first/second removal area 27a, 27b and first/second loading area 37a, 37b.

The drive motors/actuating drives are connected with the control unit 31, and the conveying means 57, 58 can be controlled separately by the control unit 31.

As shown in FIG. 2, the picking station 2 comprises a fully automated robot system. The robot system comprises a robot 60 having a gripping unit 61 movable relatively compared to a robot base, by means of which gripping unit 61 goods A according to a first order are removed from the first source container 5a and placed into the first target container 33a and goods B according to a second order are removed from the second source container 5b and placed into the second target container 33b. It would also be conceivable that (a) good(s) A, B is/are needed according to different orders and the first target container 33a and second target container 33b are already provisioned. On the one hand, by means of the gripping unit 61, (a) good(s) A may first be removed from the first source container 5a and placed into the first target container 33a and afterwards (a) good(s) A may be removed, again, from the first source container 5a and placed into the second target container 33b. On the other hand, by means of the gripping unit 61, (a) good(s) B may first be removed from the second source container 5b and placed into the first target container 33a and afterwards (a) good(s) B may be removed, again, from the second source container 5b and placed into the second target container 33b.

A workspace of the robot 60 is designed such that the gripping unit 61 can access the first source container 5a, second source container 5b, first target container 33a and second target container 33b. The gripping unit 61 comprises preferably at least two vacuum-suction grippers, wherein each vacuum-suction gripper is controllable separately. In principle, the gripping unit 61 may even comprise only one vacuum-suction gripper.

According to the embodiment shown, the robot 60 is formed by an articulated-arm robot. Yet also a gantry robot is possible.

The robot system comprises, in addition, a sensor system 62a, 62b at least for capturing the goods A, B in the first source container 5a and second source container 5b. On the one hand, before the removal of (a) good(s) A from the first source container 5a, a gripping surface pose of a gripping surface 63 is captured by the sensor system 62a for at least one of the goods A in the first source container 5a. On the other hand, before the removal of (a) good(s) B from the second source container 5b, a gripping surface pose of a gripping surface 63 is captured by the sensor system 62b for at least one of the goods B in the second source container 5b. The sensor system 62a, 62b is connected with a robot control 64. According to the embodiment shown, the sensor system 62a, 62b comprises an image recognition device.

The sensor system 62a, 62b and/or the image recognition device comprises cameras which are arranged above the source containers 5a, 5b and configured, respectively, as a stereo camera. Therefore, the cameras capture a three-dimensional image at least of the source containers 5a, 5b and the goods A, B stored therein.

The robot control 64 computes a gripping pose for the gripping unit 61 on the basis of the ascertained gripping surface pose and controls the robot 61 and/or the gripping unit 61 pursuant to the gripping pose to remove (a) good(s) from the first/second source container 5a, 5b.

It proves also of advantage if a gripping surface pose and a gripping surface size of a gripping surface 63 of (a) good(s) A, B is ascertained with the help of a sensor system 62a, 62b. On the basis of the ascertained gripping surface pose and gripping surface size, a gripping pose for the gripping unit 61 can be computed, in which a maximum number of suction grippers are in contact with the gripping surface 63 of said good(s) A. The gripping unit 61 is moved into the computed gripping pose and the suction grippers being in contact or coming into contact with the gripping surface 63 of said good(s) A are activated to pick up the good A.

As marked in FIG. 2, the sensor system 65a, 65b may, in addition, capture an available holding capacity in the first target container 33a and second target container 33b. The holding capacity reduces as the number of goods A, B placed in the first target container 33a/second target container 33b increases. On the one hand, before the placing of the good(s) A, B into the first target container 33a, an available holding capacity is captured by the sensor system 65a and a placing pose for the gripping unit 61 computed by the robot control 64. The gripping unit 61 is moved into the computed placing pose and the good(s) A, B is/are placed in the first target container 33a/second target container 33b. On the other hand, before the placing of the good(s) A, B into the second target container 33b, an available holding capacity is captured by the sensor system 65b and a placing pose for the gripping unit 61 computed by the robot control 64. The sensor system 65a, 65b is connected with a robot control 64. According to the embodiment shown, the sensor system 65a, 65b comprises an image recognition device.

It should be pointed out at this point that, within the meaning of the invention, the term "placing (a) good(s) into a target container" is not to be understood to be limiting such that the good(s) is/are exclusively placed into the target container, but the good(s) may also be dropped into the target container. Particularly for soft goods, the "dropping" is particularly well-suited, as the former cannot be damaged and the gripping unit 61 can make shorter movements. In this case, the placing pose may also be referred to as dropping pose.

The sensor system 65a, 65b and/or the image recognition device comprises cameras, which are arranged above the target containers 33a, 33b and configured, respectively, as a stereo camera. Therefore, the cameras capture a three-dimensional image at least of the target containers 33a, 33b and the available holding capacity.

A "pose" is generally the combination of position and orientation in space. Accordingly, a "gripping surface pose" is the combination of position and orientation of the gripping surface of (a) good(s) and the "gripping pose" and "placing pose" is the combination of position and orientation of the gripping unit 61.

Generally, a "gripping surface" of (a) good(s), which serves to grip said good(s) using the gripping unit 61, may have a random form and be, for example, polygon-shaped (in particular rectangular), circular or ellipse-shaped or even be formed by a free-form surface.

It should further be pointed out that the goods in the source containers 5 may be arranged next to one another, on top of one another, standing or lying down, hence disordered (chaotic) and/or in random positions.

As apparent in FIGS. 1 and 2, a holding plate 66a is arranged above the second conveying device 26 for removing the source containers 5a, 5b and second conveying device 36 for removing the target containers 33a, 33b. The holding plate 66a is arranged between the first provisioning device 24a having the first removal area 27a and the first provisioning device 34a having the first loading area 37a and comprises a first access opening 67a (vertically) above the first removal area 27a and a second access opening 67b (vertically) above the first loading area 37a. Equally, a holding plate 66b is arranged above the second conveying device 26 for removing the source containers 5a, 5b and second conveying device 36 for removing the target containers 33a, 33b. The holding plate 66b is arranged between the second provisioning device 24b having the second removal area 27b and the second provisioning device 34b having the second loading area 37b and comprises a first access opening 67a (vertically) above the second removal area 27b and a second access opening 67b (vertically) above the second loading area 37b.

In the area of the first/second removal area 27a, 27b and first/second loading area 37a, 37b, respectively, the holding plate 66a and the holding plate 66b cover substantially the distance 51 between the second conveying device 26 and second conveying device 36.

Even though the robot system works highly reliably, it cannot be excluded that (a) good(s) A, B picked up at the gripping unit 61 is/are inadvertently lost on the movement between the first/second removal area 27a, 27b and first/second loading area 37a, 37b. The good(s) A (inadvertently) dropped off the gripping unit (as marked in FIG. 2 by way of example in dashed lines) do(es) not fall on the floor or onto the second conveying devices 26, 36, but come(s) into a lying position on the holding plate 66a/holding plate 66b.

It may furthermore prove of advantage if a holding plate 66c is additionally arranged above the second conveying device 26 for removing the source containers 5a, 5b between the first provisioning device 24a having the first removal area 27a and the second provisioning device 24b having the second removal area 27b. This holding plate 66c extends parallel to the conveying direction of the second conveying device 26 for removing the source containers 5a, 5b and adjoins the holding plates 66a, 66b. Equally, a holding plate 66d is arranged above the second conveying device 36 for removing the target containers 33a, 33b between the first provisioning device 34a having the first loading area 37a and the second provisioning device 34b having the second loading area 37b. This holding plate 66d extends parallel to the conveying direction of the second conveying device 36 for removing the target containers 33a, 33b and adjoins the holding plates 66a, 66b. The holding plate 66c or holding plate 66d may simultaneously serve as an assembly gantry for the robot 60.

As described above, (a) good(s) A may be removed from the first source container 5a and placed into the second target container 33b or (a) good(s) B may be removed from the second source container 5b and placed into the first target container 33a. In this process, (a) good(s) A, B picked up at the gripping unit 61 may be lost on a diagonal movement between the first/second removal area 27a, 27b and first/second loading area 37a, 37b. The good(s) A, B (inadvertently) dropped off the gripping unit do(es) not fall on the floor or onto the second conveying devices 26, 36, but come(s) into a lying position on the holding plate 66c/holding plate 66d.

As apparent in FIGS. 1 and 2, the holding plates 66a . . . 66c are formed by one single holding plate.

To enable automated "troubleshooting," it may be provided that the sensor system is also configured for capturing (a) good(s) A, B which dropped off the gripping unit 61 after the removal from the first/second source container 5a, 5b and before the placing into the first/second target container 33a, 33b (and/or on the movement of the gripping unit 61 between the first/second removal area 27a, 27b and first/second loading area 37a, 37b) and is lying on the holding plate 66a . . . 66d. The robot control 64 can control the robot 60 and/or the gripping unit 61 such that the latter picks up said good(s) A, B and places it/them back into the first source container 5a or second source container 5b or places it/them into the first target container 33a or second target container 33b in accordance with the intended purpose. In the example shown, the good(s) A is/are to be placed into the first target container 33a.

The capturing of the good(s) A, B on the holding plate 66a . . . 66d can be done by the already existing sensor system 62a, 62b and/or sensor system 65a, 65b. Alternatively or additionally, also a sensor system 68 (as marked in dashed lines) may be provided above the holding plate 66a . . . 66d, by means of which sensor system 68 (an) (inadvertently) dropped-off good(s) A, B can be captured on the holding plate 66a . . . 66d. The sensor system 68 is connected with a robot control 64. According to the embodiment shown, the sensor system 68 comprises an image recognition device.

The sensor system 68 and/or the image recognition device comprises one or multiple cameras, which are arranged above the holding plate 66a . . . 66d and are configured, respectively, as a stereo camera. Therefore, the camera(s) capture(s) a three-dimensional image at least of the good(s) A, B on the holding plate 66a . . . 66d.

With the help of the sensor system 62a, 62b; 65a, 65b; 68, a gripping surface pose of a gripping surface 63 of the dropped-off good(s) A, B is ascertained. On the basis of the ascertained gripping surface pose, a gripping pose for the gripping unit 61 can be computed to pick up said good(s) A, B on the gripping unit 61. The gripping unit 61 is moved into the computed gripping pose and the suction grippers which are in or come into contact with the gripping surface 63 of said good(s) A are activated to pick up said good(s) A, B.

It should further be noted that the sensor system may have not only cameras but may, alternatively or additionally, also comprise a spatial-depth sensor, a laser scanner and/or an ultrasonic sensor. With the help of these sensors, in particular a three-dimensional image of the goods A, B can be captured.

In the jointly-described FIGS. 5a to 5m, a method for picking goods at a picking station 2 is described, at which orders are processed. For reasons of better clarity, the robot system and the conveying means 22a, 22b, 55, 56 of the source container conveying system and/or target container conveying system are not marked. Also the robot 60 and gripping unit 61 are not depicted. An order may also be processed in partial orders at one single picking station 2. Otherwise, the orders or partial orders of the orders may also be processed at multiple picking stations 2. In this case, a target container 33 is first fed to a first picking station 2 and at least one good is picked. Afterwards, the target container 33 is fed to a second picking station 2 and at least one good is picked. In other words, the order cannot be processed completely at one single picking station 2 and the target container 33 is transported to the second picking station 2 via the fifth conveying device 14 (FIG. 1) after the partial picking in the first picking station 2.

For the sake of simplicity, reference will henceforth be made to "orders." An order may also be understood to mean a picking order. A sales order comprises at least one order. The orders are on hand as data sets. The orders are electronically acquired at a computer (not depicted) and are transmitted to the control units 31, 64. Each order comprises one or multiple order lines. If the order specifies multiple order lines, different goods are needed. Each order line has at least specifications on a number of pieces of (an) ordered good(s) and on a type of good.

In the exemplary embodiment depicted in accordance with FIGS. 5a to 5m, a first order comprises a first order line, for example 2 pieces of the good(s) A, and a second order line, for example 1 piece of the good(s) H. A second order comprises a single order line, for example 1 piece of the good(s) B. A third order comprises a first order line, for example 1 piece of the good(s) N (which is/are already in the target container 33d), and a second order line, for example 2 pieces of the good(s) D and a third order line, for example 4 pieces of the good(s) O. A fourth order comprises a first order line, for example 2 pieces of the good(s) C, and a second order line, for example 3 pieces of the good(s) P. A fifth order comprises a first order line, for example 1 piece of the good(s) F. A sixth order comprises a first order line, for example 1 piece of the good(s) E and a second order line, for example 3 pieces of the good(s) Q.

For processing (new) orders for the first time, empty target containers 33a, 33b, 33c and 33e are fed via the conveying device 42. The empty target containers 33a, 33b, 33c and 33e are identified and data of an empty target container 33a, 33b, 33c and 33e assigned to an acquired order.

The transport of the identified and empty target containers 33a, 33b, 33c and 33e to the first loading area 34a and second loading area 34b is done by the conveying device 42 and in the picking station 2 by the first conveying device 35 and the transfer devices 38, 39. For example, the first target container 33a is provisioned at the first loading area 34a for processing the first order line according to a first order and the second target container 33*b* is provisioned at the second loading area 34*b* for processing the order line according to a second order.

In the sorting buffer 44, target containers 33 are temporarily buffered which need goods according to more than one order line and already contain a first order line, for example the target containers 33*d*, 33*f*. Hence, at least one good, respectively, was already placed into the target containers 33. Yet some target containers 33 (not depicted) may also be empty which are fed via the conveying means 42 adjoining the sorting buffer 44.

The source containers 5*a* . . . 5*h* are removed from the storage area 1 in a disordered (chaotic) sequence and conveyed inward to the first removal area 24*a* and second removal area 24*b* in a disordered (chaotic) sequence. Preferably, the source containers 5*a* . . . 5*h*, respectively, stock one single type of good. They are referred to as so-called "single-type-of-good" source containers 5*a* . . . 5*h*. In the exemplary embodiment shown, the first source container 5*a* contains the good(s) A, the second source container 5*b* contains the good(s) B, the third source container 5*c* contains the good(s) C etc.

Typically, a number of orders are to be processed at the picking station 2, and some orders are contained which comprise more than one order line. As a consequence of this, the target containers 33 allocated to these orders (for example the target containers 33*a*, 33*c*, 33*d*) must be provisioned at the first and second loading areas 37*a*, 37*b* multiple times and in a sequence which is determined depending on the sequence in which the source containers 5*a* . . . 5*h* are provided at the first and second removal areas 24*a*, 24*b*. This is illustrated, for example, by means of the target container 33*a*, which contains 2 pieces of the good(s) A according to a first order line and 1 piece of the good(s) H according to a second order line.

In the sorting buffer 44, target containers 33 according to different orders can be at the sorting positions 48-1 to 48-4 and target containers 33 according to different orders, for example one target container, at the buffer position 47-4 to 47-1.

Figure 5D:
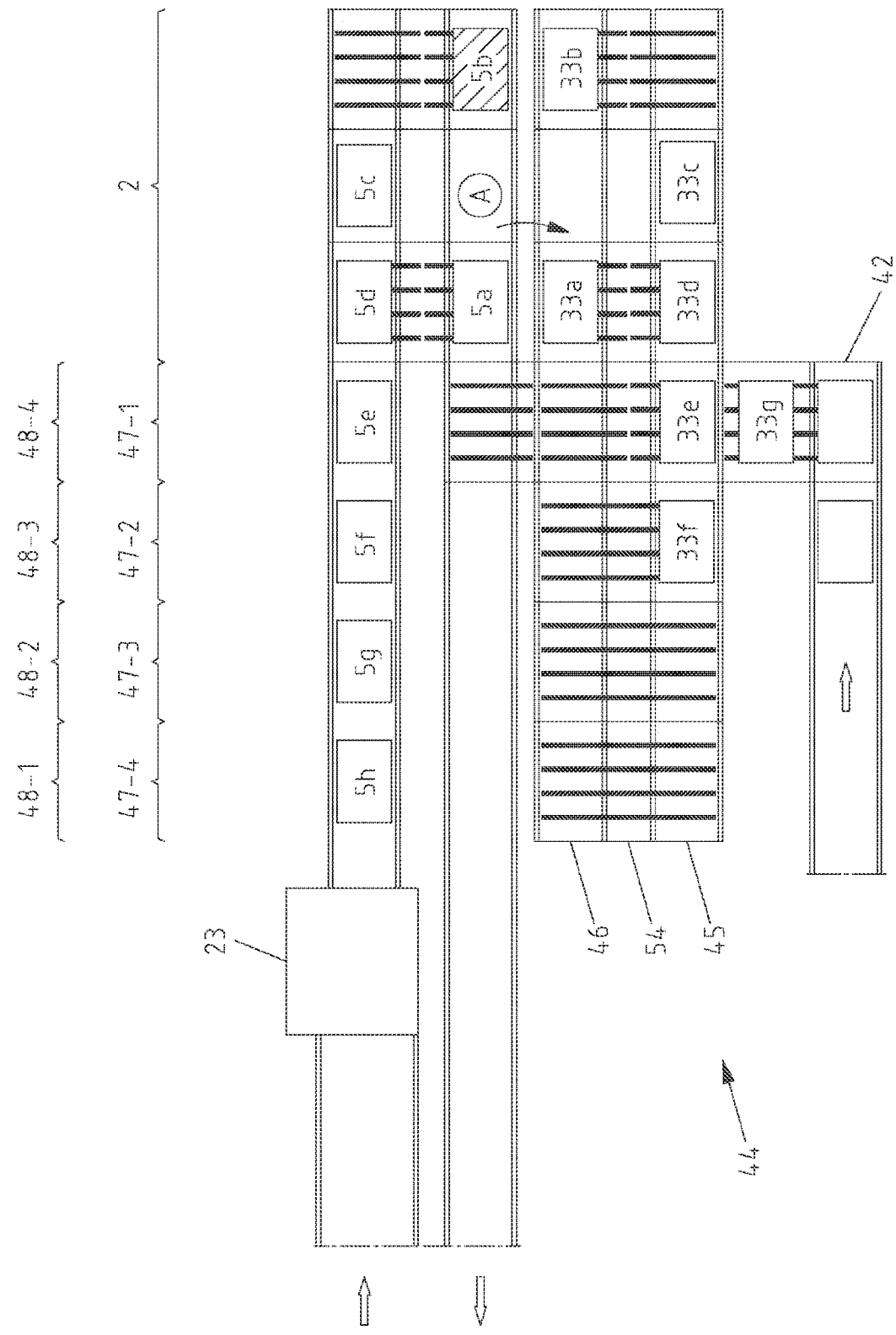
Figure 5E:
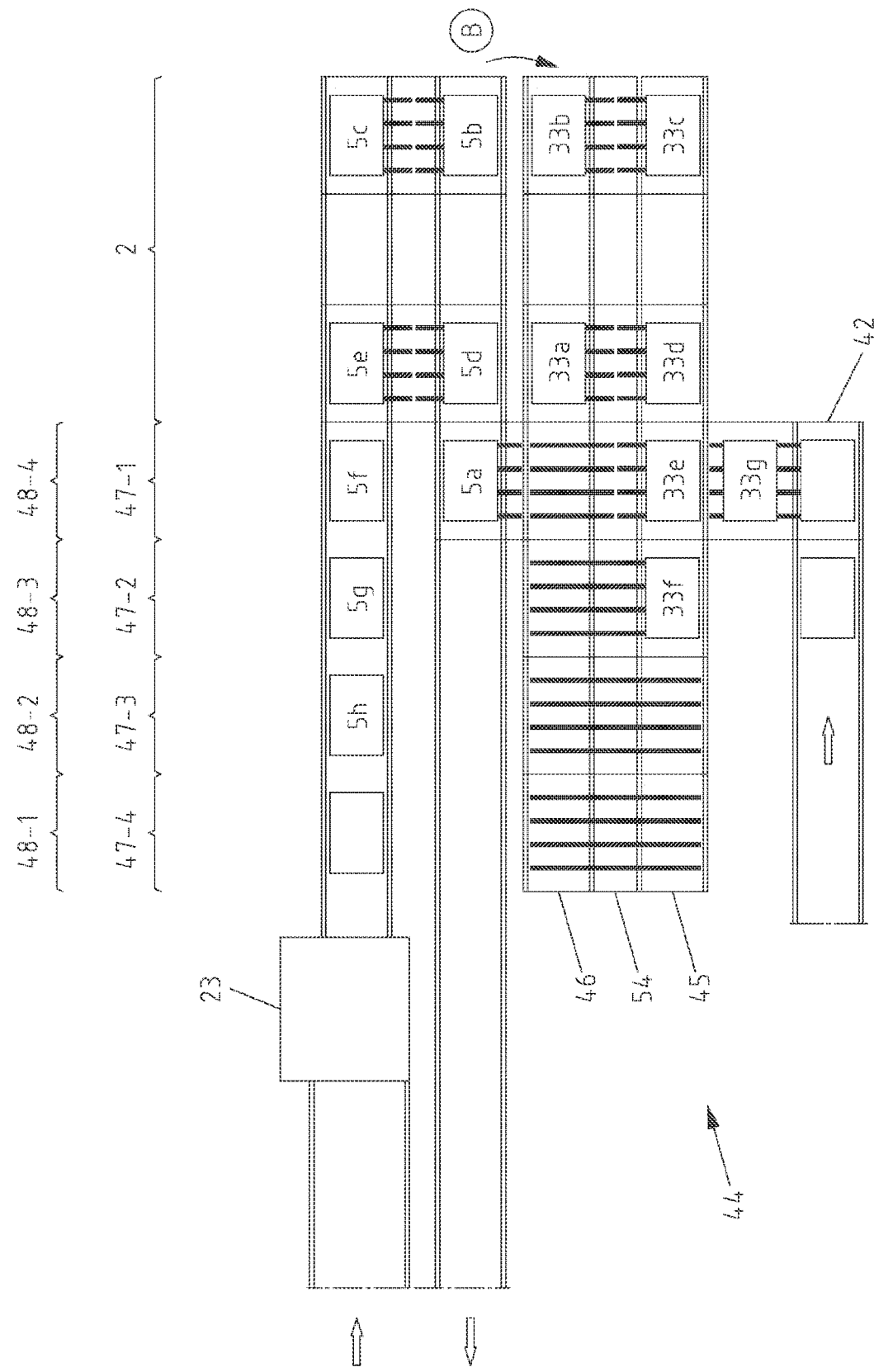
Figure 5F:
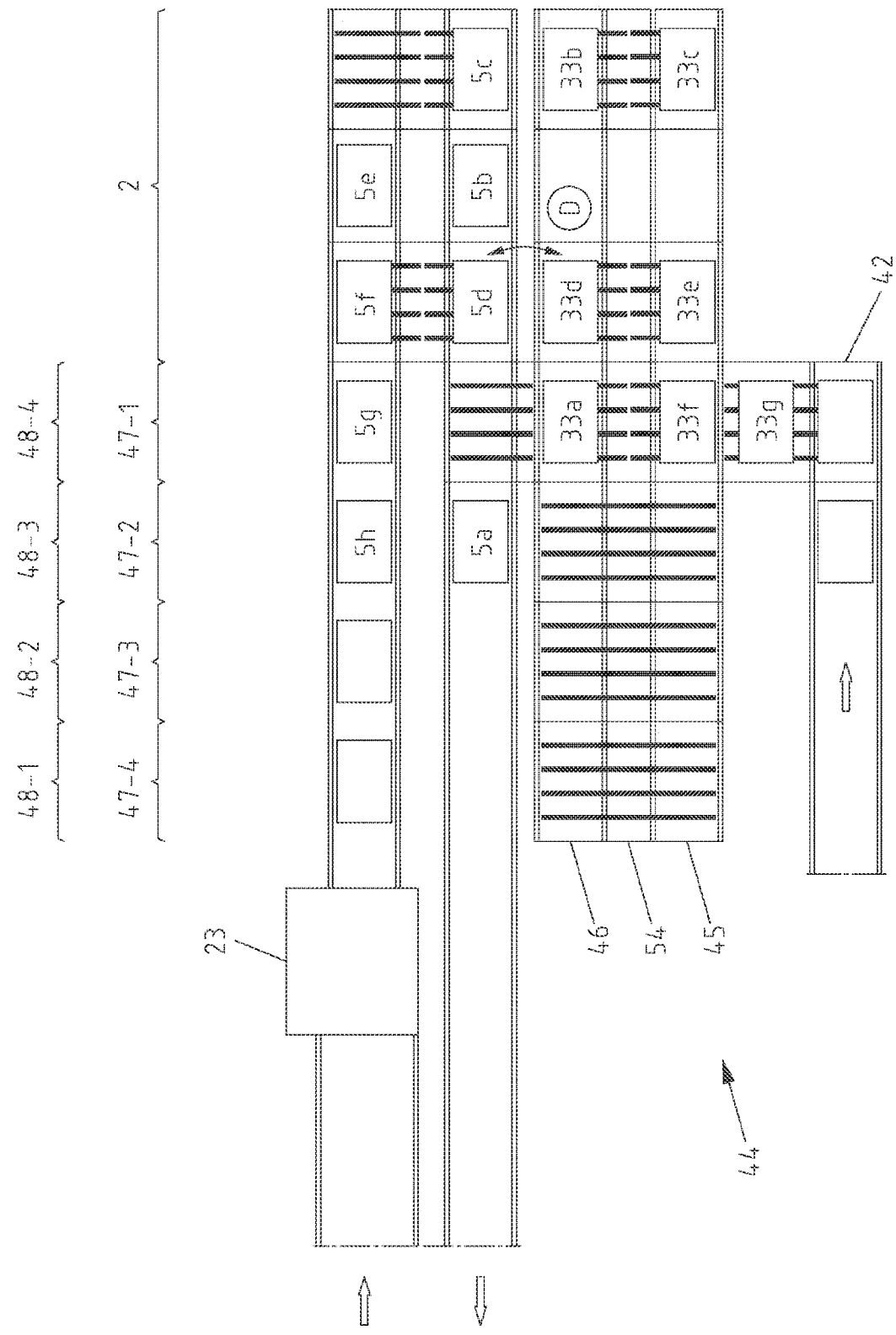
Figure 5A:
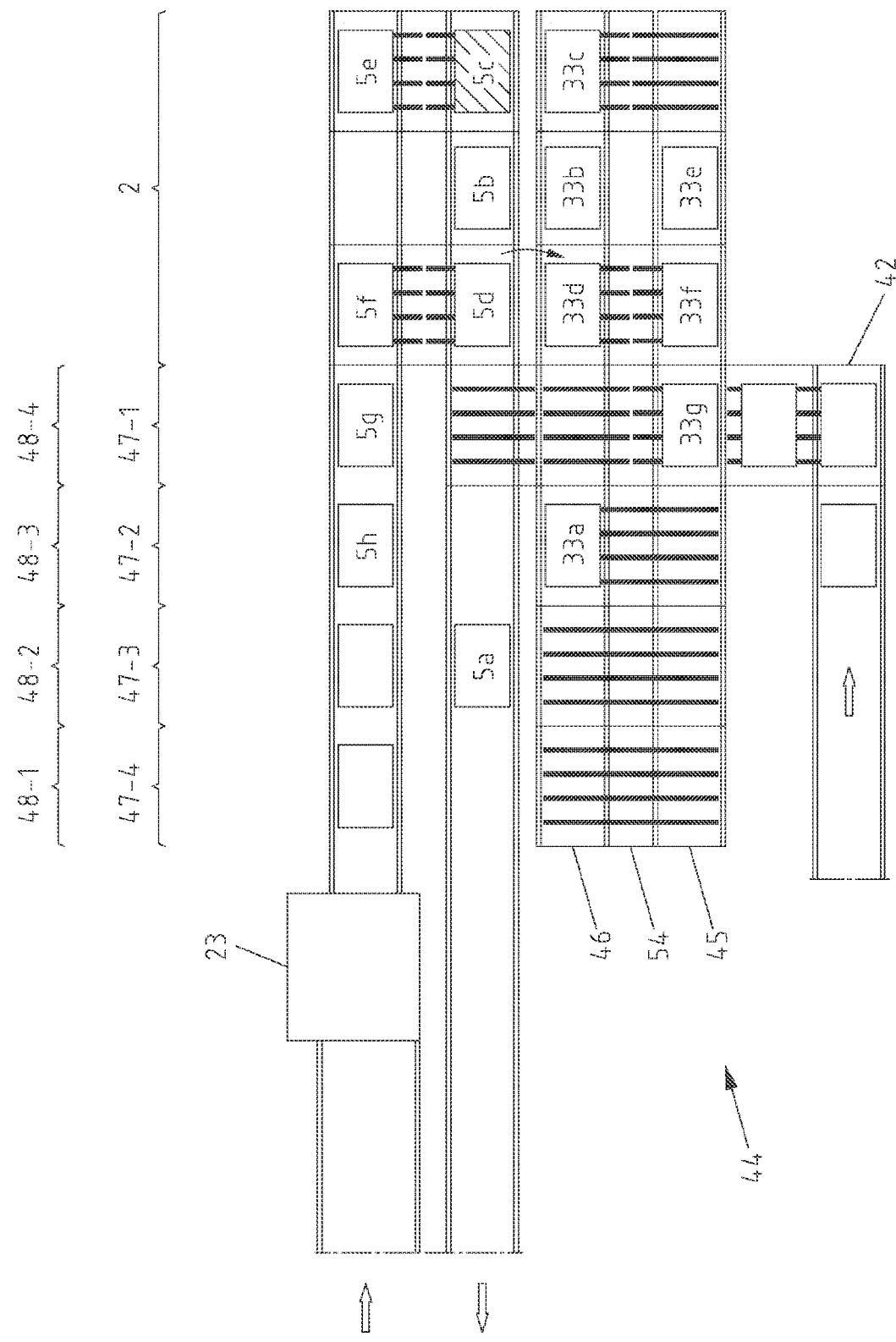

As apparent in FIGS. 5*f*-5*g*, a previously-processed target container 33*a* is transported by the second conveying device 36 from the first loading area 37*a* back into the sorting buffer 44 and to a sorting position 48-3 determined by the control unit 31, as a second order line is yet to be processed. The source container 5*a* is removed from the first removal area 24*a* and stored back into the storage area 1 on the source container conveying system. Equally, a previously-processed target container 33*c* may be transported by the second conveying device 36 from the second loading area 37*b* back into the sorting buffer 44 and to a sorting position 48-1 to 48-4 determined by the control unit 31, as a second order line is yet to be processed. The source container 5*c* is removed from the second removal area 24*b* and stored back into the storage area 1 on the source container conveying system.

Figure 5H:
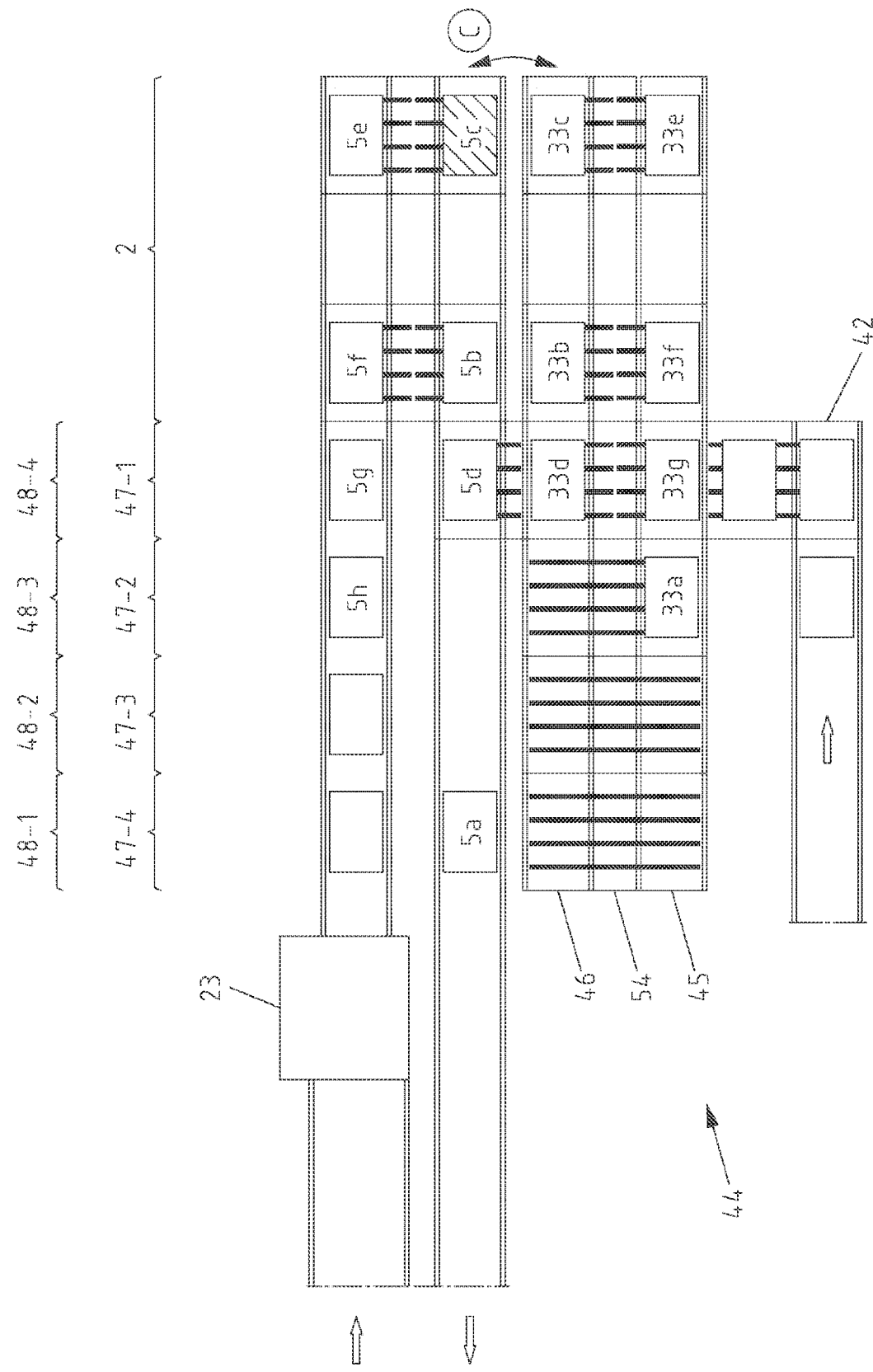
Figure 5J:
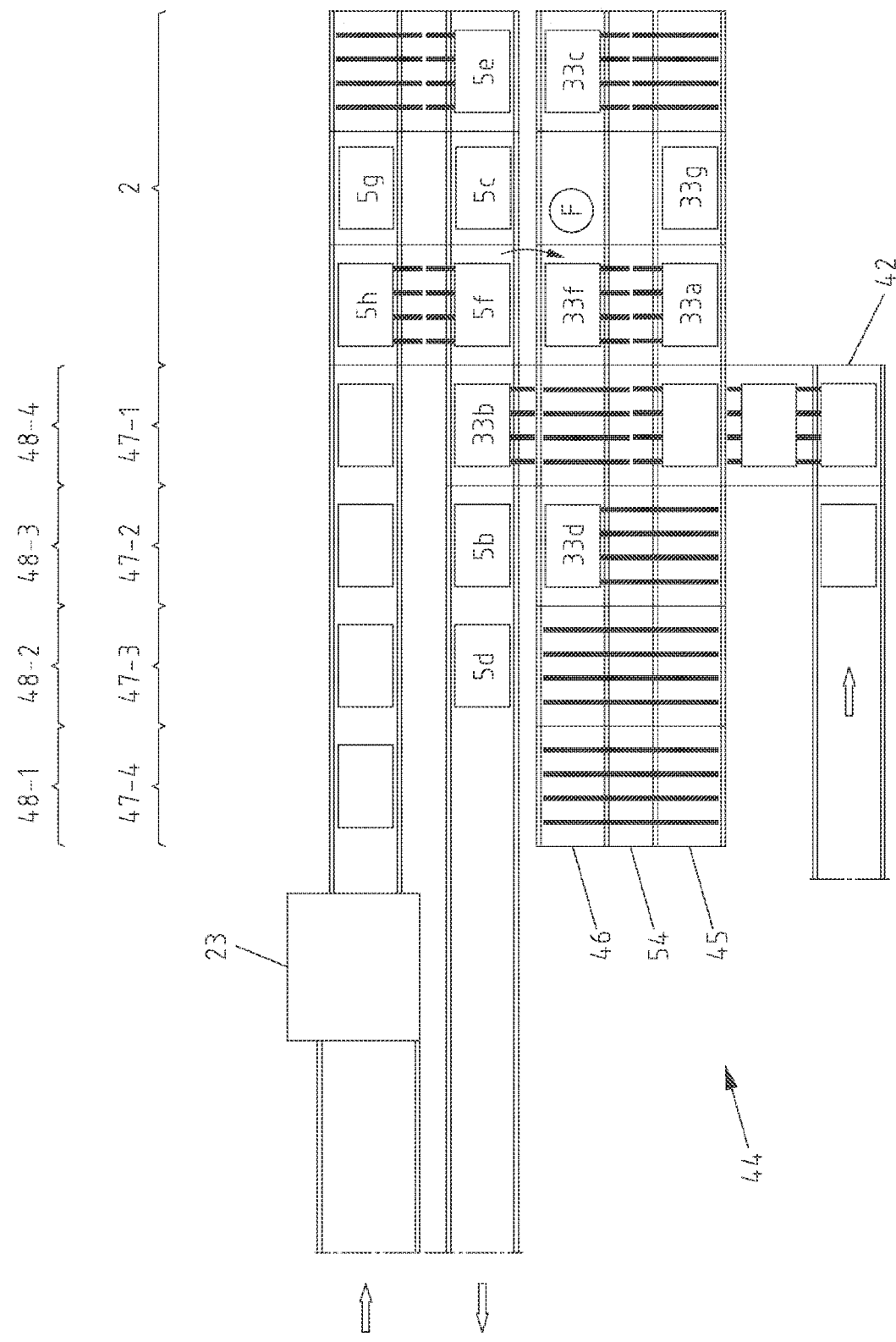
Figure 51:
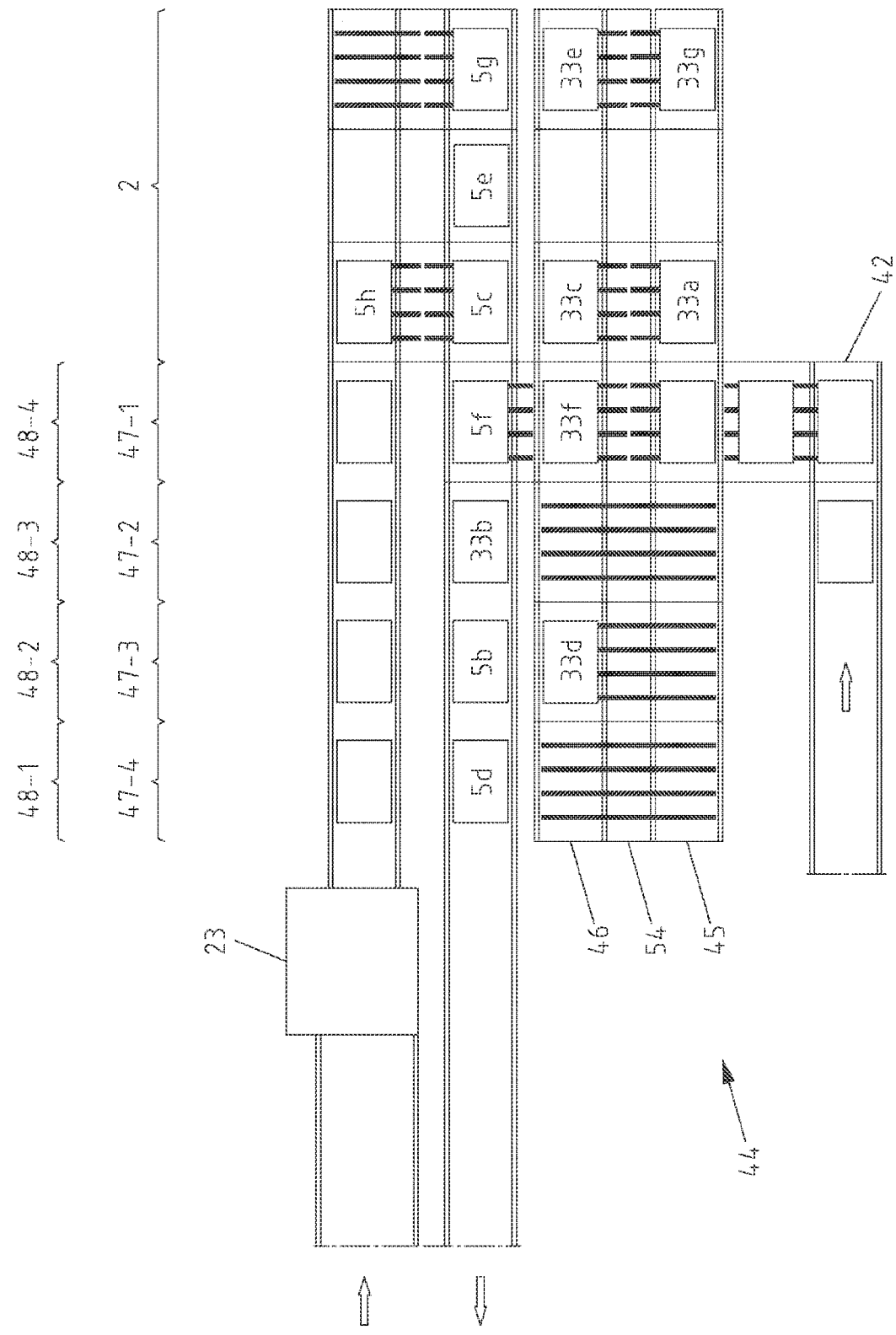
Figure 5M:
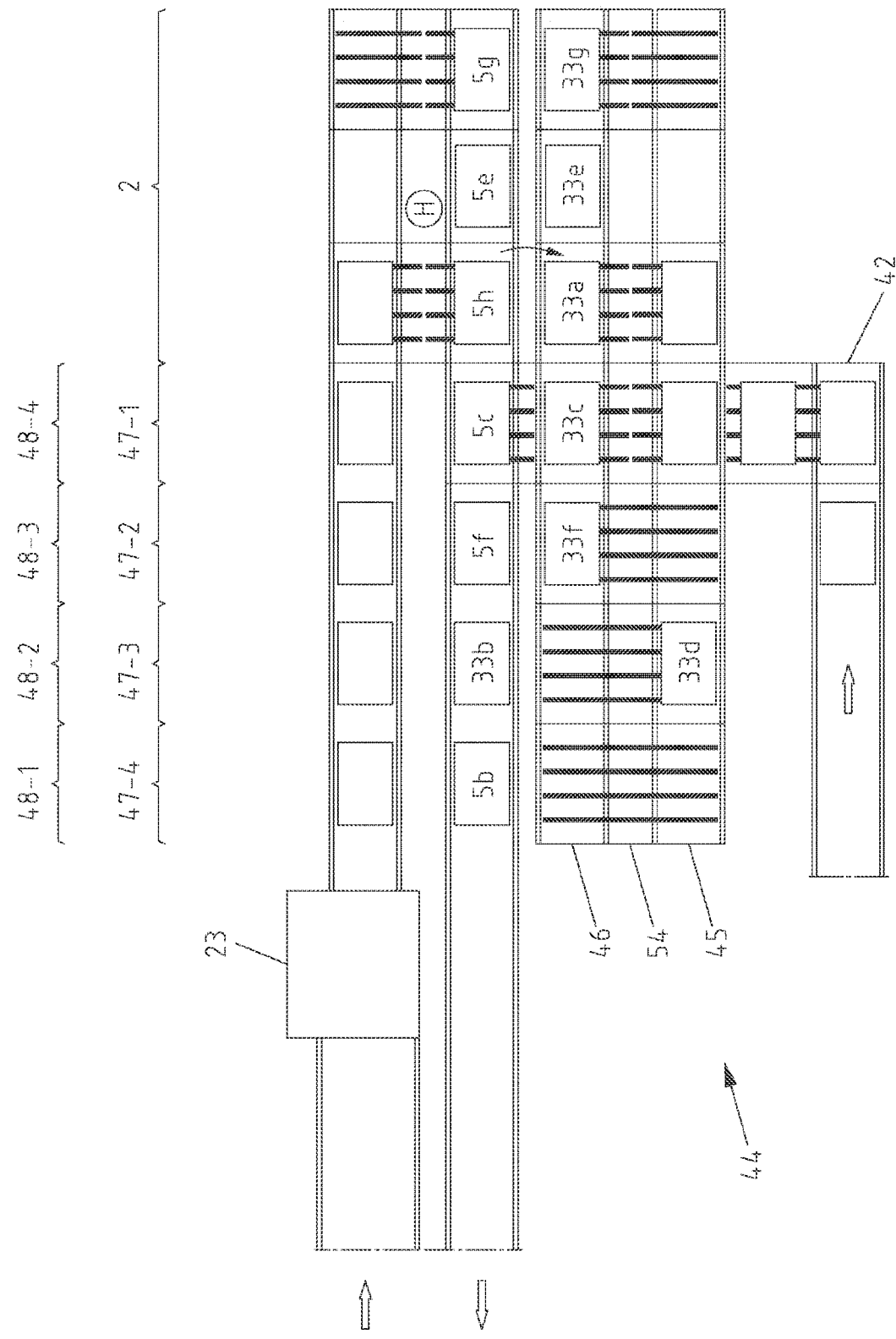

As apparent in FIG. 5*h*, the target container 33*a* may be transported from the sorting position 48-3 to one of the buffer positions 47-2 determined by the control unit 31 immediately after the target container 33*a* has been transported into the sorting buffer 44, after the source container 5*h* with the good(s) H is already being supplied to the picking station 2 for the second order line. The transport of the target container 33*a* from one of the sorting positions 48-3 to one of the buffer positions 47-2 is done by means of the conveying means 57 of any one of the third conveying devices 54. The transport of the target container 33*a* along the sorting positions 48-4 and 48-3 is done by means of the conveying means 56 of the second conveying device 46. The transport of the target container 33*a* along the buffer positions 47-2 and 47-1 is done by means of the conveying means 55 of the first conveying device 45. Therefore, the target containers 33 can be transported in the sorting buffer 44 in parallel along the sorting positions 48-4 to 48-1 and along the buffer positions 47-1 to 47-4. It is also possible for a target container 33 previously transported to one of the sorting positions 48-4 to 48-1 to be moved past a target container 33 subsequently transported to the sorting positions 48-4 to 48-1.

Thus, a sorting process is carried out by the sorting buffer 44 via the buffer positions 47-1 to 47-4 and/or sorting positions 48-4 to 48-1.

In contrast to this, a previously-processed target container 33*b* is transported from any one of the first and second loading areas 34*a*, 34*b*, for example the second loading area 37*a*, to the conveying device 13 for removing the target containers 33 from the picking station 2 via the second conveying device 36 and the conveying device 43, as apparent in FIGS. 5*f*-5*j*. Preferably, also the source containers 5 are removed from the picking station 2 by the conveying device 13.

A possible sorting function of the sorting buffer 44 can thus be described as follows:

for processing different order lines according to at least one order, a first target container 33 is transported back into the sorting buffer 44 after the placing of (a) good(s) according to a first order line and is buffered temporarily at a first sorting position 48 at least until a source container 5 with (a) good(s) according to a second order line is conveyed inward to the picking station 2 in a conveying device 12 for supplying source containers 5 provided upstream of the picking station 2 (in particular of the first removal area 24*a* and second removal area 24*b*), and said first target container 33 can be moved from the first sorting position 48 to any one of the buffer positions 47 and afterwards to either one of the first and second loading areas 34*a*, 34*b* after the source container 5 with (a) good(s) according to a second order line has been transported onto the conveying device 12 for supplying source containers 5 to the picking station 2, and for processing different order lines according to at least one order, a second target container 33 is transported back into the sorting buffer 36 after the placing of (a) good(s) according to a first order line and is moved via a second sorting position 48 to any one of the buffer positions 47 and afterwards to first and second loading areas 34*a*, 34*b*, provided that a source container 5 with (a) good(s) according to a second order line has already been transported to the picking station 2 in a conveying device 12 for supplying source containers 5 provided upstream of the picking station 2 (in particular of the first removal area 24*a* and second removal area 24*b*).

As soon as the source containers 5 are on the conveying device 12 and are transported by same, the previously-captured (chaotic) sequence will no longer be modified.

A first embodiment of a method for fully automated picking of different goods A . . . H from source containers 5*a* . . . 5*h* into target containers 33*a* . . . 33*g* by a robot 60 having a gripping unit 61 in accordance with orders is described below. This method for fully automated picking can particularly easily be used at the picking station 2 described above.

The method comprises at least the following steps:

a) acquiring orders having, respectively, one or multiple order lines, wherein each order line specifies at least one good according to its type of good and the number of pieces ordered, b) supplying a first source container 5a for a first picking order and supplying a second source container 5c for a second picking order on a first conveying device 25 and transporting the first source container 5a from the first conveying device 25 to a first provisioning device 24a having a first removal area 27a and transporting the second source container 5c from the first conveying device 25 to a second provisioning device 24b having a second removal area 27b (see FIGS. 5a-5f), c) provisioning the first source container 5a at the first removal area 27a (see FIG. 5b) and provisioning the second source container 5c at the second removal area 27b (see FIG. 5f), d) transporting a first target container 33a to a first provisioning device 34a having a first loading area 37a and provisioning a first target container 33a at the first loading area 37a to process an order line according to a first order (see FIGS. 5a-5b), e) transporting a second target container 33b to a second provisioning device 34b having a second loading area 37b and provisioning a second target container 33b at the second loading area 37b to process an order line according to a second order (see FIGS. 5b-5g), f) ascertaining a gripping surface pose of a gripping surface 63 (FIG. 2) for at least one of the goods A in the first source container 5a with the help of a sensor system 62a, in particular an image recognition device having a camera system, after the first source container 5a has been provisioned at the first removal area 24a and computing a gripping pose for the gripping unit 64 on the basis of the ascertained gripping surface pose by the robot control 64 (see FIG. 5b—hatching of the first source container 5a symbolizes the preceding ascertaining of a gripping surface pose), g) removing said good(s) A from the first source container 5a and placing said good(s) A into the first target container 33a by the gripping unit 61 of the robot 60 in accordance with the first order (see FIG. 5c—arrow symbolizes the first removal and the placing of (a) first good(s) A), h) repeating the step f), provided that the order line according to the first order contains (a) good(s) A of this type of good, again removing said good(s) A from the first source container 5a and placing said good(s) A into the first target container 33a by the gripping unit 61 of the robot 60 (see FIG. 5c—hatching of the first source container 5a symbolizes the repeated ascertaining of a gripping surface pose and see FIG. 5d—arrow symbolizes the second removal and the renewed placing of (a) first good(s) A), i) ascertaining a gripping surface pose of a gripping surface 63 for at least one of the goods C in the second source container 5c with the help of a sensor system 62b, in particular an image recognition device having a camera system, after the second source container 5c has been provisioned at the second removal area 24b, and computing a gripping pose for the gripping unit 64 on the basis of the ascertained gripping surface pose by the robot control 64 (see FIG. 5g—hatching of the second source container 5c symbolizes the preceding ascertaining of a gripping surface pose), j) removing said good(s) from the second source container 5c and placing said good(s) into the second target container 33c by the gripping unit 61 of the robot 60 in accordance with the second order (see FIG. 5h—arrow symbolizes the first removal and the placing of (a) first good(s) C), k) repeating the step i), provided that the order line according to the second order contains (a) good(s) C of this type of good, again removing said good(s) C from the second source container 5c and placing said good(s) C into the second target container 33c by the gripping unit 61 of the robot 60 (see FIG. 5h—hatching of the second source container 5b symbolizes the repeated ascertaining of a gripping surface pose and see FIG. 5i—arrow symbolizes the second removal and the renewed placing of (a) second good(s) C), l) removing the first source container 5a from the first removal area 24a after processing the order line according to the first order and removing the second source container 5c from the second removal area 24b after processing the order line according to the second order, independent of each other, by a second conveying device 26, m) removing the first target container 33a from the first loading area 34a after processing the order line according to the first order and removing the second target container 33c from the second loading area 34b after processing the order line according to the second order, independent of each other, by a second conveying device 36.

In step c), the provisioning of the first source container 5a is done at the first removal area 27a and the provisioning of the second source container 5c is done at the second removal area 27b, which may substantially be done at the same time or at different times.

The transport of the first and second target containers 33a, 33c in the steps d) and e) may be done at the same time or at different times. Equally, the transport of the first and second target containers 33a, 33c in the steps d) and e) and the supply of the first and second source containers 5a, 5c in the step b) may be done at the same time or at different times. Yet it is expedient that the supply of the first and second source containers 5a, 5c to the first and second removal areas 24a, 24b and the transport of the target containers 33a, 33c to the first and second loading areas 34a, 34b are coordinated such that a source container 5a, 5c and a target container 33a, 33c according to an order arrive approximately simultaneously at the removal area 24a, 24b and loading area 34a, 34b.

In the step h), a gripping surface pose is ascertained repeatedly if (a) good(s) A of this type of good is needed, once again, according to the first order. Hence, the first order comprises an order line, for example with at least 2 pieces of the good(s) A. Therefore, step h) is carried out before each new removal of (a) good(s) A from the first source container 5a. After the first removal of said good(s) A from the first source container 5a and as soon as the robot 60 and/or the gripping unit 61 have traveled out of the capture range of the sensor system 62a, the sensor system 62a can repeatedly carry out a capturing of the good(s) A in the first source container 5a and repeatedly ascertain a gripping surface pose. If the sensor system 62a is a camera system (of an image recognition device), the repeated capturing of the good(s) A in the first source container 5a can be done when the robot 60 and/or the gripping unit 61 has been moved out of the image capture range.

In the step k), a gripping surface pose is ascertained repeatedly if (a) good(s) C of this type of good is needed, once again, according to the second order. Hence, the second order comprises an order line, for example with at least 2 pieces of the good(s) C. Therefore, step k) is carried out before each new removal of (a) good(s) C from the second source container 5c. After the first removal of said good(s) C from the second source container 5c and as soon as the robot 60 and/or the gripping unit 61 have traveled out of the capture range of the sensor system 62b, the sensor system 62b can repeatedly carry out a capturing of the good(s) C in the second source container 5c and repeatedly ascertain a gripping surface pose. If the sensor system 62b is a camera system (of an image recognition device), the repeated capturing of the good(s) C in the second source container 5c can be done when the robot 60 and/or the gripping unit 61 has been moved out of the image capture range.

Therefore, the step f) can be carried out during the processing of the order line (for example with at least 2 pieces of the good(s) A) according to the first order in accordance with the steps g) and h) and the step i) can be carried out during the processing of the order line (for example with at least 2 pieces of the good(s) C) according to the second order in accordance with the steps j) and k).

It should also be pointed out that the step h) and/or the step k) is only carried out if the order needs an order line with at least 2 goods A, C. If the order needs more than 2 goods for an order line, the step h) and/or step k) is repeated. If, in contrast, the order comprises an order line with one single good, for example the good B (see FIGS. 5d, 5e), the step h) and/or step k) is obsolete. In the example shown, this means specifically that only the step f) and/or step i) is carried out, namely ascertaining a gripping surface pose of a gripping surface 63 for at least one of the goods B in the second source container 5b with the help of a sensor system 62b, in particular an image recognition device having a camera system, as soon as the second source container 5b has been provisioned at the second removal area 24b (see FIG. 5d—hatching of the second source container 5b symbolizes the single ascertaining of a gripping surface pose).

In the step m), the removing of the first target container 33a from the first loading area 34a after processing the order line according to the first order and removing of the second target container 33c from the second loading area 34b after processing the order line according to the second order are done independent of each other by a second conveying device 36. If there is no further order line according to the first order/second order to be processed in this picking station 2, the first target container 33a/second target container 33c may be removed from the picking station 2 by the target container conveying system (conveying devices 13, 43) (see, for example, target container 33b). If, in contrast, another order line according to the first order/second order is to be processed in this picking station 2, the first target container 33a/second target container 33c is transported into the sorting buffer 44 described above so as to be able to be fed, once again, to the first loading area 34a/second loading area 34b (see, for example, target container 33a).

In the step i), the removing of the first source container 5a from the first removal area 27a and removing of the second source container 5c from the second removal area 27b is done, which may substantially be done at the same time or at different times.

In the step m), the removing of the first target container 33a from the first loading area 37a and removing of the second target container 33c from the second loading area 37b is done, which may be done at different times.

The removing of the first source container 5 (for example source container 5a) from the first removal area 24a after processing the order line according to the first order and the removing of the first target container 33 (for example target container 33a) from the first loading area 34a after processing the order line according to the first order may be done at different times or synchronously (simultaneously), as depicted in FIGS. 5a-5m. The removing of the second source container 5 (for example source container 5c) from the second removal area 24b after processing the order line according to the second order and the removing of the second target container 33 (for example target container 33c) from the second loading area 34b after processing the order line according to the second order may be done at different times or synchronously (simultaneously), as depicted in FIGS. 5a-5m.

According to one embodiment, it is provided that the first order having the steps f) to h) and the second order having the steps i) to k) are processed sequentially by the robot 60/the gripping unit 61.

In this case, it proves of advantage if the step i) is carried out after the (complete) processing the order line according to the first order and during the movement of the robot 60/the gripping unit 61 from the first target container 33a to the second source container 5c. The robot control 64 receives from the sensor system 62b the gripping surface pose of a gripping surface 63 for at least one of the goods C in the second source container 5c, preferably shortly before the robot 60/the gripping unit 61 has reached the second source container 5c. The step f) is carried out after the (complete) processing of the order line according to the second order during the movement of the robot 60/the gripping unit 61 from the second target container 33c to the first source container 5a. The robot control 64 receives from the sensor system 62a the gripping surface pose of a gripping surface 63 for at least one of the goods A in the first source container 5a, preferably shortly before the robot 60/the gripping unit 61 has reached the first source container 5a.

As is easily apparent from FIG. 4, the first provisioning device 24a and second provisioning device 24b are arranged in a conveying direction of the second conveying device 26, spaced apart from each other by a distance. This distance may be defined by the buffering device 32 and amounts to at least the container dimension (length of the container parallel to the conveying direction). Yet this distance may also correspond to a multiple of the container dimension.

Equally, also the first provisioning device 34a and second provisioning device 34b are arranged in a conveying direction of the second conveying device 36, spaced apart from each other by a distance.

The seeming performance disadvantage by the arranging in series of the steps f) to h) and steps i) to k) for processing different orders is compensated for by the higher picking performance, which is achieved by the short robot movements/gripping unit movements between the first source container 5 and first target container 33 or second source container 5 and second target container 33. The short robot movements/gripping unit movements result from the compact construction of the picking station 2, in particular by the small distance 51 between the second conveying devices 26, 36. In addition, this bears the advantage that the control flows can be designed in a simpler manner.

In a particular application, different order lines according to a first order may be processed such that the first target container 33a is first loaded with (a) good(s) A from the first source container 5a and afterwards with (a) good(s) C from the second source container 5c without meanwhile removing the first target container 33a from the first loading area 37a and newly supplying it to the first loading area 37a. In equal measure, different order lines according to a second order may be processed such that the second target container 33c is first loaded with (a) good(s) C from the second source container 5c and afterwards with (a) good(s) A from the first source container 5a without meanwhile removing the first target container 33a from the second loading area 37b and newly supplying it to the second loading area 37b. In this case, the sorting buffer 44 described above would not necessarily be required or is even obsolete. There is a "diagonal movement" of the robot 60/the gripping unit 61 between the first/second removal area 27a, 27b and first/second loading area 37a, 37b).

Here, it proves of advantage if the step i) is carried out after removal of (a) good(s) A for an order line according to the second order during the movement of the robot 60/the gripping unit 61 from the first source container 5a to the second target container 33c. The step f) is carried out after removal of (a) good(s) C for an order line according to the second order during the movement of the robot 60/the gripping unit 61 from the second source container 5c to the first target container 33a.

In this case, it proves of advantage if the step i) is carried out after the processing of an order line according to the first order and after removal of (a) good(s) A for an order line according to the second order during the movement of the robot 60/the gripping unit 61 from the first target container 33a to the second source container 5c. The step f) is carried out after the processing of the order line according to the second order during the movement of the robot 60/the gripping unit 61 from the second target container 33c to the first source container 5a.

It should finally also be pointed out that the sorting buffer 44 is not imperatively necessary. In this case, the source containers 5 and target containers 33 are fed to the first/second removal areas 27a, 27b and first/second loading areas 37a, 37b by the source container distribution system and target container distribution system in a manner coordinated such that the former are provisioned at the first/second removal areas 27a, 27b and first/second loading areas 37a, 37b according to the respective orders and approximately at the same time. Also, the sorting buffer 44 may be realized by another design.

A second embodiment of a method for fully automated picking of different goods A . . . H from source containers 5a . . . 5h into target containers 33a . . . 33g by a robot 60 having a gripping unit 61 in accordance with orders is described below. To avoid unnecessary repetition, reference is made to the above disclosure of the method. In contrast to this, the step m) according to the method is optional.

The method comprises at least the following steps:
a) acquiring orders having, respectively, one or multiple order lines, wherein each order line specifies at least one good A, C according to its type of good and the number of pieces ordered,
b) supplying a first source container 5a for processing an order line according to a first order to a first provisioning device 24a having a first removal area 27a and supplying a second source container 5c for processing an order line according to a second order to a second provisioning device 24b having a second removal area 27b using a source container conveying system operated in an automated manner, wherein the source containers 5a, 5c stock different goods A, C (see FIGS. 5a-5f),
c) provisioning the first source container 5a at the first removal area 27a and provisioning the second source container 5c at the second removal area 27b (see FIG. 5f),
d) transporting a first target container 33a to a first provisioning device 34a having a first loading area 37a using a target container conveying system operated in an automated manner and provisioning a first target container 33a at the first loading area 37a to process an order line according to the first order (see FIGS. 5a-5b),
e) transporting a second target container 33c to a second provisioning device 34b having a second loading area 37b using a target container conveying system operated in an automated manner and provisioning a second target container 33c at the second loading area 37b to process an order line according to a second order (see FIGS. 5b-5g),
f) ascertaining a gripping surface pose of a gripping surface 63 for at least one of the goods A in the first source container 5a with the help of a sensor system 62a after the first source container 5a has been provisioned at the first removal area 27a and computing a gripping pose for the gripping unit 61 on the basis of the ascertained gripping surface pose by a robot control 64 (see FIG. 5b—hatching of the first source container 5a symbolizes the preceding ascertaining of a gripping surface pose),
g) removing said good(s) A from the first source container (5a) and placing said good(s) A into the first target container (33a) by the gripping unit (61) of the robot (60) according to an order line of the first order (see FIG. 5c—arrow symbolizes the first removal and the placing of (a) first good(s) A),
h) repeating the step f), provided that the order line according to the first order contains (a) good(s) A of this type of good, again removing said good(s) A from the first source container 5a and placing said good(s) A into the first target container 33a by the gripping unit 61 of the robot 60 (see FIG. 5c—hatching of the first source container 5a symbolizes the repeated ascertaining of a gripping surface pose and see FIG. 5d—arrow symbolizes the second removal and the renewed placing of (a) first good(s) A),
i) ascertaining a gripping surface pose of a gripping surface 63 for at least one of the goods C in the second source container 5c with the help of a sensor system 62b after the second source container 5c has been provisioned at the second removal area 34b and computing a gripping pose for the gripping unit 61 on the basis of the ascertained gripping surface pose by a robot control 64 (see FIG. 5g—hatching of the second source container 5c symbolizes the preceding ascertaining of a gripping surface pose),
j) removing said good(s) C from the second source container 5c and placing said good(s) C into the second target container 33c by the gripping unit 61 of the robot 60 according to an order line of the second order (see FIG. 5h—arrow symbolizes the first removal and the placing of (a) first good(s) C),
k) repeating the step i), provided that the order line according to the second order contains a good C of this type of good, again removing said good(s) C from the second source container 5c and placing said good(s) C into the second target container 33c by the gripping unit 61 of the robot 60 (see FIG. 5h—hatching of the second source container 5b symbolizes the repeated ascertaining of a gripping surface pose and see FIG. 5i—arrow symbolizes the second removal and the renewed placing of (a) second good(s) C), l) removing the first source container (5a) from the first removal area (27a) after processing the order line according to the first order and removing the second source container (5c) from the second removal area (27b) after processing the order line according to the second order, independent of each other, by the target container conveying system.

It should be pointed out at this point that the method for picking goods described is not to be understood to be limited to the embodiment of the source container conveying system and/or target container conveying system described above. Rather, the source container conveying system may, for example, have first conveying devices for supplying the source containers 5 to the first provisioning device 24a and second provisioning device 24b, arranged independent of each other. Equally, the source container conveying system may, for example, have second conveying devices for removing the source containers 5 from the first provisioning device 24a and second provisioning device 24b, arranged independent of each other. Further, the target container conveying system may, for example, have first conveying devices for supplying the target containers 33 to the first provisioning device 34a and second provisioning device 34b, arranged independent of each other. Also, the target container conveying system may, for example, have second conveying devices for removing the target containers 33 from the first provisioning device 34a and second provisioning device 34b, arranged independent of each other.

In a first embodiment (see FIGS. 5a-5m) the method additionally comprises the step m):

removing the first target container (33a) from the first loading area (37a) after processing the order line according to the first order and removing the second target container (33c) from the second loading area (37b) after processing the order line according to the second order, independent of each other, by the target container conveying system.

Figure 6C:
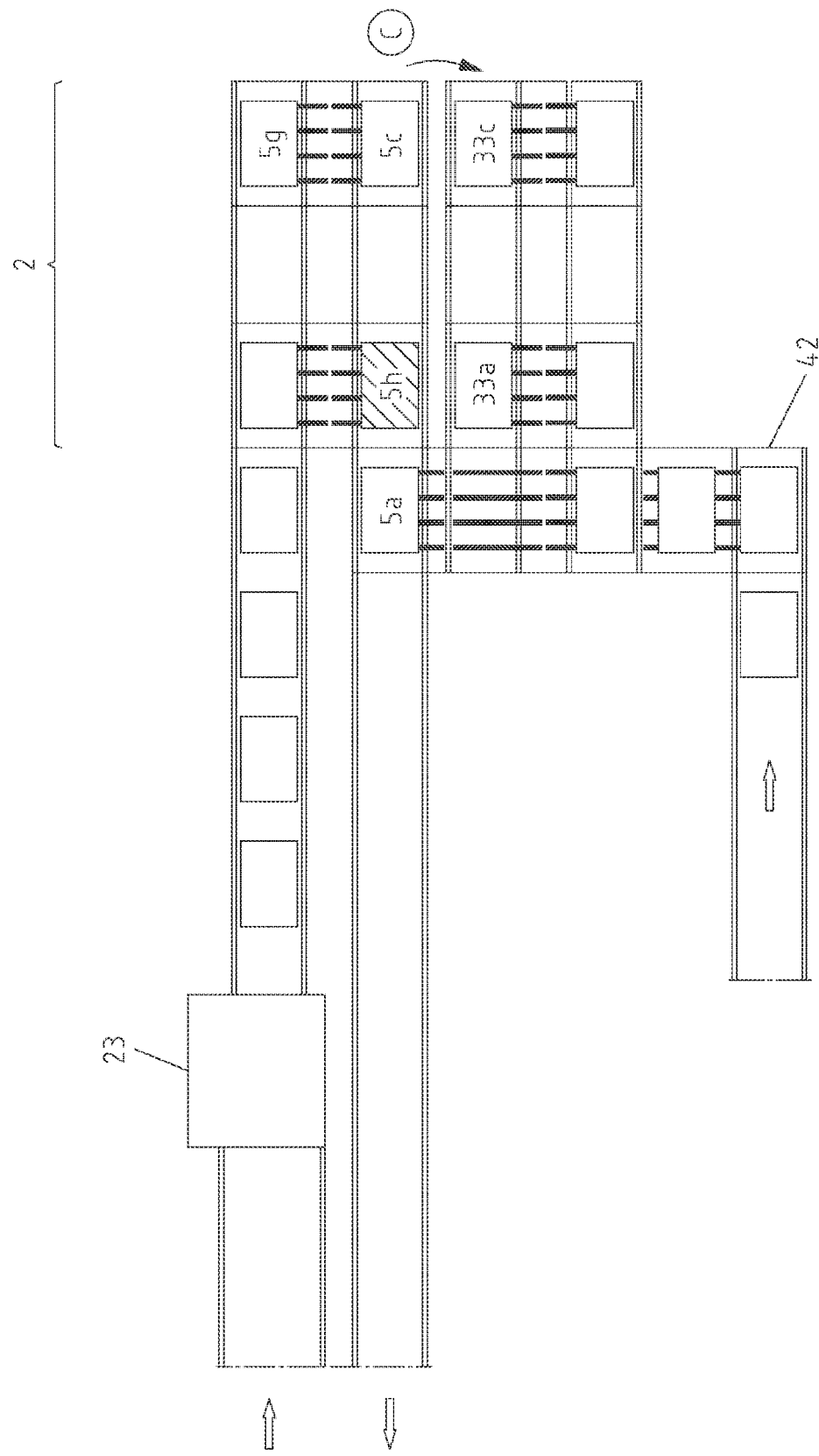

In a second embodiment (see FIGS. 6a-6e), the method additionally comprises the steps m) to u). These steps are preceded by the processing of an order line according to the first order, which comprises, for example, 2 pieces of the good(s) A, (FIGS. 6a-6b) and the processing of an order line according to the second order, which comprises, for example, 1 piece of the good(s) C (FIGS. 6b-6c). This relates to the steps b) to l), as described above.

The provisioning of the third source container 5c at the first removal area 27a and provisioning of the fourth source container 5g at the second removal area 27b, may substantially be done at the same time or at different times.

The steps m) to u) according to the method relate to a further processing of the first order having a next order line and/or second order having a next order line and to a different measure in the provisioning of the first target container 33a and/or second target container 33a.

Figure 6D:
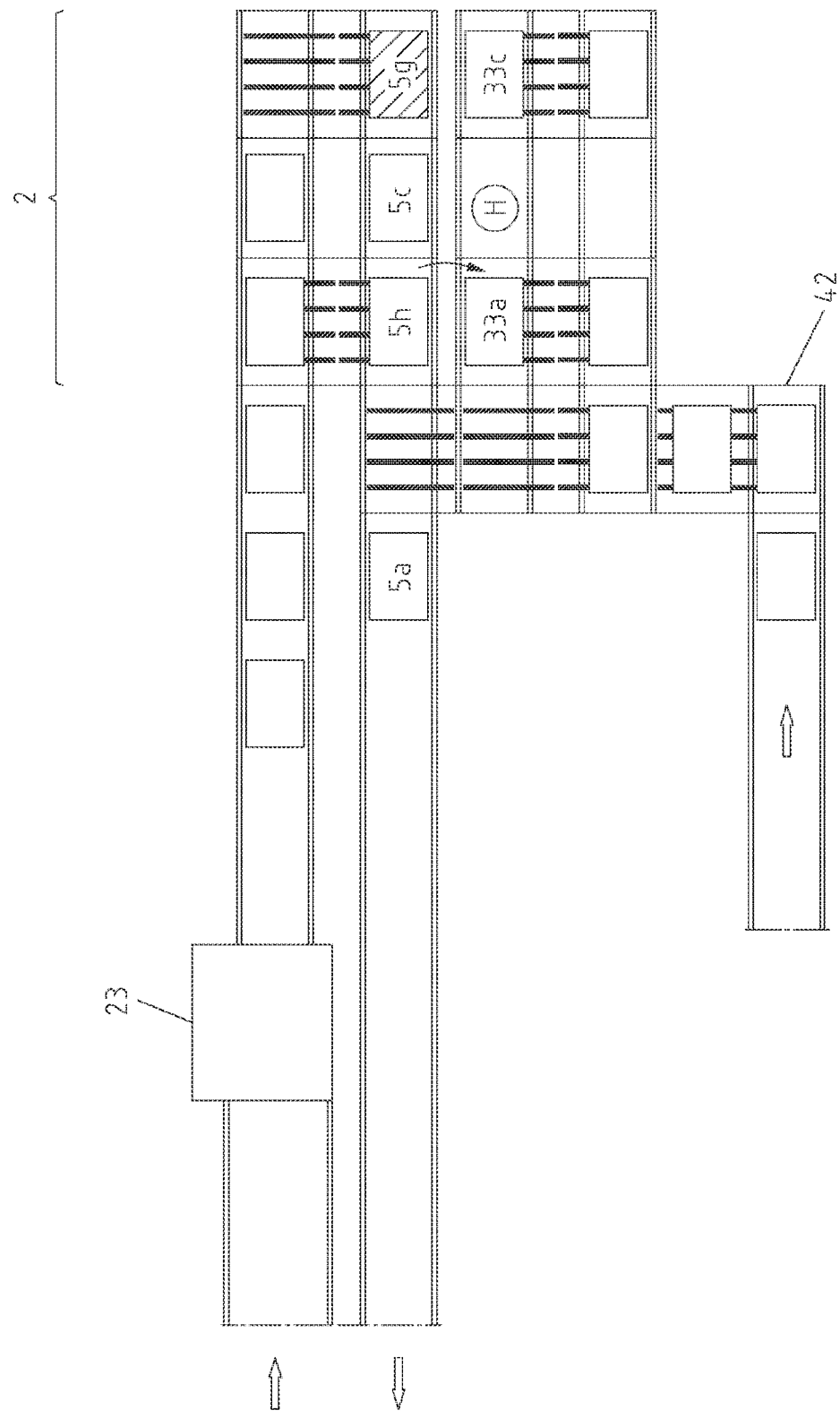
Figure 6E:
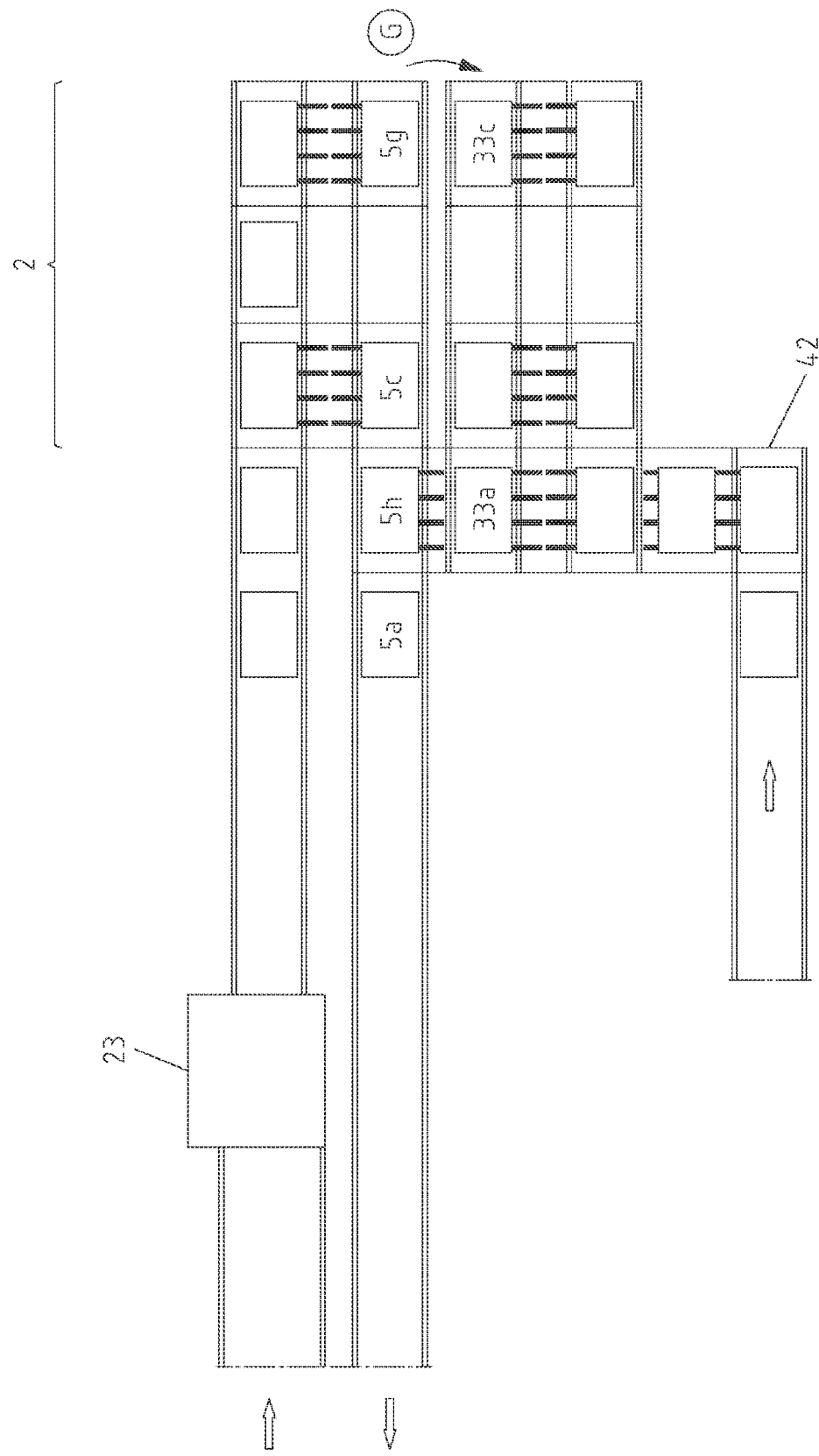

The method may comprise the steps:

m) supplying a third source container 5h to the first provisioning device 24a having the first removal area 27a for processing the next order line according to the first order and/or supplying a fourth source container 5g to the second provisioning device 24b having the second removal area 27b for processing the next order line according to the second order using the source container conveying system operated in an automated manner, wherein the source containers 5h, 5g stock different goods H, G (not depicted) (see FIGS. 6a-6e), n) provisioning the first target container 33a at the first loading area 37a (also) during the supply of the third source container 5h to process the next order line according to the first order, and/or provisioning the second target container 33c at the second loading area 37b (also) during the supply of the fourth source container 5g to process the next order line according to the second order (see FIGS. 6a-6e), o) ascertaining a gripping surface pose of a gripping surface 63 for at least one of the goods H in the third source container 5c with the help of a sensor system 62a after the third source container 5c has been provisioned at the first removal area 27a and computing a gripping pose for the gripping unit 61 on the basis of the ascertained gripping surface pose by a robot control 64 (see FIG. 6c—hatching of the third source container 5h symbolizes the ascertaining of a gripping surface pose), p) removing said good(s) H from the third source container 5h and placing said good(s) H into the first target container 33a by the gripping unit 61 of the robot 60 according to the next order line of the first order (see FIG. 6d—arrow symbolizes the removal and the placing of (a) good(s) H), q) repeating the step o), provided that the next order line according to the first order contains (a) good(s) H of this type of good, again removing said good(s) H from the third source container 5h and placing said good(s) H into the first target container 33a by the gripping unit 61 of the robot 60 (not depicted, as the next order line comprises one single good H), r) and/or ascertaining a gripping surface pose of a gripping surface 63 for at least one of the goods G in the fourth source container 5g with the help of a sensor system 62b after the fourth source container 5g has been provisioned at the second removal area 27b and computing a gripping pose for the gripping unit 61 on the basis of the ascertained gripping surface pose by a robot control 64 (see FIG. 6d—hatching of the fourth source container 5g symbolizes the ascertaining of a gripping surface pose), s) and/or removing said good(s) G from the fourth source container (5g) and placing said good(s) G into the second target container 33c by the gripping unit 61 of the robot 60 according to the next order line of the first order (see FIG. 6e—arrow symbolizes the removal and the placing of (a) good(s) G), t) repeating the step r), provided that the next order line according to the second order contains (a) good(s) G of this type of good, again removing said good(s) G from the fourth source container 5g and placing said good(s) G into the second target container 33c by the gripping unit 61 of the robot 60 (not depicted, as the next order line comprises one single good G), u) removing the first target container 33a from the first loading area 37a after processing the order lines according to the first order and/or removing the second target container 33c from the second loading area 37b after processing the order lines according to the second order, independent of each other, by the target container conveying system (see FIG. 6e—target container 33a is currently being removed from the first loading area 34a).

The step n) is to be understood to mean that the first target container 33a . . . 33g and/or second target container 33a . . . 33g remains (standing still) on the first loading area 34a/second loading area 34b until preferably all order lines according to the first order and/or all order lines according to the second order have been processed (completely). The first source container 5a . . . 5h and/or second source container 5a . . . 5h are provisioned at the first removal area 24a and/or second removal area 24b in an appropriate sequence depending on the first target container 33a . . . 33g and/or second target container 33a . . . 33g to be processed.

By way of repetition of what has been described above, it should be mentioned once again here, too, that it is an advantageous measure if the step r) is carried out after the (complete) processing of the order line according to the first order and during the movement of the robot 60/the gripping unit 61 from the first target container 33a to the fourth source container 5g. The robot control 64 receives from the sensor system 62b the gripping surface pose of a gripping surface 63 for at least one of the goods G in the fourth source container 5g, preferably shortly before the robot 60/the gripping unit 61 has reached the fourth source container 5g. The step o) is carried out after the (complete) processing of the order line according to the second order during the movement of the robot 60/the gripping unit 61 from the second target container 33c to the third source container 5h. The robot control 64 receives from the sensor system 62a the gripping surface pose of a gripping surface 63 for at least one of the goods H in the third source container 5a, preferably shortly before the robot 60/the gripping unit 61 has reached the third source container 5h.

Furthermore, it may be provided that the third source container 5h and/or fourth source container 5g are stored back into a storage area (1), independent of each other, after the picking of the goods H, G in accordance with the steps p) and q) and/or steps s) and t), provided that goods H, G remain in the third source container 5h and/or fourth source container 5g after the goods removal.

Figure 7:
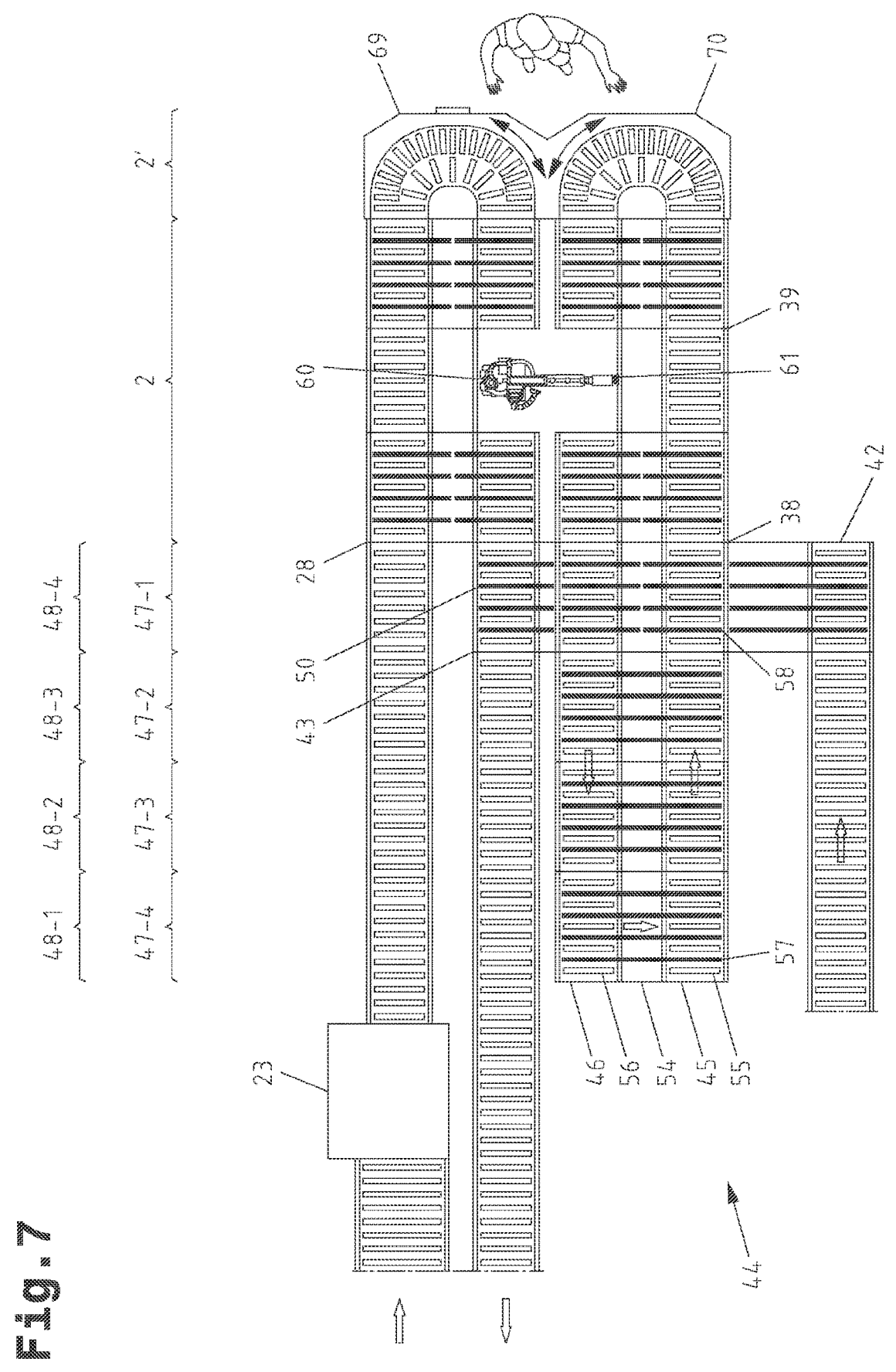

FIG. 7 shows a possible combination of the picking station 2 having a robot 60 for automatic picking described above and a picking station 2' having manual picking using an operator. Such a picking station 2' having manual picking is described in WO 2018/006112 A1. Here, the same construction of the provisioning device 69 for source containers and the same construction of the provisioning device for target containers 70 may be used. The provisioning device 69 has preferably one single removal area for a source container and the provisioning device 70 has preferably one single loading area for a target container. In this respect, WO 2018/006112 A1 is made the subject-matter of this disclosure. Such an embodiment ensures that those goods which can be manipulated (picked) only with difficulty or not at all by the robot 60/gripping unit 61 are processed at the picking station 2' using manual picking. The source container conveying system of the picking station 2 is connected to the provisioning device 69 and the target container conveying system of the picking station 2 is connected to the provisioning device 70. Thus, the source containers which contain such goods can be provisioned at the provisioning device 69. The target containers which are loaded with such goods can be provisioned at the provisioning device 70.

Figure 8:
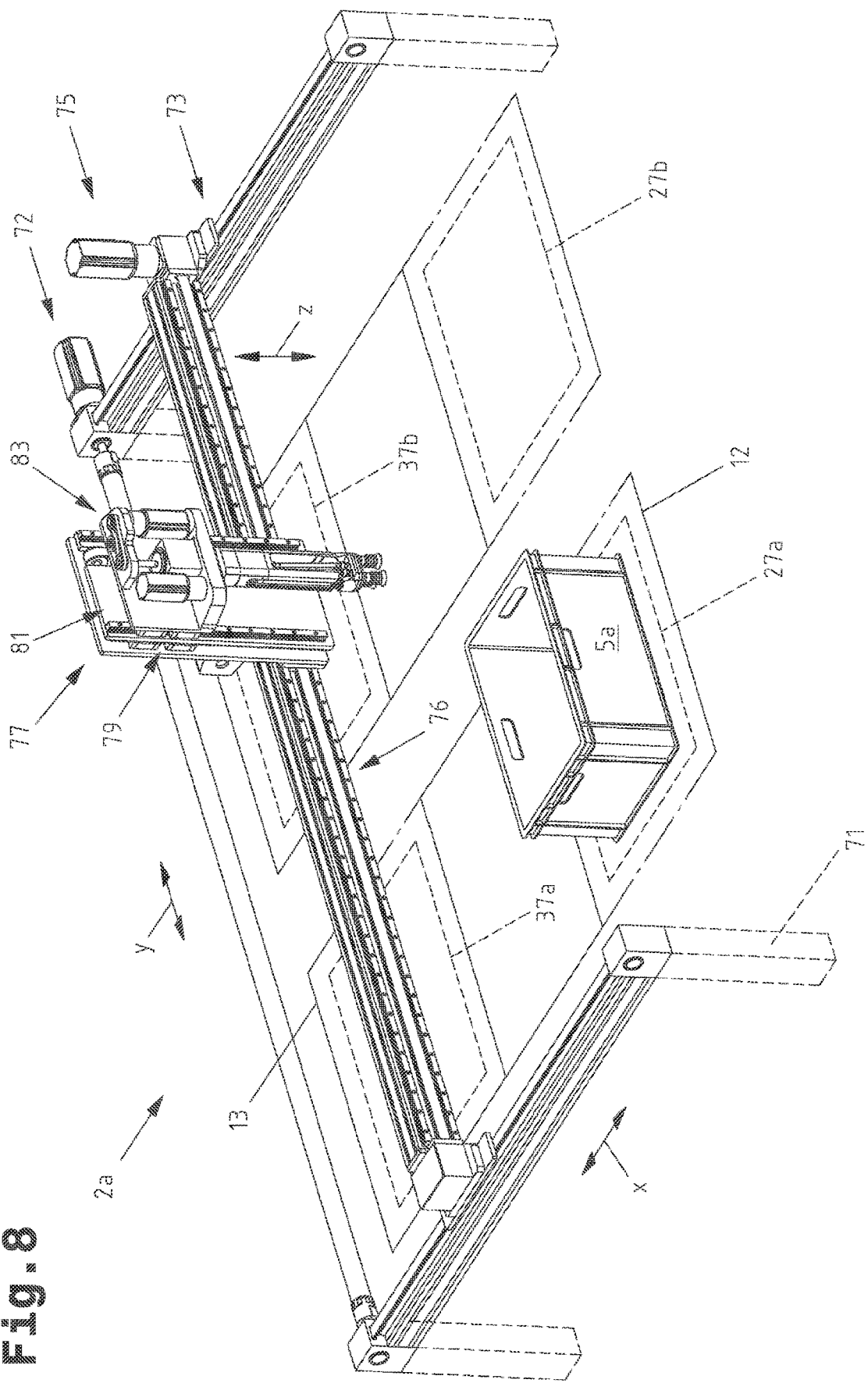
FIG. 8 a picking station having a gantry robot at which a source container is provisioned, viewed diagonally from the front.
Figure 9:
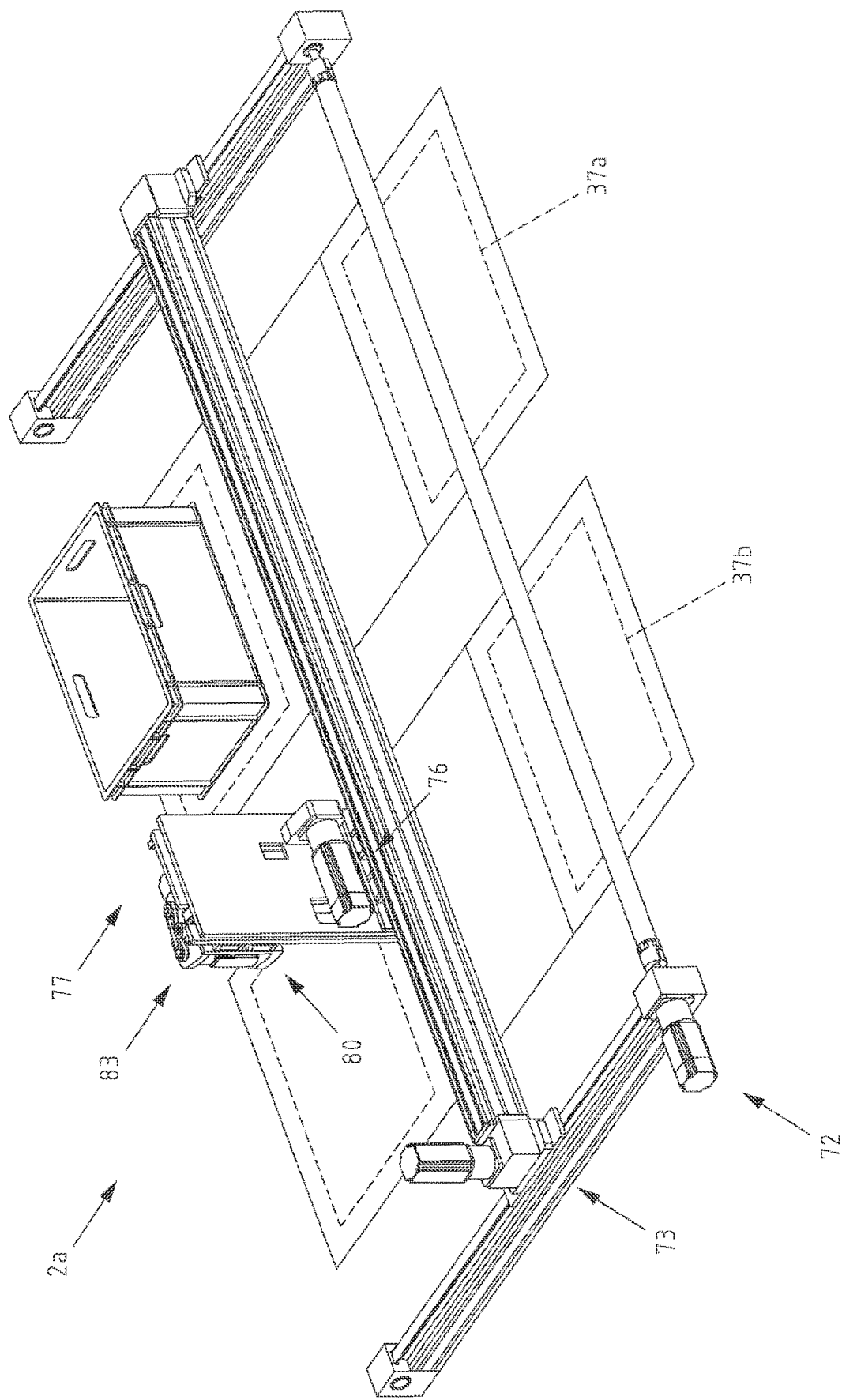
FIG. 9 the picking station of FIG. 8 viewed diagonally from the rear.
Figure 10:
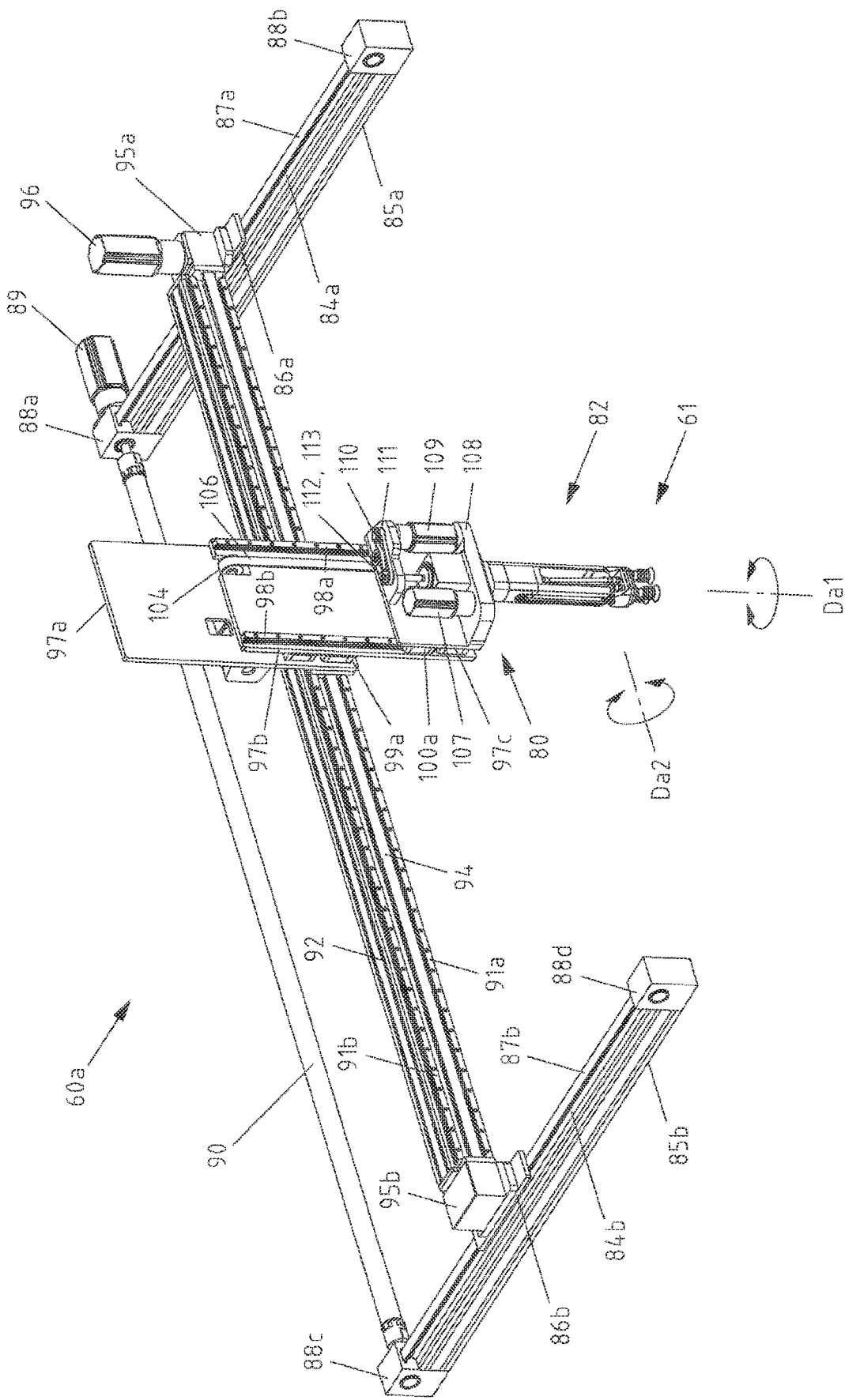
FIG. 10 the gantry robot of FIG. 8 with its gripping unit extended downward.

FIGS. 8 and 9 show an oblique view of an exemplary picking station 2a having a fully automated robot system, which comprises a gantry robot 60a, wherein FIG. 8 shows the picking station 2a diagonally from the front and FIG. 9 shows the picking station 2a diagonally from the rear. FIGS. 10 and 11 show the gantry robot 60a of FIGS. 8 and 9 with its gripping unit 61 extended downward, likewise in an oblique view. Here, FIG. 10 shows the gantry robot 60a diagonally from the front and FIG. 11 diagonally from the rear. This gantry robot 60a can be used at the picking station 2 described above.

Equally, this gantry robot 60a can be used for performing the method described above for fully automated picking of different goods from source containers 5a . . . 5h into target containers 33a . . . 33g.

The picking station 2a comprises two removal areas 27a, 27b, which are part of a conveying device 12 or are connectable to same, as well as two loading areas 37a, 37b, which are part of a conveying device 13 or are connectable to same. In this example, a source container 5a is arranged at the removal area 27a. In this example, the removal area 27b is empty, but of course a source container 5b could be arranged at it. In this example, the loading areas 37a, 37b are likewise empty, however target containers 33a, 33b could be positioned at them.

In the example shown, the picking station 2a comprises two removal areas 27a, 27b and two loading areas 37a, 37b. Yet it would also be conceivable that a different number of removal areas 27a, 27b and loading areas 37a, 37b is provided, for example only one removal area 27a and one loading area 37a or even more than two removal areas 27a, 27b and loading areas 37a, 37b. It is further conceivable that the goods A . . . H to be picked are provisioned directly (i.e. without source containers 5a, 5b and target containers 33a, 33b) at the removal areas 27a, 27b and loading areas 37a, 37b.

The conveying device 12 is part of a source container conveying system for automated transporting of source containers 5a, 5b. Further, the conveying device 13 is part of a target container conveying system for automated transporting of target containers 33a, 33b. The source container conveying system and/or the target container conveying system may in particular be configured as in one of the figures above. Correspondingly, the source container conveying system may have a first provisioning device 24a, which comprises the first removal area 27a, and an optional second provisioning device 24b, which comprises the second removal area 27b. The target container conveying system may further have a first provisioning device 34a, which comprises the first loading area 37a, and a second provisioning device 34b, which comprises the second loading area 37b.

The source container conveying system for automated transporting of source containers 5a, 5b and/or the target container conveying system for automated transporting of target containers 33a, 33b may be configured in accordance with the embodiments described above. Equally, the holding plate 66a and/or holding plate 66b and/or holding plate 66c and/or holding plate 66d described above may be provided.

The gantry robot 60a comprises a base frame, which, in this example, comprises four vertical posts 71. The base frame could furthermore comprise longitudinal beams (running in the x direction) and/or transverse beams (running in the y direction) connected to the vertical posts 71. It would also be conceivable that the base frame comprises multiple side walls instead of the vertical posts 71 or in addition to them.

The gantry robot 60a further comprises, in this example, a first gantry slide 74 mounted so as to be displaceable relative to the vertical posts 71 of the base frame and horizontally movable via a first drive device 72 along a first guide assembly 73 in a first direction x. In addition, the gantry robot 60a comprises a second gantry slide 77 mounted at the first gantry slide 74 so as to be displaceable and horizontally movable via a second drive device 75 along a second guide assembly 76 in a second direction y running transverse to the first direction x. Further, the gantry robot 60a comprises a third gantry slide 80 mounted at the second gantry slide 77 so as to be displaceable and vertically movable via a third drive device 78 along a third guide assembly 79 in a third direction z. Furthermore, the gantry robot 60a comprises a gripping unit 61 coupled to the third gantry slide 80 and mounted so as to be rotatable about a first axis of rotation Da1 and movable via a fourth drive device 81.

Specifically, the gantry robot 60a comprises an gantry arm 82 movable via the fourth drive device 81 which is mounted at the third gantry slide 80 so as to be rotatable about a first, vertical axis of rotation Da1. The gripping unit 61 is mounted at the gantry arm 82 so as to be rotatable about a second, horizontal axis of rotation Da2 and movable via a fifth drive device 83. Correspondingly, the gripping unit 61 is rotatable both about the vertical axis of rotation Da1 and about the horizontal axis of rotation Da2. Hence, the gripping unit 61 can be moved particularly easily into an advantageous gripping pose, for example if the good(s) A . . . H to be gripped is/are formed by a box lying diagonally in a source container or if the gripping unit 61 is not structured in a (rotationally) symmetrical manner viewed from the bottom, as it is the case in the gantry robot 60a shown. Even though a rotation about two axes of rotation Da1, Da2 is of advantage, it would, of course, also be conceivable that the gripping unit 61 can be rotated only about a vertical axis of rotation Da1 or only about a horizontal axis of rotation Da2.

The gantry robot 60a further comprises, in this example, specifically a first x-guide rail 84a, which is arranged on a first x-beam 85a, and a second x-guide rail 84b, which is arranged on a second x-beam 85b. The first x-guide carriage 86a of the first gantry slide 74 is mounted on the first x-guide rail 84a so as to be displaceable and the second x-guide carriage 86b of the first gantry slide 74 is mounted on the second x-guide rail 84b so as to be displaceable. The first x-guide rail 84a, the first x-guide carriage 86a, the second x-guide rail 84b and the second x-guide carriage 86b form, in this example, the first guide assembly 73.

According to the embodiment depicted in FIGS. 8 to 11, the first drive device 72 comprises an x-traction means drive connected to the first gantry slide 74, which x-traction means drive, in this example, has an endlessly revolving first x-traction means 87a and an endlessly revolving second x-traction means 87b. The first x-traction means 87a and the second x-traction means 87b are guided, respectively, around a deflection wheel and a drive wheel (not depicted), which are arranged in first wheel housings 88a . . . 88d at the ends of the x-beam 85a, 85b. One of the drive wheels is coupled to an electric x-actuating motor 89, and the two drive wheels of the x-traction means drive, in this example, are coupled via a coupling shaft 90. Yet it would also be conceivable that the x-traction means 87a, 87b are driven via separate (and electronically-coupled) x-actuating motors 89. The coupling shaft 90 is then obsolete.

A clockwise or anti-clockwise rotating motion of the drive wheel moves the first gantry slide 74 (and thus also the second gantry slide 77 and the third gantry slide 80) horizontally relative to the removal areas 27a, 27b and to the source container 5a, 5b as well as relative to the loading areas 37a, 37b and to the target container 33a, 33b in the x direction.

The gantry robot 60a further comprises, in this example, a first y-guide rail 91a and a second y-guide rail 91b, which are arranged on a y-beam 92. The y-guide carriage 93 of the second gantry slide 77 is mounted on the first y-guide rail 91a and the second y-guide rail 91b so as to be displaceable. The first y-guide rail 91a, the second y-guide rail 91b and the y-guide carriage 93 form, in this example, the second guide assembly 76.

According to the embodiment depicted in the FIGS. 8 to 11, the second drive device 75 comprises a y-traction means drive connected to the second gantry slide 77, which y-traction means drive, in this example, has an equally endlessly revolving y-traction means 94. The first y-traction means 94 is, again, guided around a deflection wheel and a drive wheel (not depicted), which are arranged in second wheel housings 95a, 95b at the ends of the y-beam 92. The drive wheel is coupled to an electric y-actuating motor 96.

A clockwise or anti-clockwise rotating motion of the drive wheel moves the second gantry slide 77 (and thus also the third gantry slide 80) horizontally relative to the removal areas 27a, 27b and to the source container 5a, 5b as well as relative to the loading areas 37a, 37b and to the target container 33a, 33b in the y direction.

The gantry robot 60a further comprises three base plates 97a . . . 97c, which are mounted so as to be displaceable relative to one another in a z direction. Four z-guide rails 98a . . . 98d are arranged on the second base plate 97b in this example. The guide rails 98a, 98b are arranged on the front side of the second base plate 97b, and the two other guide rails 98c, 98d are arranged, respectively, behind the guide rails 98a, 98b on the reverse side of the second base plate 97b. The guide rails 98a, 98b on the reverse side of the second base plate 97b are mounted in z-guide carriages 99a so as to be displaceable, which z-guide carriages 99a are installed on the first base plate 97a (note: in FIGS. 8 to 11, only one z-guide carriage 99a of the two z-guide carriages is visible). Two further z-guide carriages 100a, 100b are installed on the third base plate 98c and mounted on the guide rails 98a, 98b so as to be displaceable.

The first base plate 97a and the z-guide carriages 99a are thus comprised by the second gantry slide 77. The second base plate 97b and the third base plate 97c, the guide rails 98a . . . 98d and the z-guide carriages 100a, 100b are part of the third gantry slide 80.

According to the embodiment depicted in FIGS. 8 to 11, the third drive device 78 comprises a gear (not depicted) in a gear housing 101. The gear is connected to a shaft of an electric z-actuating motor 102 and engages with a rack 103, which is installed on the reverse side of the second base plate 97b. In this way, the second base plate 97b can be moved relative to the first base plate 97a. A first deflection wheel 104 is mounted on the second base plate 97b in the top area so as to be rotatable and a second deflection wheel 105 in the bottom area so as to be rotatable, around which first deflection wheel 104 and second deflection wheel 105 a z-traction means 106 is guided. The z-traction means 106 is connected, respectively, to the first base plate 97a and to the third base plate 97c. During a movement of the second base plate 97b relative to the first base plate 97a, this also moves the third base plate 97c relative to the second base plate 97b, although the z-traction means 106 itself is not driven by a motor. Overall, this thus results in a dual telescope.

A clockwise or anti-clockwise rotating motion of said gear thus moves the third gantry slide 80 relative to the removal areas 27a, 27b and to the source container 5a, 5b as well as relative to the loading areas 37a, 37b and to the target container 33a, 33b vertically in a z direction.

FIGS. 8 and 9 show the third gantry slide 80 in its top initial position. FIGS. 10 and 11 show a view in which the third gantry slide 80 and thus the movable gripping unit 61 are extended downward.

The gantry robot 60a may comprise a displacement measurement device not depicted, by means of which the readjustment movements of the first gantry slide 74, of the second gantry slide 77 and of the third gantry slide 80 are captured. Here, the measurement technique of absolute and incremental displacement measurement may be utilized.

Figure 12B:
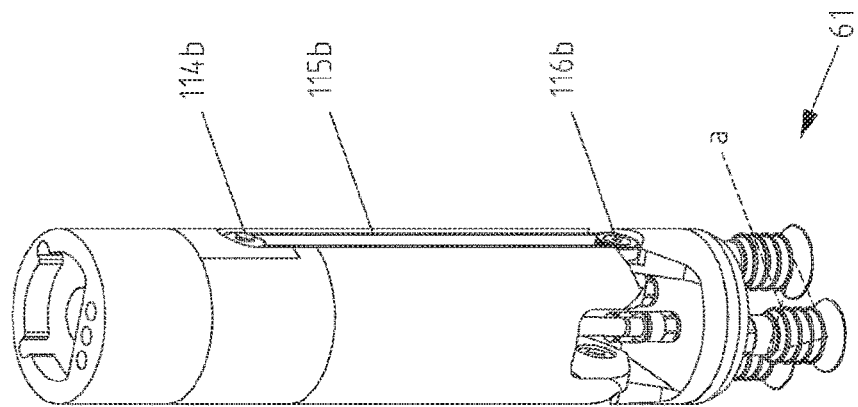
FIG. 12b the gantry arm of FIG. 12a viewed diagonally from the rear.
Figure 12A:
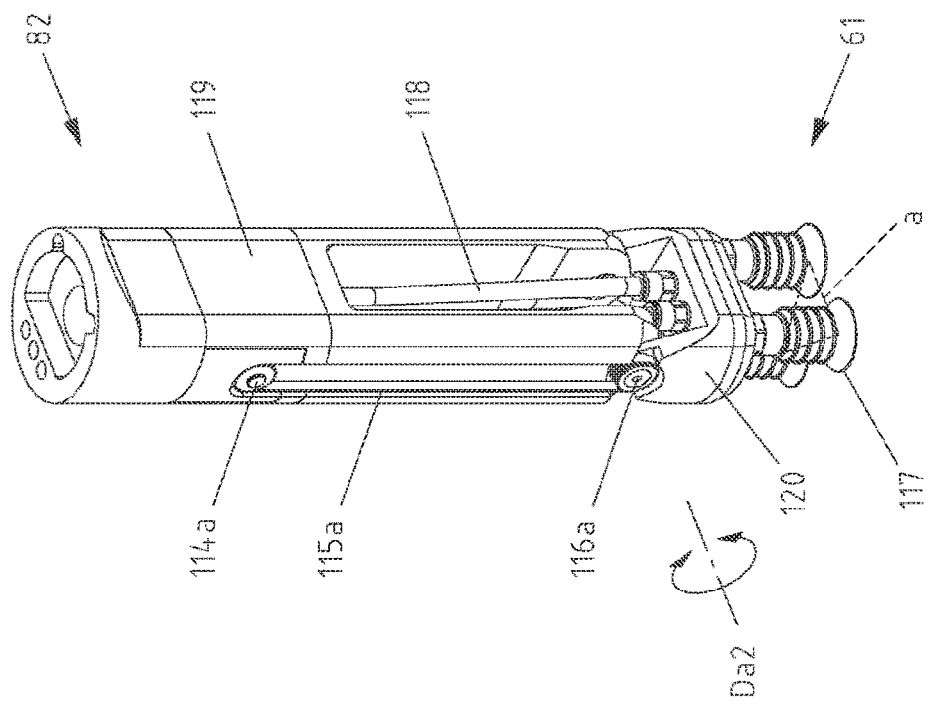
FIG. 12a a detailed view of the gantry arm with the gripping unit arranged in the bottom area, viewed diagonally from the front.

FIG. 12a shows a detailed, diagonal, front view of the gantry arm 82 with the gripping unit 61 arranged in the bottom area. FIG. 12b shows the gantry arm 82 with the gripping unit 61 arranged in the bottom area viewed diagonally from behind.

FIG. 13a further shows a detailed view of the gantry arm 82 with the gripping unit 61 arranged in the bottom area viewed from the left side, FIG. 13b from the right side.

Here, the gripping unit 61 is pivoted backward by 45° about the horizontal axis of rotation Da2. Also a forward pivoting of the gripping unit 61 by 45° is depicted using dashed lines. In this context, a pivoting angle of 45° is not to be understood to be limiting, but the gripping unit 61 may be pivoted about the horizontal axis of rotation Da2 also by a different pivoting angle.

According to the embodiment depicted in FIGS. 8 to 13b, the fourth drive device 81 comprises a first rotary actuating motor 107, which transmits a rotating motion to the gantry arm 82 via a transmission (not depicted) in the first transmission housing 108 and thus enables a relative rotation of the gantry arm 82 relative to the removal areas 27a, 27b and to the source container 5a, 5b as well as relative to the loading areas 37a, 37b and to the target container 33a, 33b. The possible angle of rotation in the example shown amounts to 360°, and the gantry arm 82 can in particular be rotated endlessly. Yet it would also be conceivable that the angle of rotation of the gantry arm 82 is limited to smaller angles of rotation.

According to the embodiment depicted in FIGS. 8 to 13b, the fifth drive device 83 comprises a second rotary actuating motor 109, which transmits a rotating motion to the gripping unit 61 and thus enables a relative rotation of the gripping unit 61 relative to the removal areas 27a, 27b and to the source container 5a, 5b as well as relative to the loading areas 37a, 37b and to the target container 33a, 33b. Specifically, the transmission of the rotating motion is done from a first belt wheel 110 via a first belt 111 to a second belt wheel 112, to the shaft 113, from the shaft to an (angular) transmission not depicted, to two third belt wheels 114a, 114b, to two second belts 115a, 115b and finally to two fourth belt wheels 116a, 116b. In the example shown, the possible pivoting angle amounts to ±45°. Yet it would also be conceivable that the maximum angle of rotation of the gripping unit 61 is smaller than ±45° or even larger than ±45°.

The gantry robot 60a may furthermore comprise an angular-measurement device not depicted, by means of which the readjustment movements of the gantry arm 82 and of the gripping unit 61 are captured. Here, the measurement technique of absolute and incremental angular measurement may be utilized.

It is easily apparent, in particular in FIGS. 12a and 12b, that the gripping unit 61 in this example comprises three vacuum-suction grippers 117, which are adjoined to a vacuum generator (not depicted) via fluid lines, in particular air hoses 118. It proves of advantage if the air hoses 118 (fluid lines) are housed in an internal (integrally-formed) line accommodating channel not depicted in more detail and running in a longitudinal direction of the gantry arm 82. On the other hand, air ducts (fluid lines) may be constructed in the gantry arm 82, for example there are bores in the gantry arm, which bores form the air ducts.

In other words, the fluid lines are integrally-formed in the gantry arm 82. This, in turn, aids the removal of (a) good(s) from a source container 5a or the placing of (a) good(s) into a target container 33. The gantry arm 82 can be moved unrestrictedly and particularly close to a container wall and dip into the source container 5a or target container 33, as shown in FIG. 14.

Because of the redundancy of the vacuum-suction grippers 117, goods A . . . H can in this way be seized at a particularly low error rate. This means that a number of failed manipulations of goods A . . . H in relation to a total number of manipulations of these goods A . . . H is low.

Specifically, the vacuum-suction grippers 117 are arranged in a triangle and form a gripping plane, whereby in particular goods A . . . H are easily captured which have a level boundary surface or multiple such boundary surfaces, for example boxes. Advantageously, the gantry arm 82 comprises a level, vertical boundary surface 119, which is aligned parallel to one of the sides a of that triangle at whose corner points the centers of the vacuum-suction grippers 117 are located. In particular, the gantry arm 82, as it is depicted in FIGS. 8 to 13a, may have a round (circular) cross section, which is oblate the in the area of said vertical boundary surface 119. Yet it would also be conceivable that the gantry arm 82 has a polygon-shaped cross section (in particular a rectangle-shaped cross section or triangle-shaped cross section). Said vertical boundary surface 119 is then formed by a side surface of a polygon-shaped prism.

The at least one vertical boundary surface 119 of the gantry arm 82 aligned toward one of the sides of the triangle enables the gantry arm 82 to be dipped into a source container 5a or target container 33 particularly closely to a container wall to grip (a) good(s) A . . . H, as it is shown for the good A by way of example in FIG. 14.

Advantageously, the level, vertical boundary surface 119 of the gantry arm 82 is larger (longer) toward the bottom end of the gripping unit 61 than the 1.1-fold container height hB of the source container 5a and/or of the target container 33, as it is shown in relation to FIG. 14. This means that the following applies:

dipping height ht>1.1-fold container height hB.

In the example shown, the gantry arm 82 has a vertical, level boundary surface 119 (side wall), which is offset backward relative to a maximum cross-sectional contour of the gantry arm 82. Yet it would also be conceivable that the (entire) gantry arm 82 has a prismatic outline.

As apparent in FIG. 14, it may also prove of advantage if a diameter of the gripping unit 61 is not or not substantially larger than a diameter of the gantry arm 82, regardless of what number of vacuum-suction grippers 117 is used.

It should be noted at this point that the gantry arm 82 and/or the gripping unit 61 are not rotationally symmetrical viewed from the bottom, which is why a rotatability of the gripping unit 61 about the vertical axis of rotation Da1 is of particular advantage. If, however, the gantry arm 82 and the gripping unit 61 are rotationally symmetrical viewed from the bottom, the rotatability of the gripping unit 61 about the vertical axis of rotation Da1 is, under certain circumstances, obsolete even without a substantial disadvantage.

It is also of advantage if the gantry robot 60a has a gripper receptacle 120 mounted at the gantry arm 82 so as to be rotatable about the second, horizontal axis of rotation Da2, to which gripper receptacle 120 the gripping unit 61 is attached. The gripper receptacle 120 enables gripping units 61 of different kinds to be attached to the gantry robot 60*a*, wherein the gripping units 61 are adjusted, respectively, to different gripping tasks. For example, in addition to gripping units 61 having vacuum-suction grippers 117, also mechanical gripping elements (e.g. a robotic hand or gripping pliers) may be arranged on the gripping unit 61. Furthermore, a gripping unit 61 is not limited to three vacuum-suction grippers 117 arranged in a triangle, but the gripping unit 61 may also have more or fewer than three vacuum-suction grippers 117, and the vacuum-suction grippers 117 may also be arranged in a different geometry.

In another advantageous variant embodiment of the picking station 2*a*, the latter comprises at least one container drive for rotating the at least one removal area 27*a*, 27*b* (including a source container 5*a*, 5*b* provisioned at it) and the at least one loading area 37*a*, 37*b* (including a target container 33*a*, 33*b* provisioned at it) relative to the base frame 71 of the gantry robot 60*a* about a vertical axis of rotation, and/or for tilting the at least one removal area 27*a*, 27*b* (including a source container 5*a*, 5*b* provisioned at it) and the at least one loading area 37*a*, 37*b* (including a target container 33*a*, 33*b* provisioned at it) relative to the base frame 71 of the gantry robot 60*a* about a horizontal axis of rotation.

This enables the gripping unit 61 to be likewise easily moved into an advantageous gripping pose for gripping goods A . . . H, albeit by rotating the source container 5*a*, 5*b* and/or target container 33*a*, 33*b* relative to the gantry robot 60*a*. If the source container 5*a*, 5*b* and the target container 33*a*, 33*b* can be rotated about a vertical axis of rotation, the gripping unit 61 as such need not be mounted so as to be rotatable relative to the third gantry slide 80 about a vertical axis of rotation Da2. Equally, the gripping unit 61 need not be mounted so as to be rotatable relative to the third gantry slide 80 about a horizontal axis of rotation Da1 if the source container 5*a*, 5*b* and the target container 33*a*, 33*b* can be tilted about a horizontal axis of rotation.

In an advantageous variant embodiment, the fully automated robot system having the gantry robot 60*a* comprises a sensor system 62*a*, 62*b*, in particular a camera system, at least for acquiring the goods A . . . H in the first source container 5*a* and, if applicable, in the second source container 5*b*, provided that a second provisioning device 24*b* is provided, as well as a robot control 64, which is connected with the sensor system 62*a*, 62*b* and controls the robot 60 having the gripping unit 61. In this way, the picking process can run in a fully automatic manner. In particular, the proposed measures enable a correction of potentially-occurring errors during the picking.

The measures presented enable the gripping unit 61 to be moved particularly easily into an advantageous gripping pose. In particular, the gantry arm 82 can be moved in a perpendicular direction onto a bottom of a source container 5*a*, 5*b* or target container 37*a*, 37*b*. An optimal gripping pose can be achieved by the gantry arm 82 remaining in its vertical position while the gripping unit 61 is pivoted relative to the gantry arm 82. This enables the gantry arm 82 and the gripping unit 61 to dip into a source container 5*a*, 5*b* or target container 37*a*, 37*b* very closely next to a side wall, even if the gantry arm 82 has no specially-formed boundary surface 119. Thus, also goods A . . . H in the marginal region can be removed from a source container 5*a*, 5*b*, and goods A . . . H can be placed in the marginal region of a target container 37*a*, 37*b*.

Finally it should also be noted that the scope of protection is determined by the patent claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should be noted that the depicted devices may in reality also include more or fewer parts than depicted. The depicted devices and/or their parts may partially not be depicted to scale and/or are enlarged and/or are reduced in size.

LIST OF REFERENCE NUMBERS 1 storage area
2, 2*a* picking station
3 source container distribution system
4 target container distribution system
source container
6 storage rack
7 rack aisle
8 storage location
9 storage and retrieval unit
10 conveying device
11 conveying device
12 conveying device
13 conveying device
14 conveying device
15 inward and/or outward transfer device
16 handover device
17 guide lane
18 transport device
19 buffer device
20 lifting device
22*a*, 22*b* conveying means
23 rotary station
24*a*, 24*b* provisioning device for a first source container/a second source container
25 conveying device for supplying the source containers
26 conveying device for removing the source containers
27*a*, 27*b* removal area for a first source container/a second source container
28 transfer device
29 transfer device
30*a*, 30*b* conveying means
31 control unit
32 buffer device
33 target container
34 provisioning device for a first target container/a second target container
35 conveying device supply target containers
36 conveying device for removing the target containers
37*a*, 37*b* loading area for a first target container/a second target container
38 transfer device
39 transfer device
40 buffer device
41 goods-out area
42 conveying device
43 conveying device
44 sorting buffer
conveying device 45

46 conveying device
47 buffer position
48 sorting position
50 conveying means
51 distance
52a, 52b provisioning plane
53a, 53b provisioning plane
54 conveying device
55 conveying means
56 conveying means
57 conveying means
58 conveying means
60, 60a robot
61 gripping unit
62a, 62b sensor system
63 gripping surface
64 robot control
65a, 65b sensor system
66a ... 66d holding plate
67a, 67b access opening
68 sensor system
69 provisioning device for the source containers
70 provisioning device for the target containers
71 (vertical post) base frame
72 first drive device
73 first guide assembly
74 first gantry slide
75 second drive device
76 second guide assembly
77 second gantry slide
78 third drive device
79 third guide assembly
80 third gantry slide
81 fourth drive device
82 gantry arm
83 fifth drive device
84a, 84b x-guide rail
85a, 85b x-beam
86a, 86b x-guide carriage
87a, 87b x-traction means
88a ... 88d first wheel housing
89 x-actuating motor
90 coupling shaft
91a, 91b y-guide rail
92 y-beam
93 y-guide carriage
94 y-traction means
95a, 95b second wheel housing
96 y-actuating motor
97a ... 97c base plate
98a ... 98d z-guide rail
99a z-guide carriage
100a, 100b z-guide carriage
101 gear housing
102 z-actuating motor
103 rack
104 first deflection wheel
105 second deflection wheel
106 z-traction means
107 first rotary actuating motor
108 transmission housing
109 second rotary actuating motor
110 first belt wheel
111 first belt
112 second belt wheel
113 shaft
114a, 114b third belt wheel
115a, 115b second belt
116a, 116b fourth belt wheel
117 vacuum-suction gripper
118 air hose
119 vertical boundary surface of the gantry arm
120 gripper receptacle
A ... H good(s)
x first (horizontal) direction
y second (horizontal) direction
Z third (vertical) direction
Da1 first axis of rotation
Da2 second axis of rotation
a triangle side
ht dipping height
hB container height

The invention claimed is:

1. A picking station for picking goods from source containers into target containers, comprising
a source container conveying system for automated transporting of source containers, comprising:
a first source container conveying device for supplying source containers,
a first source container transfer device for transporting a first source container,
a second source container transfer device for transporting a second source container,
a first source container provisioning device connected in terms of conveyance to the first source container conveying device by the first source container transfer device and configured to provision the first source container, and having a first removal area,
a second source container provisioning device connected in terms of conveyance to the first source container conveying device by the second source container transfer device and configured to provision the second source container, and having a second removal area,
a second source container conveying device for removing the source containers from the first source container provisioning device and the second source container provisioning device,
wherein the first source container provisioning device having the first removal area and the second source container provisioning device having the second removal area are arranged along the second source container conveying device for removing source containers;
a target container conveying system for automated transporting of target containers, comprising:
a first target container conveying device for supplying target containers,
a first target container transfer device for transporting a first target container,
a second target container transfer device for transporting a second target container,
a first target container provisioning device connected in terms of conveyance to the first target container conveying device by the first target container transfer device and configured to provision the first target container, and having a first loading area,
a second target container provisioning device connected in terms of conveyance to the first target container conveying device by the second target container transfer device and configured to provision the second target container, and having a second loading area, a second target container conveying device for removing the target containers from the first target container provisioning device and the second target container provisioning device,
wherein the first target container provisioning device having the first loading area and the second target container provisioning device having the second loading area are arranged along the second target container conveying device for removing target containers,
wherein the first source container provisioning device having the first removal area and the first target container provisioning device having the first loading area face each other,
wherein the second source container provisioning device having the second removal area and the second target container provisioning device having the second loading area face each other,
wherein the second source container conveying device for removing the source containers and the second target container conveying device for removing the target containers are arranged in parallel;
a fully automated robot system, comprising:
a robot having a gripping unit movable relatively to a robot base, the gripping unit being configured to remove goods according to different orders from the first source container and/or the second source container and place them into the first target container and/or the second target container,
a sensor system configured at least for capturing the goods in the first source container and the second source container,
a robot control connected with the sensor system and configured to control the robot having the gripping unit.

2. The picking station according to claim 1, wherein the second source container conveying device for removing the source containers comprises the first source container provisioning device having the first removal area and the second source container provisioning device having the second removal area.

3. The picking station according to claim 1, wherein the second target container conveying device for removing the target containers comprises the first target container provisioning device having the first loading area and the second target container provisioning device having the second loading area.

4. The picking station according to claim 1, wherein the second source container conveying device for removing the source containers and the second target container conveying device for removing the target containers are arranged at a distance of a maximum of 400 mm.

5. The picking station according to claim 1, wherein the first source container provisioning device having the first removal area and the first target container provisioning device having the first loading area each form a provisioning plane at the same height level.

6. The picking station according to claim 1, wherein the second source container provisioning device having the second removal area and the second target container provisioning device having the second loading area each form a provisioning plane at the same height level.

7. The picking station according to claim 1,
wherein a buffering device having at least one buffer area is provided between the first source container provisioning device having the first removal area and the second source container provisioning device having the second removal area,
wherein the buffer area is configured to buffer a second source container after the picking.

8. The picking station according to claim 1,
wherein a buffering device having at least one buffer area is provided between the first target container provisioning device having the first loading area and the second target container provisioning device having the second loading area,
wherein the buffer area is configured to buffer a second target container after the picking.

9. The picking station according to claim 1, wherein the second source container conveying device for removing the source containers and the second target container conveying device for removing the target containers are connected in terms of conveyance by a source container and target container conveying device in order to transport the source containers and the target containers on a common conveying route after the picking.

10. The picking station according to claim 1, wherein:
a first holding plate is arranged above the second source container conveying device for removing the source containers and the second target container conveying device for removing the target containers between the first source container provisioning device having the first removal area and the first target container provisioning device having the first loading area, wherein the first holding plate has a first access opening above the first removal area and a second access opening above the first loading area,
a second holding plate is arranged above the second source container conveying device for removing the source containers and the second target container conveying device for removing the target containers between the second source container provisioning device having the second removal area and the second target container provisioning device having the second loading area, wherein the second holding plate has a first access opening above the first removal area and a second access opening above the first loading area.

11. The picking station according to claim 10, wherein the sensor system is also configured for capturing at least one good which inadvertently dropped off the gripping unit and is lying on the first or second holding plate, and the robot control controls the gripping unit such that the gripping unit picks up the at least one good and places the at least one good into:
the first source container, or
the second source container, or
the first target container, or
the second target container.

12. The picking station according to claim 1, wherein:
a first holding plate is arranged above the second source container conveying device for removing the source containers between the first source container provisioning device having the first removal area and the second source container provisioning device having the second removal area,
a second holding plate is arranged above the second source container conveying device for removing the target containers between the first target container provisioning device having the first loading area and the second target container provisioning device having the second loading area.

13. The picking station according to claim 12, wherein the sensor system is also configured for capturing at least one good which inadvertently dropped off the gripping unit and is lying on the first or second holding plate, and the robot control controls the gripping unit such that the gripping unit picks up the at least one good and places the at least one good into:
- the first source container, or
- the second source container, or
- the first target container, or
- the second target container.

14. The picking station according to claim 1, wherein the picking station adjoins a sorting buffer, wherein the sorting buffer is controlled by a control unit and using the control unit the target containers in the sorting buffer are sorted into a sequence determined depending on the sequence in which the source containers are provisioned, respectively, at the first removal area and the second removal area.

15. The picking station according to claim 14, wherein the sorting buffer comprises:
- buffer positions arranged consecutively in a dispensing direction on a first sorting buffer conveying device,
- sorting positions arranged consecutively in a return direction on a second sorting buffer conveying device,
- third sorting buffer conveying devices connecting the sorting positions with the buffer positions in terms of conveyance,
- wherein the first sorting buffer conveying device of the sorting buffer adjoins the first target container conveying device for supplying the target containers and has at least one first conveying means for transporting the target containers,
- wherein the second sorting buffer conveying device of the sorting buffer adjoins the second target container conveying device for removing the target containers and has at least one second conveying means for transporting the target containers,
- wherein further conveying means for transporting the target containers are allocated to the buffer positions and the sorting positions,
- wherein the control unit controls the at least one first conveying means of the first sorting buffer conveying device, the at least one second conveying means of the second sorting buffer conveying device, and the further conveying means such that the target containers in the sorting buffer are sorted into a sequence which is determined depending on the sequence in which the source containers are provisioned, respectively, at the first removal area and the second removal area, and such that the first source container and the first target container, respectively according to an order, arrive approximately simultaneously at the first removal area and the first loading area, or the second source container and the second target container, respectively according to an order, arrive approximately simultaneously at the second removal area and the second loading area.

16. A storage and picking system for picking goods, comprising
- a storage area for storing goods,
- at least one picking station for automated picking of goods,
- wherein the at least one picking station is configured according to claim 1.

17. A method for fully automated picking of different goods from source containers into target containers using the picking station according to claim 1, the method comprising the following steps:
- a) acquiring of orders, each having one or multiple order lines, wherein each order line specifies at least one good by a type of good and a quantity ordered,
- b) supplying a first source container for a first order and supplying a second source container for a second order on the first source container conveying device and transporting the first source container from the first source container conveying device to the first source container provisioning device having the first removal area and transporting the second source container from the first source container conveying device to the second source container provisioning device having the second removal area,
- c) provisioning the first source container at the first removal area and provisioning the second source container at the second removal area,
- d) transporting the first target container to the first target container provisioning device having the first loading area and provisioning the first target container at the first loading area to process an order line according to the first order,
- e) transporting the second target container to the second target container provisioning device having the second loading area and provisioning the second target container at the second loading area to process an order line according to the second order,
- f) ascertaining a gripping surface pose of a gripping surface for at least one of the goods in the first source container using the sensor system after the first source container has been provisioned at the first removal area and computing a gripping pose for the gripper unit based on the ascertained gripping surface pose by the robot control,
- g) removing the at least one of the goods from the first source container and placing the at least one of the goods into the first target container by the gripping unit of the robot in accordance with the first order,
- h) repeating the step f), provided that the order line according to the first order contains at least one other good of this type of good, again removing the at least one other good from the first source container and placing the at least one other good into the first target container by the gripping unit of the robot,
- i) ascertaining a gripping surface pose of a gripping surface for at least one of the goods in the second source container using the sensor system after the second source container has been provisioned at the second removal area and computing a gripping pose for the gripper unit based on the ascertained gripping surface pose by the robot control,
- j) removing the at least one of the goods from the second source container and placing the at least one of the goods into the second target container by the gripping unit of the robot in accordance with the second order,
- k) repeating the step i), provided that the order line according to the second order contains at least one other good of this type of good, again removing the at least one other good from the second source container and placing the at least one other good into the second target container by the gripping unit of the robot,
- l) removing the first source container from the first removal area after processing the order line according to the first order and removing the second source container from the second removal area after processing the order line according to the second order, independent of each other, by the second source container conveying device of the source container conveying system, m) removing the first target container from the first loading area after processing the order line according to the first order and removing the second target container from the second loading area after processing the order line according to the second order, independent of each other, by the second target container conveying device of the target container conveying system.

18. The method according to claim 17, wherein the first order having the steps f) to h) and the second order having the steps i) to k) are processed sequentially by the robot.

19. The method according to claim 18, wherein the step i) is carried out after the processing of the order line according to the first order and during the movement of the robot or the gripping unit from the first target container to the second source container.

20. The method according to claim 18, wherein the step f) is carried out after the processing of the order line according to the second order and during the movement of the robot or the gripping unit from the second target container to the first source container.

21. The method according to claim 18, wherein the step f) is carried out during the processing of the order line according to the first order in accordance with the steps g) and h), and the step i) is carried out during the processing of the order line according to the second order in accordance with the steps j) and k).

22. The method according to claim 17, wherein the first order having the steps g) and h) and the second order having the steps j) and k) are processed sequentially by the robot.

23. The method according to claim 17, wherein the first source container and the second source container are transported to a storage area, independent of each other, after the picking of the goods in accordance with the steps g) and h) and steps j) and k), provided that goods remain in the first source container and the second source container after the goods removal.

24. The method according to claim 17, wherein the first target container and the second target container are transported into a sorting buffer, independent of each other, after the picking of the goods in accordance with the steps g) and h) and steps j) and k), provided that different order lines are to be processed according to the first order and different order lines are to be processed according to the second order.

25. The method according to claim 24, wherein the source containers are removed from a storage area in accordance with the orders and provisioned in a random sequence at the first removal area and the second removal area,
- wherein the sequence of the source containers in which the source containers are supplied to the first removal area and the second removal area is detected,
- wherein the target containers in the sorting buffer are sorted into a sequence determined depending on the sequence in which the source containers are provisioned at the first removal area and the second removal area,
- wherein a first source container and a first target container, respectively according to an order, arrive approximately simultaneously at the first removal area and the first loading area, or a second source container and a second target container, respectively according to an order, arrive approximately simultaneously at the second removal area and the second loading area.

26. The method according to claim 17, comprising the steps:
- providing a holding plate arranged above the second source container conveying device and the second target container conveying device between the first source container and the first target container and between the second source container and the second target container,
- after the removal of the at least one good by the gripping unit from either one of the first source container and the second source container in accordance with the step g) or step j),
- checking by the sensor system whether the at least one good has dropped off the gripping unit and is located on the holding plate, and
- picking up the at least one good located on the holding plate by the gripping unit and placing in:
- the first source container, or
- the second source container, or
- the first target container, or
- the second target container.

* * * * *

UNITED STATES PATENT AND TRADEMARK OFFICE
CERTIFICATE OF CORRECTION

PATENT NO. : 12,098,037 B2
APPLICATION NO. : 16/978305
DATED : September 24, 2024
INVENTOR(S) : Christoph Doppler et al.

It is certified that error appears in the above-identified patent and that said Letters Patent is hereby corrected as shown below:

On the Title Page

Item (72): please change: "Wolfsegg (AT)" to correctly read: -- Wolfsegg a. H. (AT) --

Item (73): please change: "Gmbh" to correctly read: -- GmbH --

Signed and Sealed this
Twenty-second Day of October, 2024

Katherine Kelly Vidal
*Director of the United States Patent and Trademark Office*